United States Patent
Madisetti et al.

(10) Patent No.: US 12,554,684 B2
(45) Date of Patent: *Feb. 17, 2026

(54) METHOD AND SYSTEM FOR REAL-TIME COLLABORATION, TASK LINKING, AND CODE DESIGN AND MAINTENANCE IN SOFTWARE DEVELOPMENT

(71) Applicant: Vijay Madisetti, Alpharetta, GA (US)

(72) Inventors: Vijay Madisetti, Alpharetta, GA (US); Arshdeep Bahga, Chandigarh (IN)

(73) Assignee: Vijay Madisetti, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/176,513

(22) Filed: Apr. 11, 2025

(65) Prior Publication Data

US 2025/0238401 A1 Jul. 24, 2025

Related U.S. Application Data

(63) Continuation of application No. 18/755,292, filed on Jun. 26, 2024, now Pat. No. 12,306,798, which is a
(Continued)

(51) Int. Cl.
*G06F 16/176* (2019.01)
*G06F 16/18* (2019.01)
(Continued)

(52) U.S. Cl.
CPC ........ *G06F 16/176* (2019.01); *G06F 16/1815* (2019.01); *G06F 16/182* (2019.01); *G06F 40/169* (2020.01); *G06F 40/289* (2020.01)

(58) Field of Classification Search
None
See application file for complete search history.

(56) References Cited

U.S. PATENT DOCUMENTS 8,026,814 B1 9/2011 Heinze et al.
9,483,259 B1 * 11/2016 Lee .......................... G06F 8/70
(Continued)

OTHER PUBLICATIONS

Notice of Allowance received in related U.S. Appl. No. 17/645,832 issued Nov. 20, 2025; 22 pages.
(Continued)

*Primary Examiner* — Thu N Nguyen
(74) *Attorney, Agent, or Firm* — Daniel C. Pierron; Widerman Malek, PL

(57) ABSTRACT

A method of facilitating code development including receiving an updated code file, identifying a stored code file associated with the updated code file and including stored code content, identifying a stored meta-file associated with the stored code file, the stored code file being associated with the updated code file, the stored meta-file including previously received metadata content, and identifying the updated code file as including at least one of updated code content and updated metadata content. Upon identifying the updated code file as including updated code content, the stored code file is updated to include the updated code content. Upon identifying the updated code file as including updated metadata content, the stored meta-file is updated to include the updated metadata content.

16 Claims, 49 Drawing Sheets

Related U.S. Application Data continuation-in-part of application No. 18/055,935, filed on Nov. 16, 2022, which is a continuation-in-part of application No. 17/930,796, filed on Sep. 9, 2022, now Pat. No. 12,210,487, which is a continuation-in-part of application No. 17/645,832, filed on Dec. 23, 2021, which is a continuation-in-part of application No. 16/948,255, filed on Sep. 10, 2020, now Pat. No. 11,226,938, which is a continuation of application No. 16/948,254, filed on Sep. 10, 2020, now Pat. No. 11,080,240.

(60) Provisional application No. 63/526,473, filed on Jul. 13, 2023, provisional application No. 63/418,508, filed on Oct. 22, 2022, provisional application No. 63/393,991, filed on Aug. 1, 2022, provisional application No. 63/023,292, filed on May 12, 2020, provisional application No. 62/994,306, filed on Mar. 25, 2020, provisional application No. 62/993,733, filed on Mar. 24, 2020, provisional application No. 62/989,773, filed on Mar. 15, 2020, provisional application No. 62/969,693, filed on Feb. 4, 2020, provisional application No. 62/901,881, filed on Sep. 18, 2019, provisional application No. 62/899,172, filed on Sep. 12, 2019.

(51) Int. Cl.
*G06F 16/182* (2019.01)
*G06F 40/169* (2020.01)
*G06F 40/289* (2020.01)

(56) References Cited

U.S. PATENT DOCUMENTS

| | | | |
|---|---|---|---|
| 11,868,494 B1* | 1/2024 | Zhuang | G06F 16/22 |
| 2005/0108526 A1* | 5/2005 | Robertson | H04L 63/105 |
| | | | 713/166 |
| 2010/0220844 A1 | 9/2010 | Noldus | |
| 2013/0091298 A1 | 4/2013 | Ozzie et al. | |
| 2018/0137303 A1* | 5/2018 | Farkash | G06F 21/6263 |
| 2018/0307480 A1* | 10/2018 | Doyle | G06F 8/658 |

OTHER PUBLICATIONS

Non-Final Office Action received in related U.S. Appl. No. 18/055,935 issued on Jan. 14, 2026; 23 pages.

* cited by examiner

CATCHUP

DASHBOARD · WORKSPACE · TASKS · ORGANIZATION · INVOICING · ANALYTICS · ⊕ · CLOUDARING

EVENTS ROSTER

DISPLAY [10] RECORDS

[+ NEW ROSTER]

| ID | CLIENT | MATTER | PROJECT | DATE | WITNESS NAME | TYPE | ACTIONS |
|----|--------|--------|---------|------|--------------|------|---------|
| 5  | ERICSSON | ERICSSON V. ACME3 PROPOSAL | COURT | 2020-05-30 | WILLIE BARNES | DEPOSITION | ▦▼ |
| 6  | ERICSSON | ERICSSON V. ACME2 | COURT | 2020-06-19 | WILLIE BARNES | TRIAL | ▦▼ |
| 25 | REPEAT PRECISION | RP VS DIAMONDBACK | CASE 6:19-CV-00834-ADA | 2019-05-08 | KIM BELLAH | DEPOSITION | ▦▼ |
| 26 | REPEAT PRECISION | RP VS DIAMONDBACK | CASE 6:19-CV-00834-ADA | 2019-05-09 | WILLIE BARNES | TRIAL | ▦▼ |

SHOWING 1 TO 4 OF 4 ENTRIES

[PREVIOUS] [1] [NEXT]

FIG. 10

Create Event Roster — 1100

Client: Repeat Precision
Matter: RP vs Diamondback
Project: Case 6:19-CV-00034-ADA
Event Type: Deposition
Date: 12/04/2019
Witness Name: Kim Bellah
Location: Location
Attorney Name: Attorney Name ☑ Video
☐ Signed
☐ Corrected
☐ Hard Copy
☑ Disk
☐ Added to Chron Link to Transcript Rough
Link to Transcript Final
Link to Video
Court Reporting Firm Submit  Discard

FIG. 11

Court Fields 1200

Case Number
[6:19-CV-00034-ADA]

Judge
[Judge]

Clerk
[Clerk]

Title of Case
[Repeat Precision]

People
[People]

Plaintiff
[Plaintiff]

Petitioner
[               ]

Defendant
[Defendant]

Respondent
[Respondent]

Court
[Court]

Date Field
[Date Field]

Linked Cases
[Linked Cases]

Lawfirm Plaintiff
[Lawfirm Plaintiff]

Lawfirm Defendant
[Lawfirm Defendant]

[Submit] [Discard]

FIG. 12

EXHIBIT ANALYTICS

CLIENT: REPEAT PRECISION
MATTER: RP VS DIAMONDBACK
PROJECT: CASE 6:19-CV-00034-ADA

SELECT EXPORT OR DOWNLOAD TYPE

↑ EXPORT EXHIBITS LIST  ↑ DOWNLOAD EXHIBITS  ↑ LOAD

| DOCUMENT | TITLE | BATES NO | DOWNLOAD | DEPOSITION-KIM BELLAH-05/08/2019 | TRIAL-05/09/2019 |
|---|---|---|---|---|---|
| EXHIBIT_280_KIM.BELLAH.PDF | EXHIBIT 280 KIM BELLAH.PDF | DI-WDTEX 0034275 | ⬇ | ◉ | |
| EXHIBIT_279_KIM.BELLAH.PDF | EXHIBIT 279 KIM BELLAH.PDF | DI-WDTEX 0034218-DI-WDTEX 0034219 | ⬇ | ◉ | |
| EXHIBIT_282_KIM.BELLAH.PDF | EXHIBIT 282 KIM BELLAH.PDF | DI-WDTEX 0032974 | ⬇ | ◉ | |
| 9489373_0020_LIST_OF_COMPET.PDF | 0020_LIST OF COMPETITORS BY COMPANY PRODUCTS.PDF | GRIFFIN-0005286 | ⬇ | | ◉ |
| 0586_SS20_VOLUME_PRICI.PDF | 0586_SS10 & SS20 VOLUME PRICING.PDF | GRIFFIN-0001540-500-999 | ⬇ | | ◉ |
| 9489797_0255_DIAMONDBACK_IN.PDF | 0255_DIAMONDBACK INDUSTRIES, INC. INCOME BY CUSTOMER DETAIL JANUARY THROUGH DECEMBER 2018.PDF | 09042018 | ⬇ | | ◉ |
| 0587_SS10_SS20_VOLUME_PRIC.PDF | 0587_SS10 & SS20 VOLUME PRICING.PDF | GRIFFIN-0001548-500-999 | ⬇ | | ◉ |

◉ POTENTIAL DEPOSITION EXHIBIT  ◉ ACTUAL DEPOSITION EXHIBIT  ☑ POTENTIAL TRIAL EXHIBIT  ☑ ACTUAL TRIAL EXHIBIT
◉ POTENTIAL MARKMAN HEARING EXHIBIT  ◉ ACTUAL MARKMAN HEARING EXHIBIT  ○ POTENTIAL MSJ HEARING EXHIBIT  ○ ACTUAL MSJ HEARING EXHIBIT

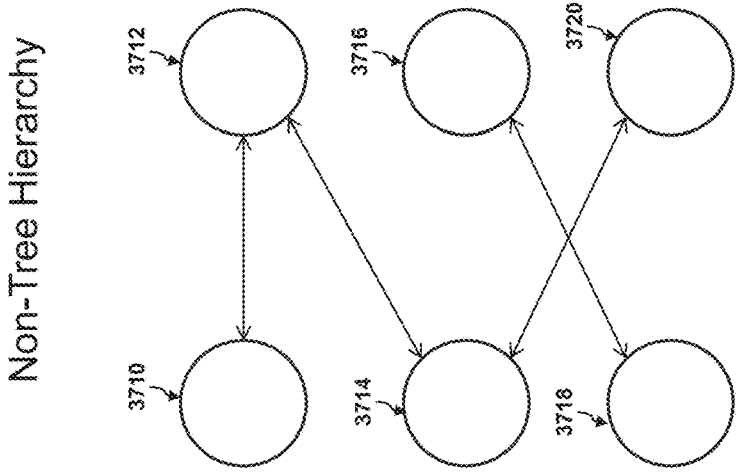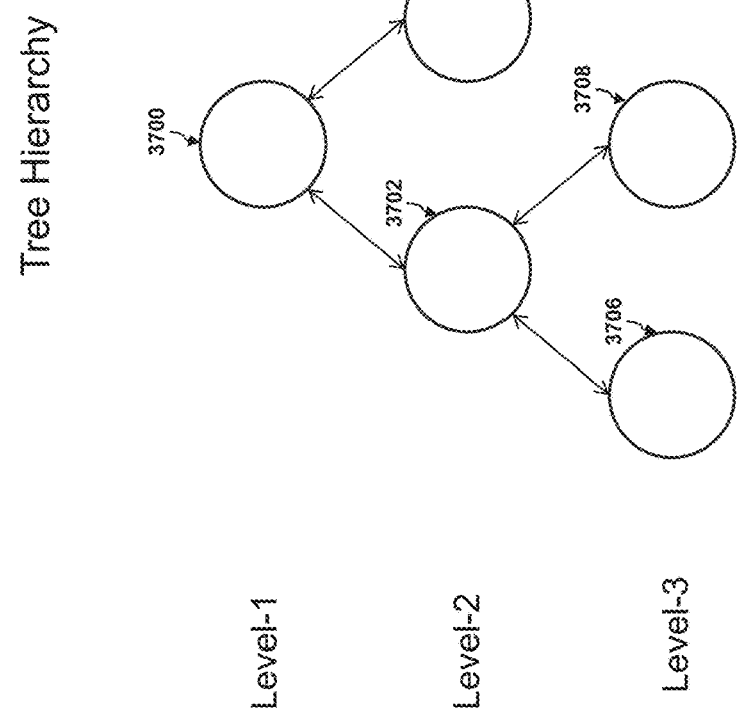
Fig. 36

Fig. 41

METHOD AND SYSTEM FOR REAL-TIME COLLABORATION, TASK LINKING, AND CODE DESIGN AND MAINTENANCE IN SOFTWARE DEVELOPMENT

RELATED APPLICATIONS

This application is a continuation-in-part application of and claims priority under 35 U.S.C. § 120 of U.S. patent application Ser. No. 18/755,292 filed on Jun. 26, 2024 and titled Method and System for Documenting and Annotating Code with Strategic Design Decisions Using Meta-Files, which in turn is a continuation-in-part application of and claims priority under 35 U.S.C. § 120 of U.S. patent application Ser. No. 18/055,935 filed on Nov. 16, 2022 and titled Hierarchical Data Object System with Hierarchical Chat Functionality, which in turn claims priority under 35 U.S.C. § 119(e) of U.S. Provisional Patent Application Ser. No. 63/418,508 filed on Oct. 22, 2022 and titled Efficient User Interfaces for Collaborative Work with Hierarchical Chats and is also a continuation-in-part application of and claims priority under 35 U.S.C. § 120 of U.S. patent application Ser. No. 17/930,796 filed on Sep. 9, 2022 and titled Method and System for Real-Time Collaboration, Task Linking, and Code Design and Maintenance in Software Development, which in turn claims priority under 35 U.S.C. § 119(e) of U.S. Provisional Patent Application Ser. No. 63/393,991 filed on Aug. 1, 2022 and titled Collaboration on Code Design, Development and Maintenance using GlassViewer and is also a continuation-in-part application of and claims priority under 35 U.S.C. § 120 of U.S. patent application Ser. No. 17/645,832 filed on Dec. 23, 2021 and titled Method and System for Real-Time Collaboration and Event Linking to Documents and Video Recordings, which in turn is a continuation-in-part application of and claims priority under 35 U.S.C. § 120 of U.S. patent application Ser. No. 16/948,255, now U.S. Pat. No. 11,226,938, issued Jan. 18, 2022 filed on Sep. 10, 2020 and titled METHOD AND SYSTEM FOR REAL-TIME COLLABORATION AND EVENT LINKING TO DOCUMENTS, which in turn claims priority under 35 U.S.C. § 119(e) of U.S. Provisional Patent Application Ser. No. 62/899,172 filed on Sep. 12, 2019 and titled Catchup-A Next Generation Management, Scheduling and Optimization for Organization U.S. Provisional Patent Application Ser. No. 62/901,881 filed on Sep. 18, 2019 and titled Catchup-Resource-based Project and Task Management and Crowdsourcing, U.S. Provisional Patent Application Ser. No. 62/969,693 filed on Feb. 4, 2020 and titled Catchup-Task scheduling and resource management tool with integrated architecture, U.S. Provisional Patent Application Ser. No. 62/989,773 filed on Mar. 15, 2020 and titled CatchUp—Realtime Collaboration and Annotation-based Task Creation, U.S. Provisional Patent Application Ser. No. 62/993,733 filed on Mar. 24, 2020 and titled CatchUp—Real-Time Collaboration and Annotation-Based Task Creation, U.S. Provisional Patent Application Ser. No. 62/994,306 filed on Mar. 25, 2020 and titled CatchUp—Real-Time Collaboration and Annotation-Based Task Creation and Management, U.S. Provisional Patent Application Ser. No. 63/023,292 filed on May 12, 2020 and titled CatchUp—Real-Time Task Collaboration and Event Linking to Documents, and is also a continuation application of and claims priority under 35 U.S.C. § 120 of U.S. patent application Ser. No. 16/948,254, now U.S. Pat. No. 11,080,240, issued Aug. 3, 2021 filed on Sep. 10, 2020 and titled METHOD AND SYSTEM FOR REAL-TIME COLLABORATION AND ANNOTATION-BASED ACTION CREATION AND MANAGEMENT. This application also claims priority under 35 U.S.C. § 119(e) of U.S. Provisional Patent Application Ser. No. 63/526,473 filed on Jul. 13, 2023 and titled MetaSync to Link Software Design to AI-based Code Repositories. The contents of these applications are incorporated herein by reference.

FIELD OF THE INVENTION

The present invention relates to real-time collaboration and annotation-based task creation and management.

BACKGROUND

In the field of software development, there exists a significant gap between the high-level strategic and competitive design decisions made by system architects and the low-level functional code implementation carried out by developers. Current integrated development environments (IDEs) and code repositories are primarily focused on the functional aspects of code, such as correctness, syntax, and implementation details. However, these tools lack the capability to capture and maintain the crucial link between the strategic design rationale and the corresponding code implementations.

The process of designing and developing software applications involves several stages, starting with the formulation of strategic plans and competitive positioning. At this stage, critical decisions are made regarding the selection of training data sets, machine learning algorithms, databases, APIs, and other technological components. These choices are often documented in presentations, specifications, or residing solely in the minds of the architects. However, these strategic design decisions are rarely directly associated with the underlying code repository or visible to the developers responsible for implementing the low-level code.

As a result, developers are frequently unaware of the overarching strategic goals, product roadmaps, or competitive considerations that drive the implementation of specific functionalities or design patterns. This disconnect can lead to suboptimal coding practices, inefficient resource allocation, and potential misalignment between the high-level product vision and the actual code implementation.

Furthermore, the rise of AI-based code generation tools (such as Large Language Models, LLMs, used in Generative AI applications) has exacerbated this problem. While these tools can generate low-level code efficiently, the generated code lacks the context and rationale behind the strategic design choices that led to its creation. This makes it challenging to maintain coherence between the generated code and the overall product strategy, or problems in integration of this LLM-generated code with other code, potentially leading to technical debt and architectural erosion over time.

There is a pressing need for a system that bridges this gap by providing a unified platform for documenting, annotating, and linking strategic design decisions with the corresponding code implementations. Such a system would foster better communication, collaboration, and alignment between architects and developers, ultimately leading to more cohesive and robust software products.

SUMMARY OF THE INVENTION

With the above in mind, embodiments of the present invention are directed to a system and associated methods for addressing the above-described problems with code development and annotation management.

In some embodiments, the method and systems may further comprise a for annotating and documenting code with meta-data that captures the important design decisions made during the software development process. The GView system may integrate with existing code repositories and development environments, providing a unified platform for architects and developers to collaborate and maintain a link between high-level strategic decisions and low-level code implementations.

Embodiments of the invention may comprise "meta-files", which are associated with individual source code files or entire code folders. These meta-files serve as containers for storing not only the source code but also annotations, comments, and metadata related to the strategic design decisions that influenced the implementation of that particular code segment or module.

The present invention utilizes a bi-directional synchronization mechanism called "meta-sync" that ensures changes to the source code are reflected in the corresponding meta-file and vice versa. This synchronization process is facilitated by a dedicated module that monitors for code changes and handles conflict resolution strategies for simultaneous modifications to the source code and meta-files.

A feature of the present invention is its support for role-based access control (RBAC). This allows organizations to restrict access to specific sections of the meta-files based on the user's role and responsibilities. For instance, managers and architects may have full access to annotate and view design decisions and rationale, while developers may only have access to the source code portions of the meta-files.

The present invention may integrate with integrated development environments (IDEs) and code editors through extensions/plugins, enabling developers to view and reference the meta-file annotations alongside the source code. This facilitates code navigation, search capabilities, and provides developers with immediate access to the design rationale behind specific implementations.

Some embodiments of the present invention may utilize natural language processing (NLP) techniques to automatically extract design decisions and rationale from existing code comments, documentation, and other sources. This automation capability streamlines the annotation process and facilitates the integration of the present invention into existing codebases and workflows.

Embodiments of the present invention encompass the integration of the invention with continuous integration (CI) pipelines and AI-assisted code generation tools. The CI module validates and analyzes the meta-file data during builds, performing checks for adherence to architectural principles, security policies, and other quality checks. Additionally, AI-assisted code generation tools can consume the meta-file data to generate code that is aligned with the documented design decisions and architectural principles.

BRIEF DESCRIPTION OF THE DRAWINGS

FIG. 10 is an exemplary interface of the CatchUp platform showing events roster, according to an embodiment of the invention.

FIG. 11 is an exemplary interface of the CatchUp platform showing event creation dialog, according to an embodiment of the invention.

FIG. 12 is an exemplary interface of the CatchUp platform showing court case creation dialog, according to an embodiment of the invention.

FIG. 14 is an exemplary interface of the CatchUp platform showing exhibit analytics, according to an embodiment of the invention.

FIG. 15 is an exemplary interface of the CatchUp platform showing task notes and real-time communication, according to an embodiment of the invention.

FIG. 18 is an exemplary interface of the CatchUp Glass Viewer for PDF documents, according to an embodiment of the invention.

FIG. 30 is an illustration of the CatchUp GlassViewer for Code Collaboration, according to an embodiment of the invention.

FIG. 36 is an illustration of the chat hierarchies within CatchUp, according to an embodiment of the invention.

FIG. 41 is an illustration of a Project within CatchUp, according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
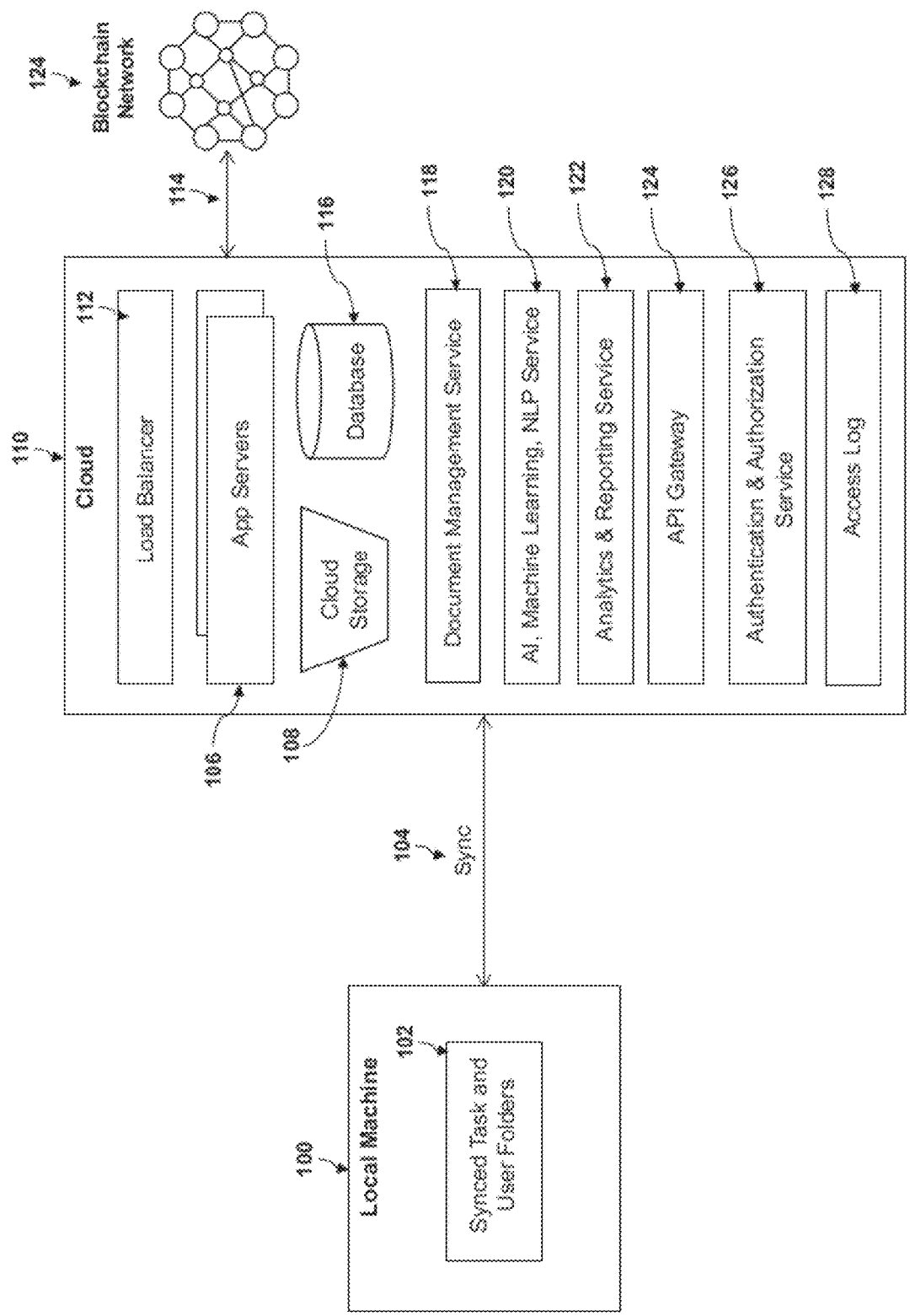
FIG. 1 is a schematic block diagram of a cloud-based host environment and a local synced folder according to an embodiment of the present invention.

Referring now to FIG. 1 a schematic block diagram of a cloud-based host environment and a local synced folder is described in more detail. The cloud-based host environment 110 configured in data communication with a local machine 100 (e.g., computer, or a smartphone) that may host a synchronized user and task folders 102. The cloud-based host environment 110 may control the creation, lifecycle and destruction of digital objects (for example, and without limitation, data artifacts such as documents, software, video, images and music). Such digital objects may be synchronized from the host environment 110 to the user and task folders 102 hosted on the local machines 100, and also may be secured such that the digital objects may not be viewed, deleted, stored, edited, or copied without permission, knowledge and control of the host environment 110. The digital objects may be stored and replicated in the cloud-based host environment 110 comprising application servers 106 placed under a load balancer 112. The cloud-based host environment 110 may include a cloud storage 108 configured for storage of digital objects. A document management service 118 may control the digital objects' lifecycles. A database 116 within the cloud environment 110 may maintain information about the digital objects, user IDs of the object owners, object creation timestamps, change logs recording changes in object state, transactions executed or attempted, and object permissions. An Artificial Intelligence (AI), Machine Learning and Natural Language Processing (NLP) service 120 enables automated extraction of meta-data from digital objects (such as creation dates, document identifiers, document number, description and security specification).

The analytics and reporting service 122 may employ big data tools and frameworks for batch or real-time analytics (as described in more detail below) on available databases and meta-databases, for instance, to analyze documents, digital object access logs and network traffic. The cloud environment 110 may further include application programming interface (API) gateway 124 that exposes APIs for creating, updating, and deleting digital objects, and for operating authentication and authorization and analytics and reporting functions. These APIs may be used for developing document management and analytics applications that operate within an organization's network. For implementing the components within the cloud-based host environment 110, micro-services architectures may be used whereby each service may perform a predefined set of actions and may communicate with other services through the use of inter-service communication mechanisms such as request-response (e.g. REST over HTTP), publish-subscribe (e.g. MQTT), remote procedure call (RPC) (e.g. Thrift), or notifications. In certain embodiments of the present invention, these services may be developed, deployed and scaled independently. A blockchain network 124 is used for certifying and timestamping documents/objects stored with the cloud environment 110 that establishes the proof of existence, ownership, custody and integrity of such documents/objects.

In certain embodiments of the present invention, security features for advantageously providing secure access to the cloud-based host environment 110 may include one or more of the following:

1) Authorization Services: As a matter of definition, authorization refers to digitally specifying access rights to protected resources using access policies. The cloud-based host environment 110 may include authorization services such as policy management, role management and role-based access control. A role-based access control framework may be used to provide access to digital objects in the cloud environment 110 to users based on the assigned roles and data access policies. The cloud environment may support "OAuth," an open standard for authorization that allows resource owners to share their private resources stored on one site with another site without handing out the credentials.

2) Identity Management Services: Identity management services may provide consistent methods for identifying persons and maintaining associated identity attributes for users across multiple organizations. For example, and without limitation, Federated Identity Management (FidM) may be enforced for the host 100. FidM provides the ability to establish trust relationships between various security domains to enable the passing of authentication, authorization and privacy assertions.

3) Authentication Services: The cloud environment 110 may support authentication services 126 configured to prevent digital objects from being accessed by unauthorized users. For example, and without limitation, authentication and authorization services 126 may include a Single Sign On (SSO) that may enable users to access multiple applications after signing in for a first time. In addition to SSO, One Time Password (OTP) security may also be enforced. OTPs may be delivered via SMS and email. One benefit of OTP is that such security regimes are not vulnerable to replay attacks.

4) Data Encryption: The cloud environment 110 may adopt a data encryption standard such as the Advanced Encryption Standard (AES) for encrypting all data that is stored in the host. In addition to encryption of stored data, all transmission of data may be protected with Secure Socket Layer (SSL) encryption technology.

Figure 2:
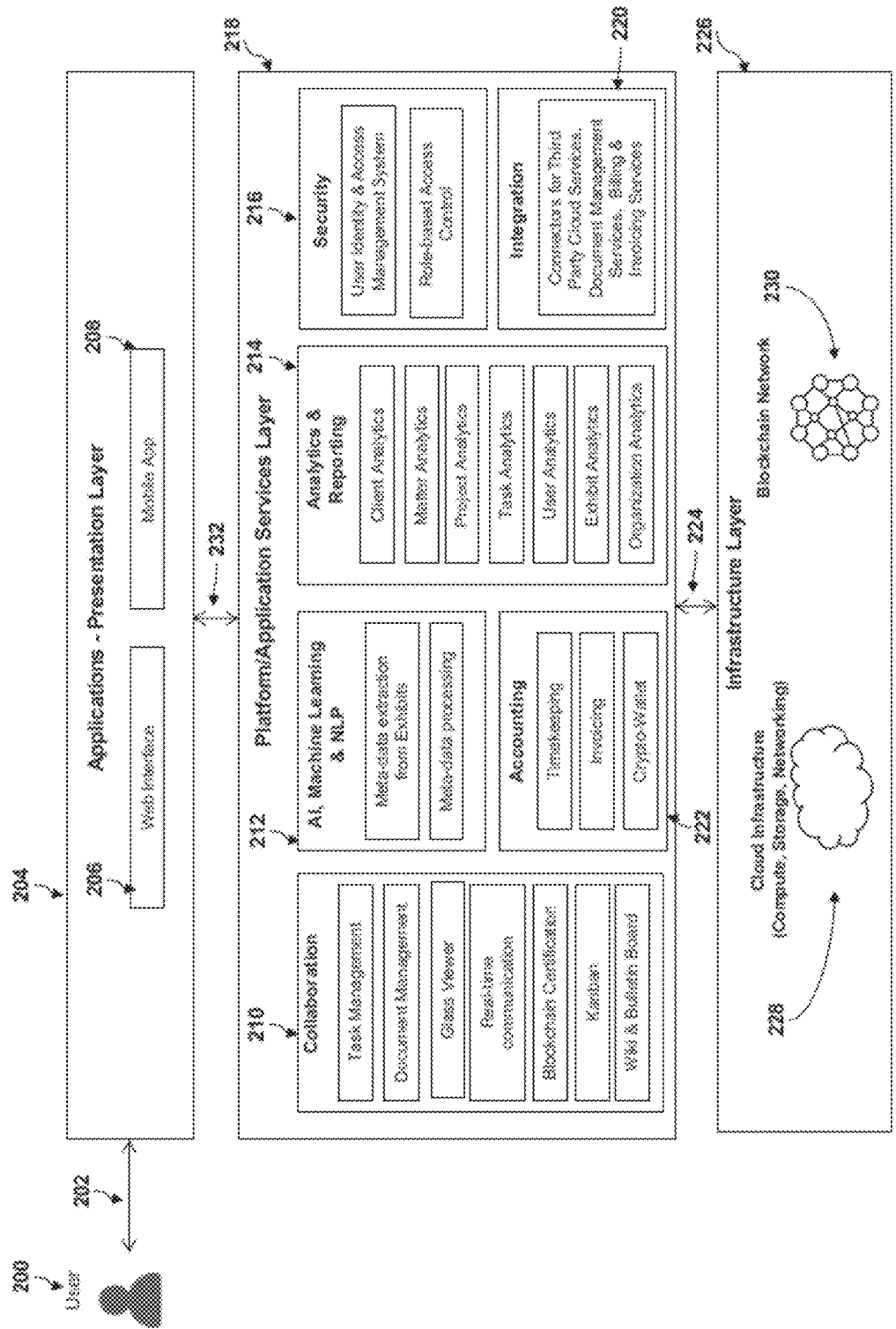
FIG. 2 is a schematic diagram of the CatchUp real-time collaboration and annotation-based task creation and management platform, according to an embodiment of the invention.

Referring now to FIG. 2 is a schematic diagram of the CatchUp real-time collaboration and annotation-based task creation platform, is described in more detail. A user 200 may interact with the platform through use of an application and presentation layer 204. The application and presentation layer 204 may comprise a web interface 206 and/or a mobile application 208. Elements of the application and presentation layer 204 may be the client-facing element of a platform/application services layer 218. The platform/application services layer 218 may comprise security features 216, such as a user identity and access management system and role-based access control. The platform/application services layer 218 may further comprise integration services 220, such as, for example, Connectors for Third Party Cloud Services, Document Management Services, Billing & Invoicing Services. The platform/application services layer 218 may further comprise collaboration features 210. The collaboration features 210 may include task management, document management, Glass Viewer, real-time communication, blockchain certification, kanban, wiki and bulletin board. The platform/application services layer 218 may further comprise accounting services 222, such as timekeeping, invoicing and cryptocurrency wallet. The platform/application services layer 218 may further comprise analytics and reporting services 214, for client analytics, matter analytics, project analytics, task analytics, user analytics, exhibit analytics and organization analytics. The platform/application services layer 218 may function on an infrastructure layer 226 that may comprise one or more of cloud infrastructure 228 (such as cloud computational resources, cloud storage resources, or cloud networking resources.) and blockchain network 230.

Figure 3:
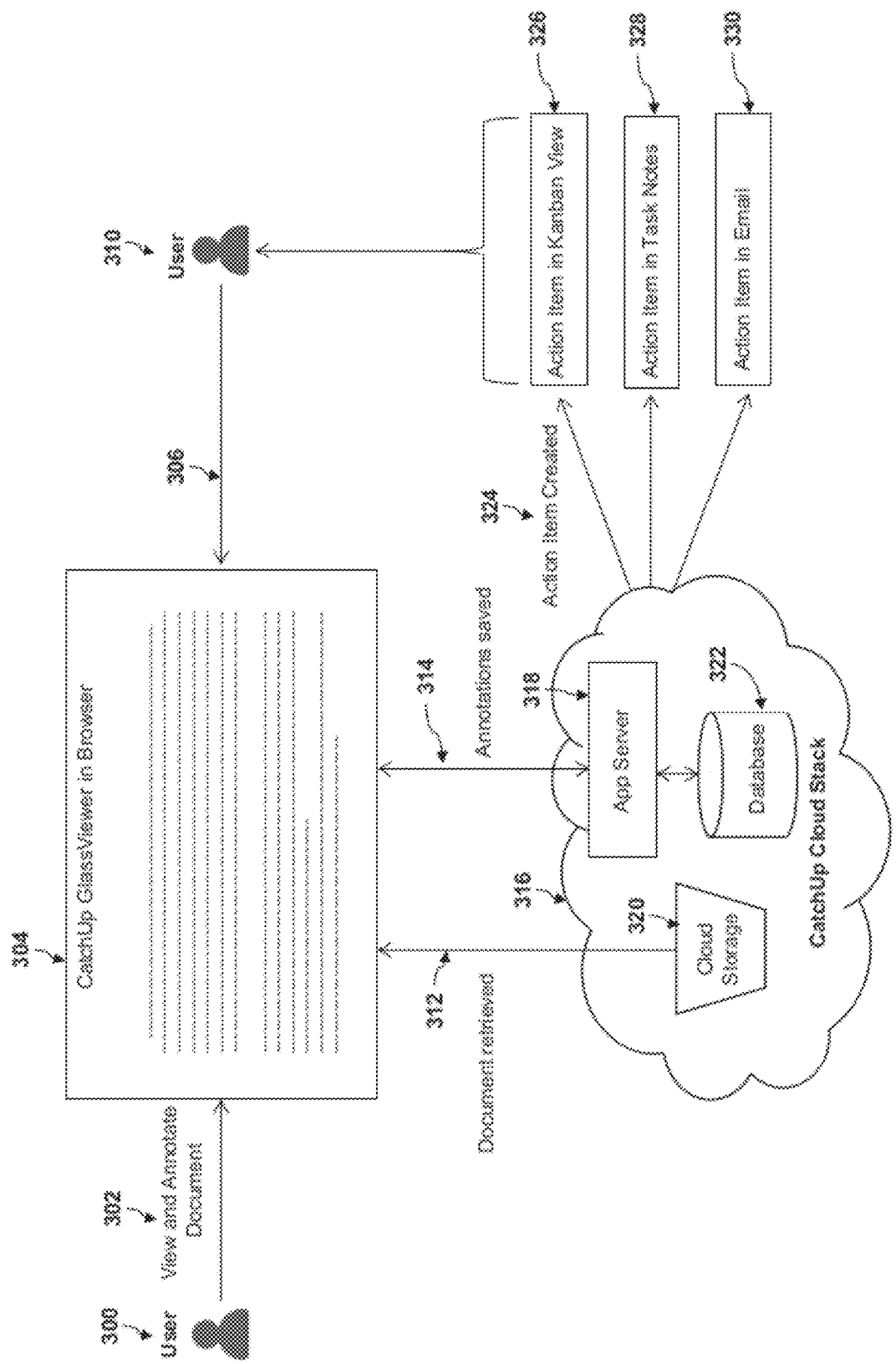
FIG. 3 is an illustration of the round-trip process of creating action items from annotations, according to an embodiment of the invention.

Referring now to FIG. 3 is an illustration of the round-trip process of creating action items from annotations, is described in more detail. CatchUp features an enterprise grade document management system to create, share and collaborate on documents in real-time. A user 300 may view and annotate 302 a document stored with the Cloud Storage 320 that is a part of the CatchUp Cloud Stack 316 using the CatchUp GlassViewer 304. The CatchUp GlassViewer 304 allows viewing and annotating documents including comments, text highlighting, and other tools. The annotations are transmitted 314 to the application server 318, which then creates 324 action items that are then posted to a kanban view 326, task notes 328 and via email 330. The action items then direct the user 310 (to whom the action items have been assigned) back to the comments/annotation when the document is opened with the CatchUp GlassViewer 304. While previous approaches only allow comments that do not affect the original document, the new approach in CatchUp allows executable commands to be included inside the comments and annotations. CatchUp supports annotations and comments for PDF and Office format documents.

Additionally, it is contemplated and included within the scope of the invention that the user 300 may transmit a document to the CatchUp Cloud Stack 316 to be stored in the Cloud Storage 320 and subsequently viewed and annotated. When the document is transmitted to the CatchUp Cloud Stack 316 the user 300 may also provide an indication of an associated event with which the document is associated.

CatchUp supports both "user added" action items and "system added" action items. A user added action item is one that is added by a user and assigned to another user. A system added action item is one that is automatically added by the system when there is a resource allocation needed. There can be two types of users: human and non-human (machines, cars, MQTT brokers, for instance). Non-human users function like "virtual users" within the system. For example, a virtual user can be a CAT Scan machine which is assigned an action item to do a particular CAT scan task on a patient, and it updates it status of action item within the Kanban view and performs the task. Additionally, a cryptocurrency wallet may be charged for the cost of running the machine and an expense item is added and a budget is deducted.

Figure 4:
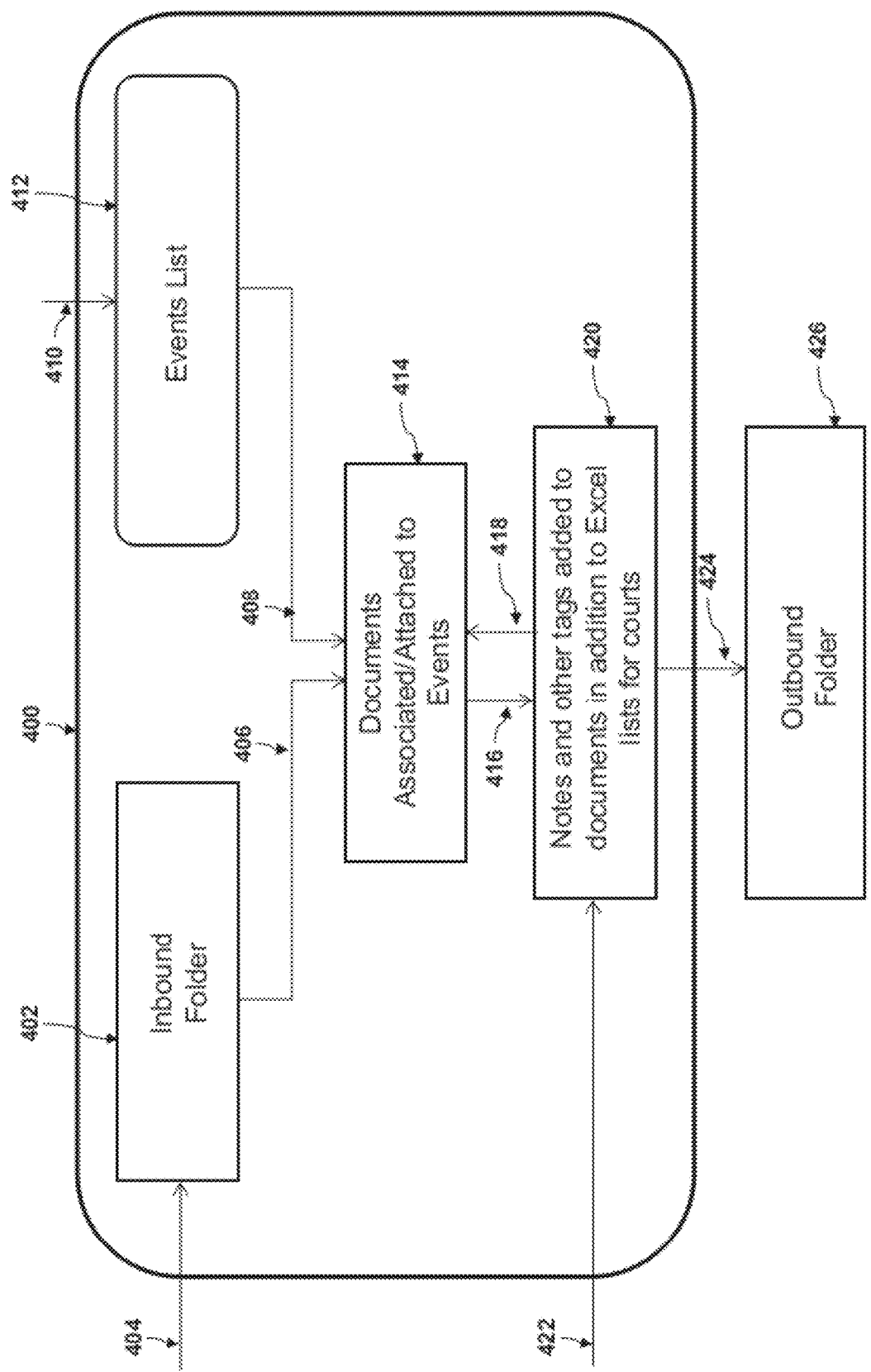
FIG. 4 is an illustration of the document to event linking process, according to an embodiment of the invention.

Referring now to FIG. 4 an illustration of the document to event linking process, is described in more detail. Documents for court and trail and other litigation use are ingested 404 into an inbound folder 402 comprised by a CatchUp Server 400 related to client/matter/project/task. Documents 406 are linked 414 to events 408 in an event list 412. Both potential and actual exhibit fields are recorded. Notes and reviews of documents by attorneys and others are recorded 420 as part of comments panels that are stored independent of the source documents, for example, through glass viewer features. The round-trip annotation to task action item features 416, 418 are also preserved. Sync of files and folders to local computer is also supported with the "court case" folder synced to local and cloud storage options. Detailed analytics and search features are included to generate Excel and other formatted reports for court use and internal organizational use. The output Excels lists for courts are copied 424 to an outbound folder 426.

Figure 5:
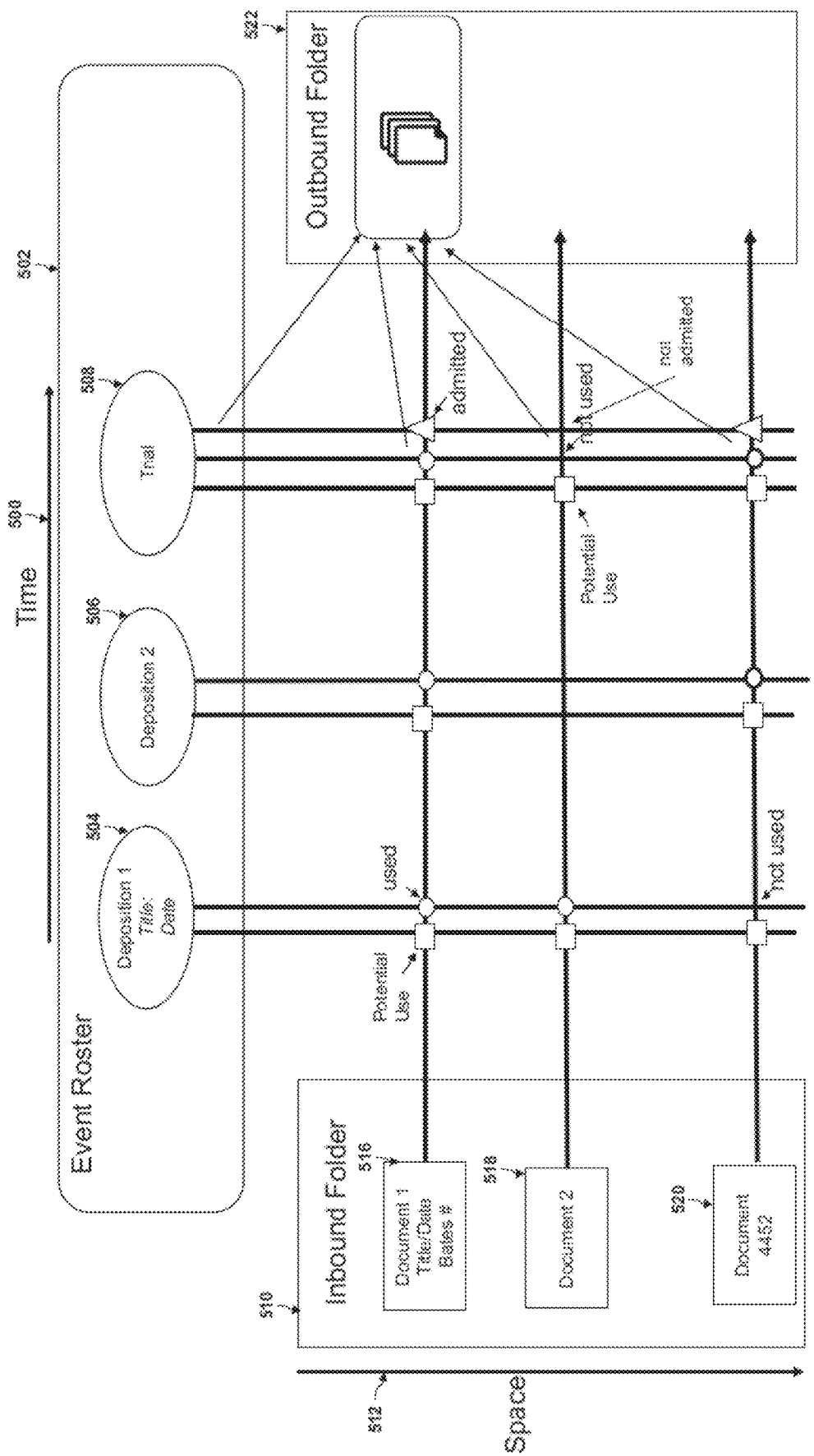
FIG. 5 is an illustration of the time-space event flow with linking of documents to events, according to an embodiment of the invention.

Referring now to FIG. 5 an illustration of the time-space event flow with linking of documents to events, is described in more detail. The time dimension 500 comprises a list of events (e.g. 504, 506, 508) within event roster 502. The events can be of types Deposition, Trial, Markman hearing, MSJ hearing, for instance. Events can have attributes such as witness name, date, attorney name, for instance. The space dimension 512 comprises a list of exhibits in an inbound folder 510. Each exhibit 516, 518, 520 has meta-data such as bates number range, title, description and date, for instance. The exhibits are linked to events in a time-space event flow, where the linking type can be either potential use, actual use or admitted. An outbound folder 522 contains a spreadsheet, for example an Excel spreadsheet of exhibits based on the time-space linking such as Potential Deposition Exhibits list, Actual Deposition Exhibits list, Potential Trial Exhibits list and Actual Trial Exhibits, list, for instance.

Figure 6:
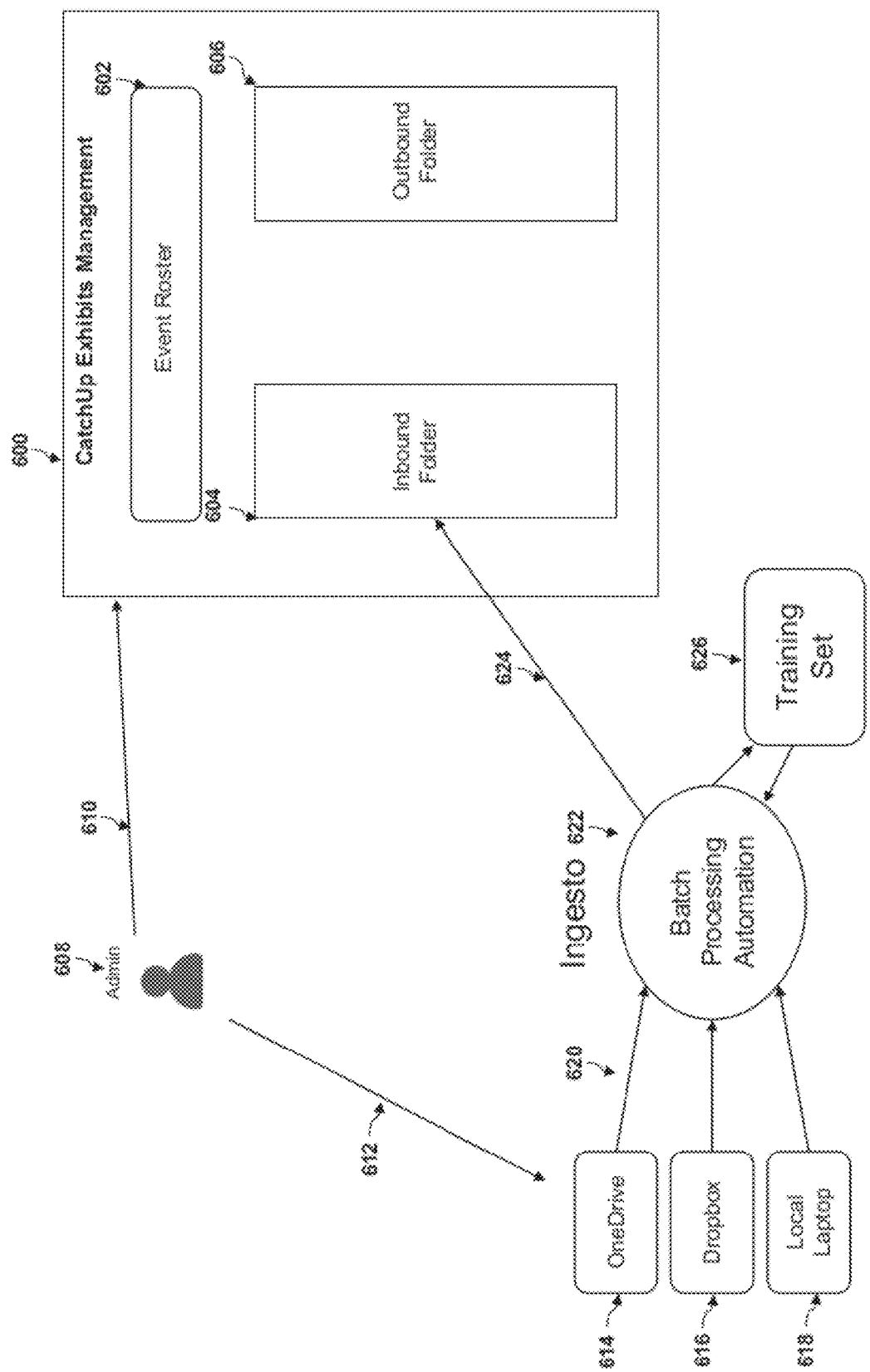
FIG. 6 is an illustration of the document ingesting process, according to an embodiment of the invention.

Referring now to FIG. 6 an illustration of the document ingesting process, is described in more detail. Documents or exhibits may be ingested from different sources such as local laptop/desktop machine or user 618, or Cloud Storage services such as Dropbox 616 or OneDrive 614, for instance. The documents are processed 620 in batch at step 622 to extract meta-data such as bates number range, title, description and date, for instance. The batch processing automation step 622 uses a training set 626 for training the AI or Machine Learning models for extraction of meta-data. The documents and extracted meta-data are stored 624 within an inbound folder 604 comprised by the CatchUp Exhibit Management system. The documents/exhibits may be linked to events within an event roster 602. An outbound folder 606 contains an Excel list of exhibits based on the time-space linking such as Potential Deposition Exhibits list, Actual Deposition Exhibits list, Potential Trial Exhibits list and Actual Trial Exhibits, list, for instance. An administrator 608 may control each of the CatchUp Exhibits Management system and the document/exhibit sources 614, 616, 618 to facilitate and manage document ingestion.

Figure 7:
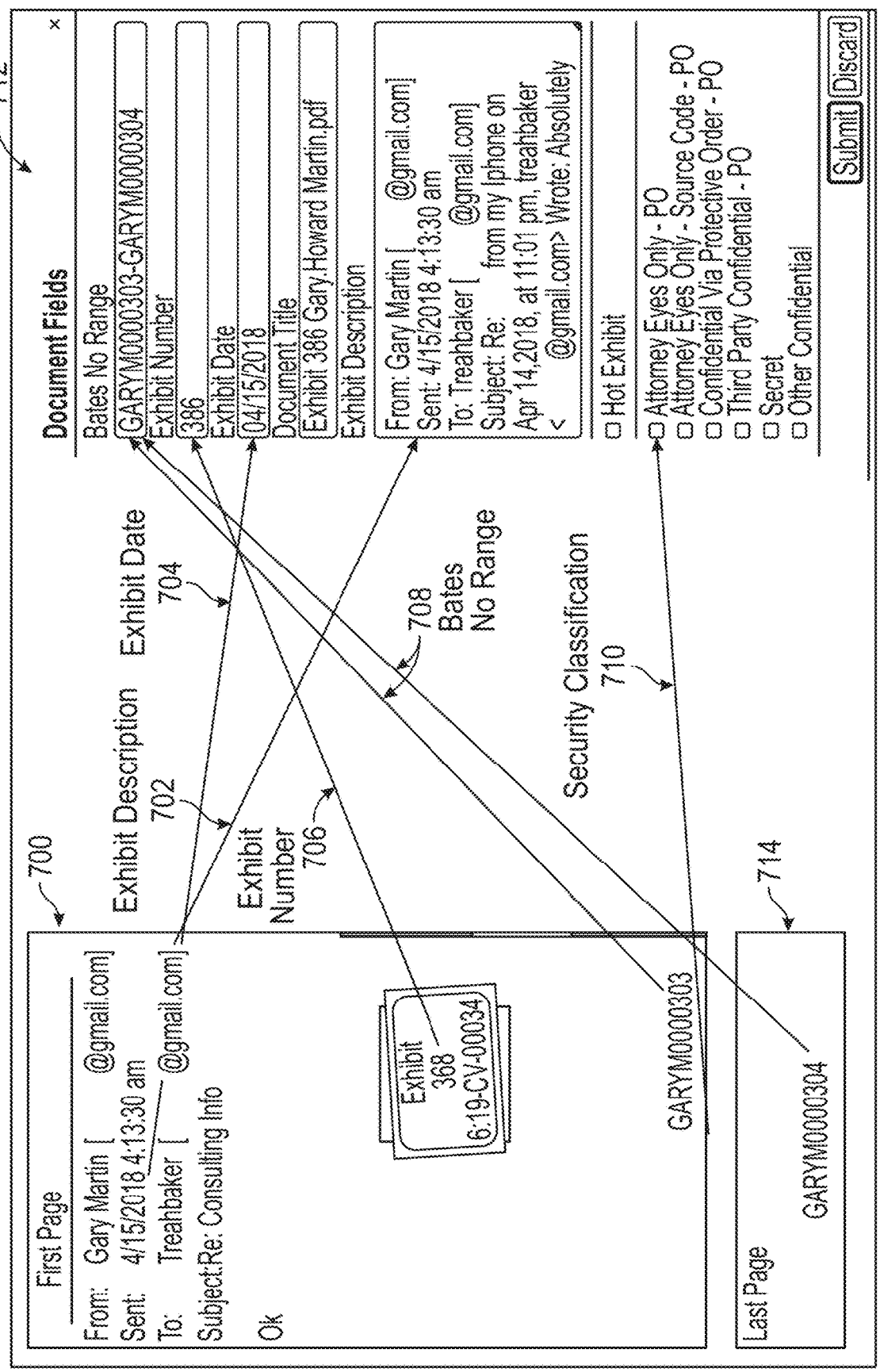
FIG. 7 is an exemplary illustration of the process of extracting meta-data from documents, according to an embodiment of the invention.

Referring now to FIG. 7 an exemplary illustration of the process of extracting meta-data from documents 700, is described in more detail. The document fields 712 for an exhibit include fields such as Bates Number Range, Exhibit Number 706, Exhibit Date 704, Document Title, Exhibit Description 702, Hot Exhibit, and Security Specifications (such as Attorney Eyes Only—PO, Attorney Eyes Only—Source Code—PO, Confidential via Protective Order—PO, Third Party Confidential—PO, Secret, Other Confidential). When an exhibit is ingested into an inbound folder within CatchUp, the AI or Machine Learning models trained for extraction of meta-data extract fields such as exhibit date 704, exhibit description 702, exhibit number 706, bates number range 708 and security classification 710. Additional fields such as Comments, Type of Document (Email, Invoices, Data Sheets, Source Code), Additional Document Type Analytics, Other document features (source, reliability, usefulness), Access Permissions Level (1-10), Usage (Times Viewed), Versions may be added either through manual entry or automated extraction.

Figure 8:
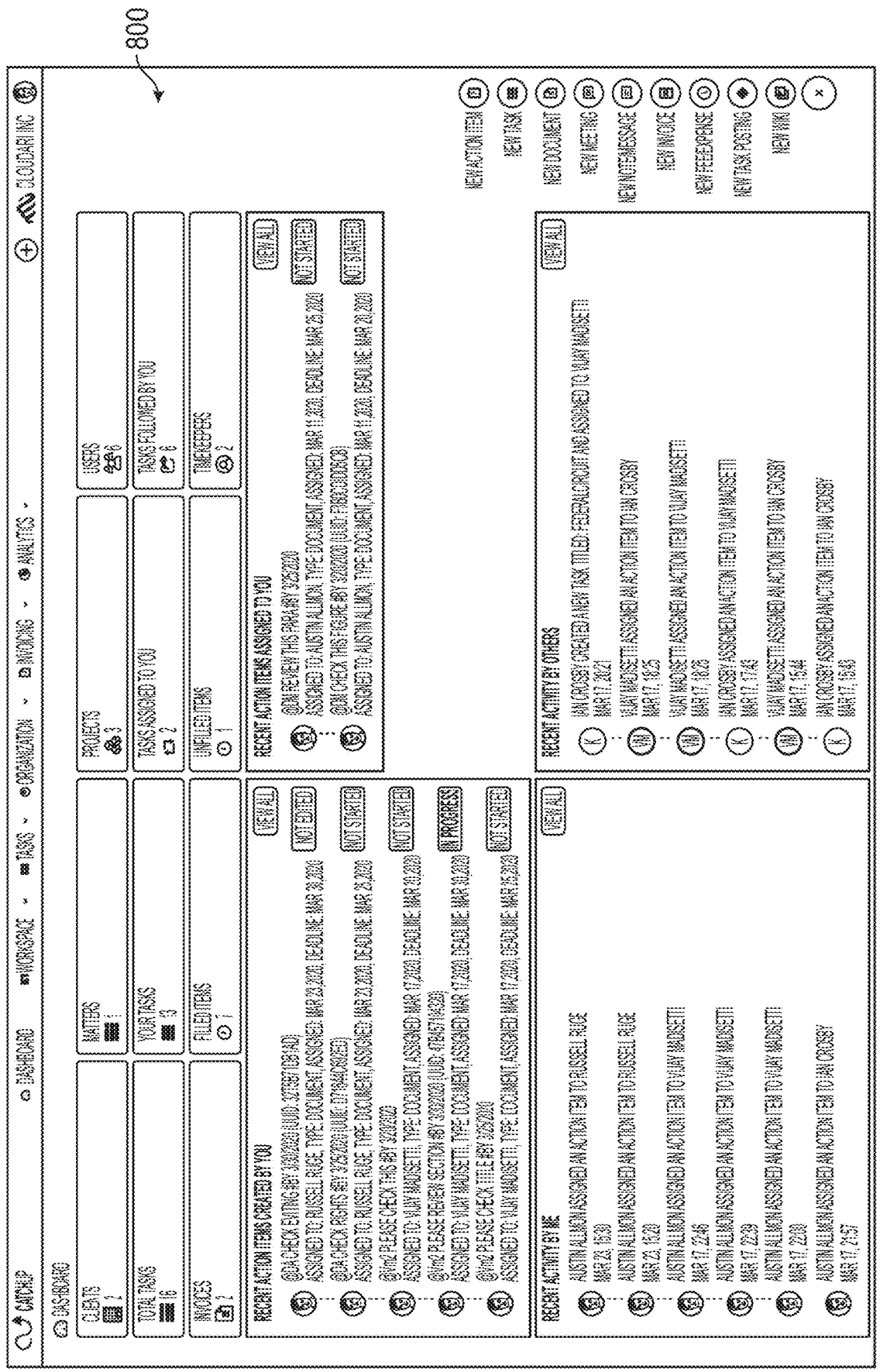
FIG. 8 is an exemplary interface of the CatchUp platform showing dashboard home page, according to an embodiment of the invention.

Referring now to FIG. 8 an exemplary interface 800 of the CatchUp platform showing dashboard home page, is described in more detail. CatchUp is packed with loads of features to enable effective collaboration within your business such as task scheduling, document management, file sharing, collaboration, real-time communications, reminders, calendar, wiki, resource planning, mapping to business and process-specific task flows, invoicing, advanced analytics, blockchain certifications and more. Within CatchUp each organization can have multiple clients. Each client can have multiple Business Specific Task Structures including matters, projects, tasks and users. CatchUp focuses on short term tasks that require coordination. Each task has a set of notes organized as a running timeline that is like a chat. Users can exchange notes for a particular task and add attachments to task notes. Users can provide immediate feedback, ask questions, request updates for tasks and add fee or expense items to tasks. The advanced analytics features in Catchup allow users to get a big picture on tasks and projects, generate a circle of knowledge and let the team members understand their roles. Users can share knowledge and unleash collective intelligence for your business through wiki and bulletin boards.

Figure 9:
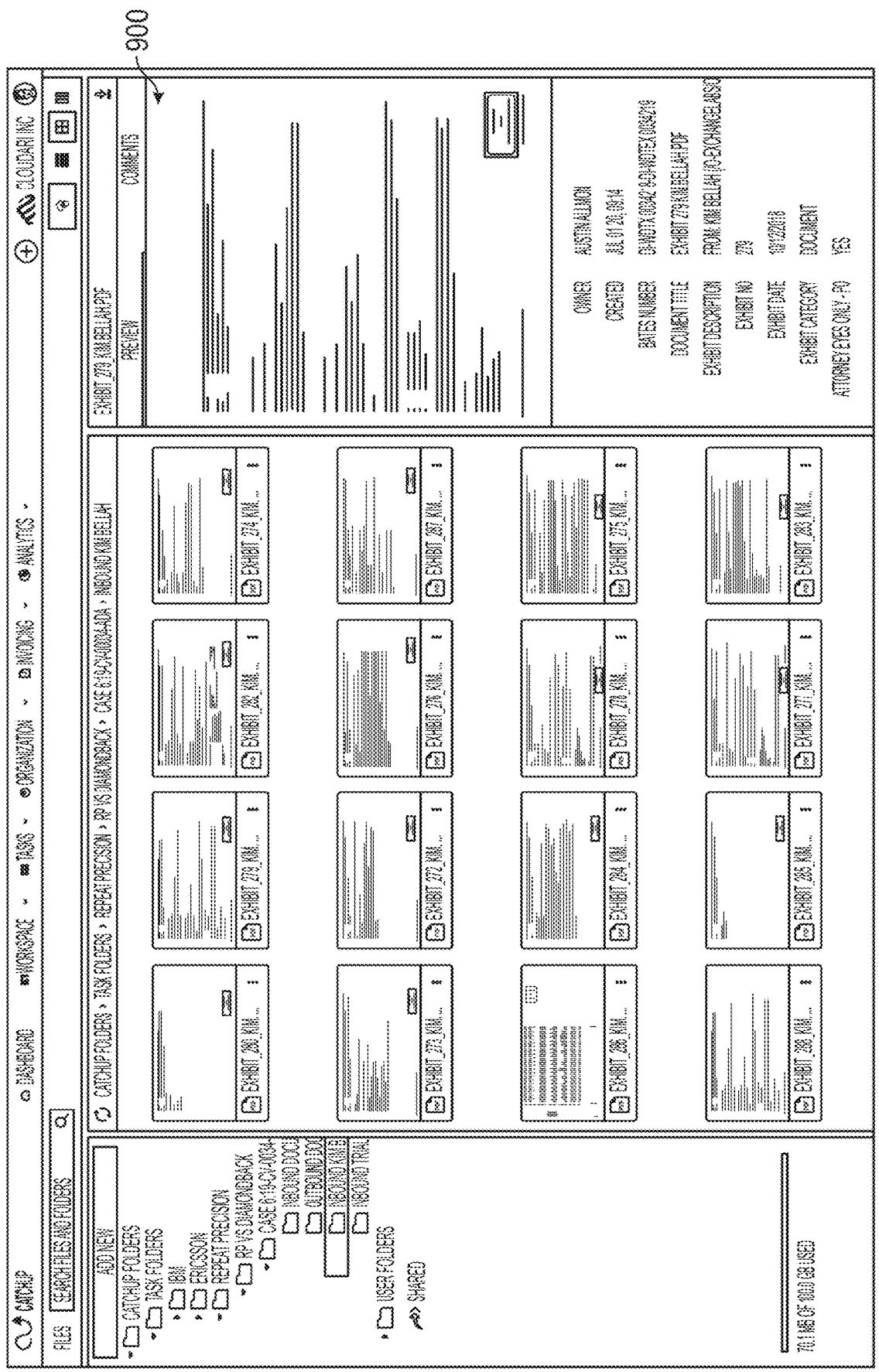
FIG. 9 is an exemplary interface of the CatchUp platform showing user and task folders with the document management system, according to an embodiment of the invention.

Referring now to FIG. 9 an exemplary interface of the CatchUp platform showing user and task folders with the document management system, is described in more detail. Catchup features an enterprise grade document management system to create, share and collaborate on documents in real-time. Within the documents view, users can browse documents within the task folders and user folders, view preview and details of a document and add comments to documents. The comments can either be visible to all users (public comments), or specific group of users (closed user group comments) or only a particular user (private comments). This selective visibility of comments is enabled by hashtags and mention codes within the comments.

From the Workspace→Documents page, open the task folder for the task created in step 6, as shown 900 in FIG. 9. Click on the Add New button and select Upload file option and select one or more files to upload to the task folder. When an exhibit is uploaded, CatchUp automatically extracts meta-data such as exhibit number, bates number range, exhibit date, exhibit description and security specification. You can view and edit this meta-data by right clicking on an exhibit and selecting the Document Fields option. Exhibits which are uploaded to a task folder related to task which has been linked to a specific event are automatically linked to the event. Whereas, exhibits which are uploaded to a task folder related to task which is not linked to any event can be manually linked to events by right clicking on the exhibit and selecting the Link to Event option.

Referring now to FIG. 10 an exemplary interface 1000 of the CatchUp platform showing events roster, is described in more detail. The events can be of types Deposition, Trial, Markman hearing, MSJ hearing, for instance. Events can have attributes such as witness name, date, attorney name, for instance.

Referring now to FIG. 11 an exemplary interface 1100 of the CatchUp platform showing event creation dialog, is described in more detail. In this dialog the event fields such as Event Type (Deposition, MSJ, Markman, Trial, Other), Date, Witness Name, Location, Attorney Name, Video (Yes/No), Signed (Yes/No), Corrected (Yes/No), Hard Copy (Yes/No), Disk (Yes/No), Added to Chron (Yes/No), Link to Transcript Rough, Link to Transcript Final, Link to Video, and Court Reporting Firm are entered.

Referring now to FIG. 12 an exemplary interface 1200 of the CatchUp platform showing court case creation dialog, is described in more detail. In this dialog the court fields such as Case Number, Judge, Clerk, Title of Case, People, Plaintiff, Petitioner, Defendant, Respondent, Court, Date Filed, Linked Cases, Lawfirm Plaintiff and Lawfirm Defendant are entered.

Figure 13:
FIG. 13 is an exemplary interface of the CatchUp platform showing document to event linking dialog, according to an embodiment of the invention.

Referring now to FIG. 13 an exemplary interface 1300 of the CatchUp platform showing document to event linking dialog, is described in more detail. In this dialog the linking fields such as Link Type, Event, Deposition Exhibit No, Trial Exhibit No, Exhibit Category, Trial Exhibit (Yes/No), Marked (Yes/No), Offered (Yes/No), Objection (Yes/No) and Admitted (Yes/No) are entered.

Referring now to FIG. 14 an exemplary interface 1400 of the CatchUp platform showing exhibit analytics, is described in more detail. In the Exhibit Analytics page, the user selects a client, matter and project and then clicks on load button. A list of exhibits and events and the linking of exhibits to events is displayed to the user. Use can then export an excel list of exhibits or download a zip archive of exhibits.

Figure 15:
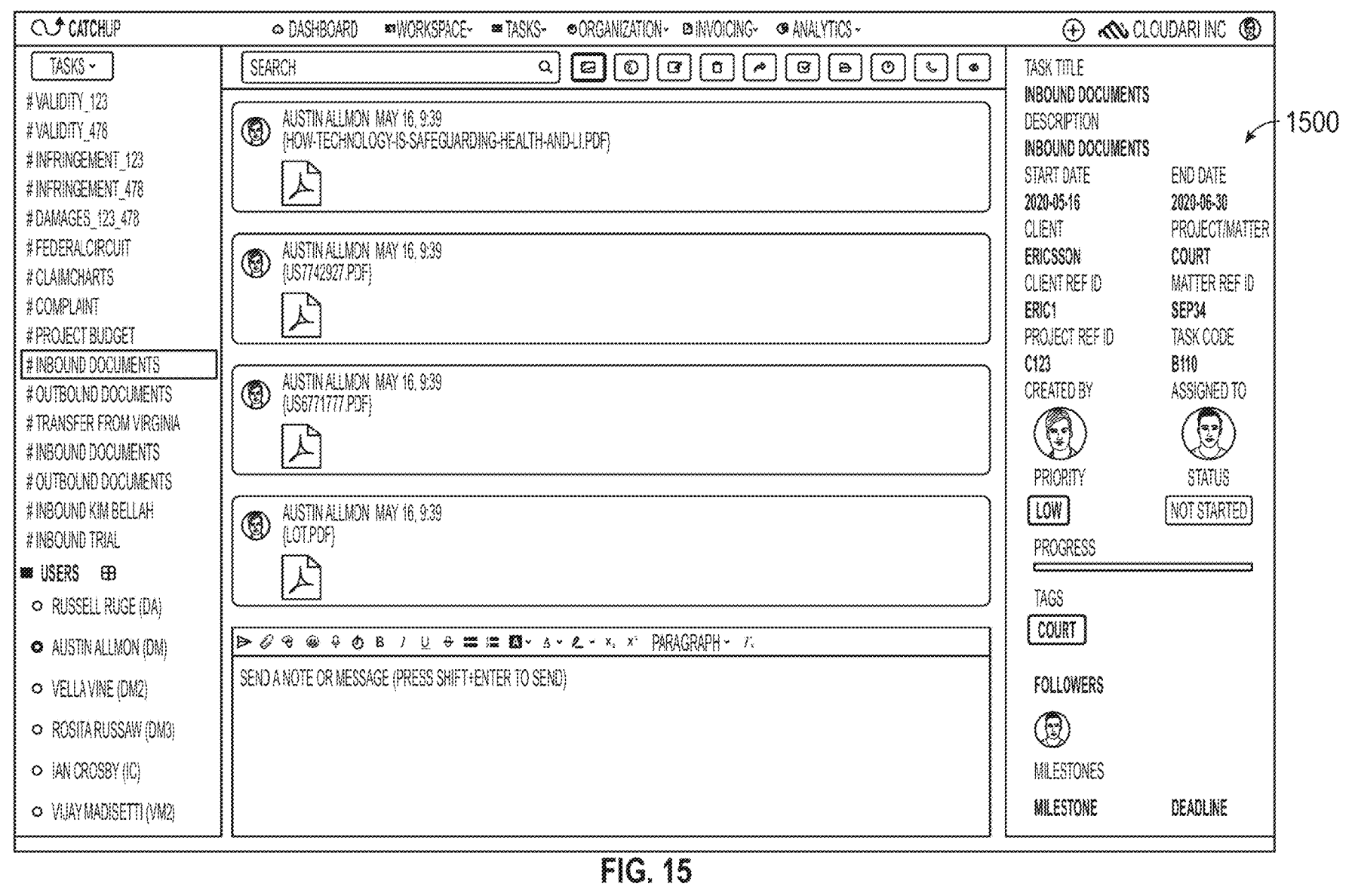

Referring now to FIG. 15 an exemplary interface 1500 of the CatchUp platform showing task notes and real-time communication, is described in more detail. CatchUp focuses on short term tasks that require coordination. Tasks can be filtered by user (creator, assignee or follower), client, project, matter and tags. Tasks have a set of notes organized as a running timeline that is like a chat. Attachments can be added to the task notes. Users can provide immediate feedback, ask questions, request updates for tasks and add fee or expense items to tasks.

Figure 16:
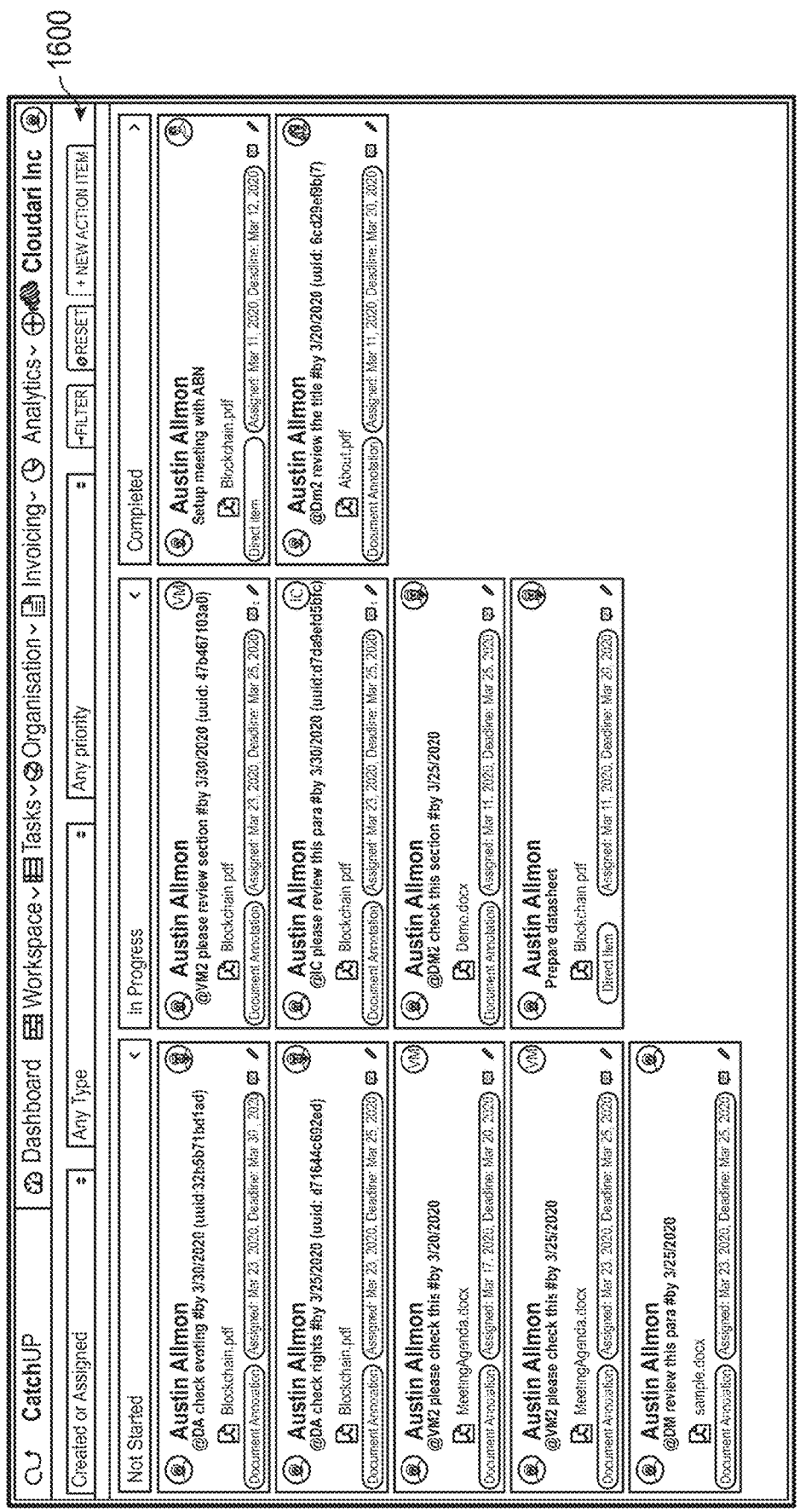
FIG. 16 is an exemplary interface of the CatchUp platform showing kanban view of action items, according to an embodiment of the invention.

Referring now to FIG. 16 an exemplary interface 1600 of the CatchUp platform showing kanban view of action items, is described in more detail. In the kanban view the action items are organized into three columns: Not started, In progress and completed. A user to whom an action item is assigned can update the status of an action item either by double clicking the item or by dragging and dropping the action item card to a different column. Users can add comments to action items. The comments can either be visible to all users (public comments), or specific group of users (closed user group comments) or only a particular user (private comments). This selective visibility of comments is enabled by hashtags and mention codes within the comments.

Figure 17:
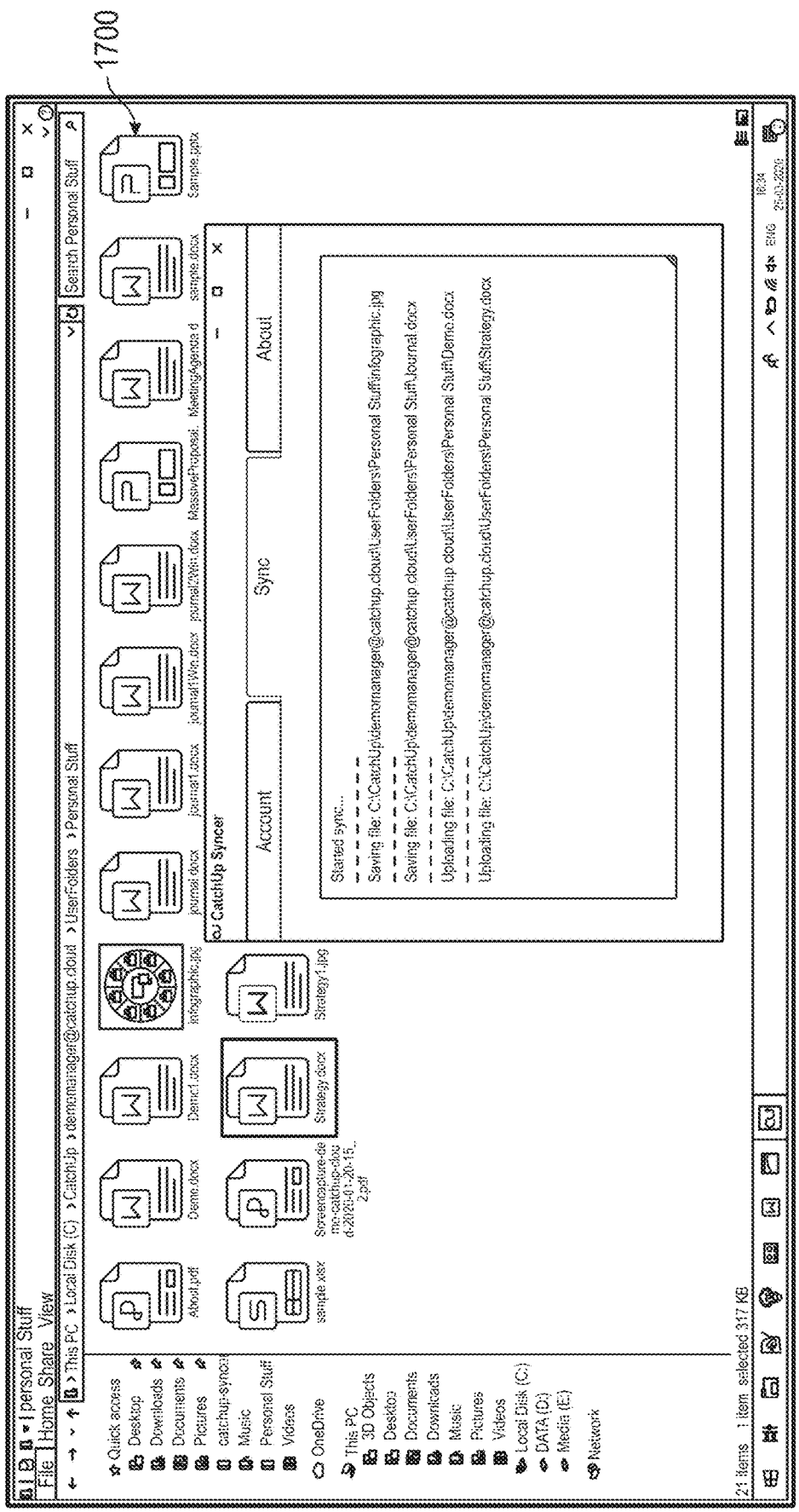
FIG. 17 is an exemplary interface of the CatchUp syncer application, according to an embodiment of the invention.

Referring now to FIG. 17 an exemplary interface 1700 of the CatchUp syncer application, according to an embodiment of the invention. CatchUp syncer is a desktop application which syncs CatchUp folders to user's desktop. CatchUp syncer supports two-way sync from Cloud to Local or from Local to Cloud. When a user launches the CatchUp syncer application and logs into his account the files in the user's Task Folders and User Folders in Catchup Cloud are synced to local machine. When any file is edited or updated in the user folders in Catchup Cloud the newer version of the file is synced to local machine. A user can open an Office document (docx, pptx, xlsx) in any desktop office application (such as MS Office or OpenOffice) and edit the document. When the document is saved it is synced to the CatchUp cloud. If a user copies a new file to a local sync folder the file is uploaded to the cloud.

Figure 18:
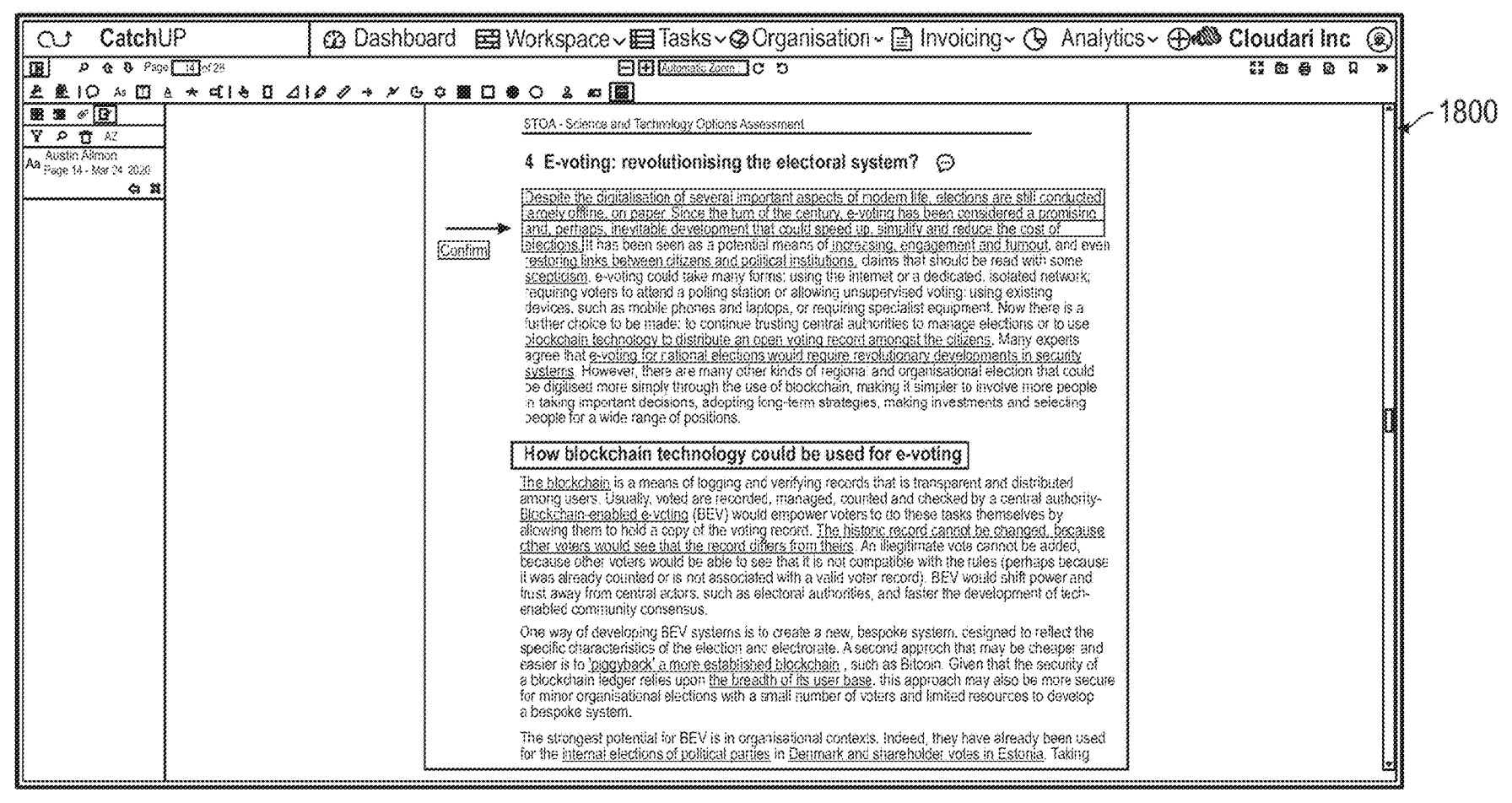

Referring now to FIG. 18 an exemplary interface 1800 of the CatchUp Glass Viewer for PDF documents, is described in more detail. CatchUp Glass Viewer is a document editor application is used to view, edit, comment and annotate documents. The comments and annotations are saved separately outside the PDF document in a meta-data database within the CatchUp cloud. When a document is opened with the Glass Viewer the document is fetched from the cloud storage and comments/annotations are fetched from the meta-data database and rendered in a layer above the document.

Figure 19:
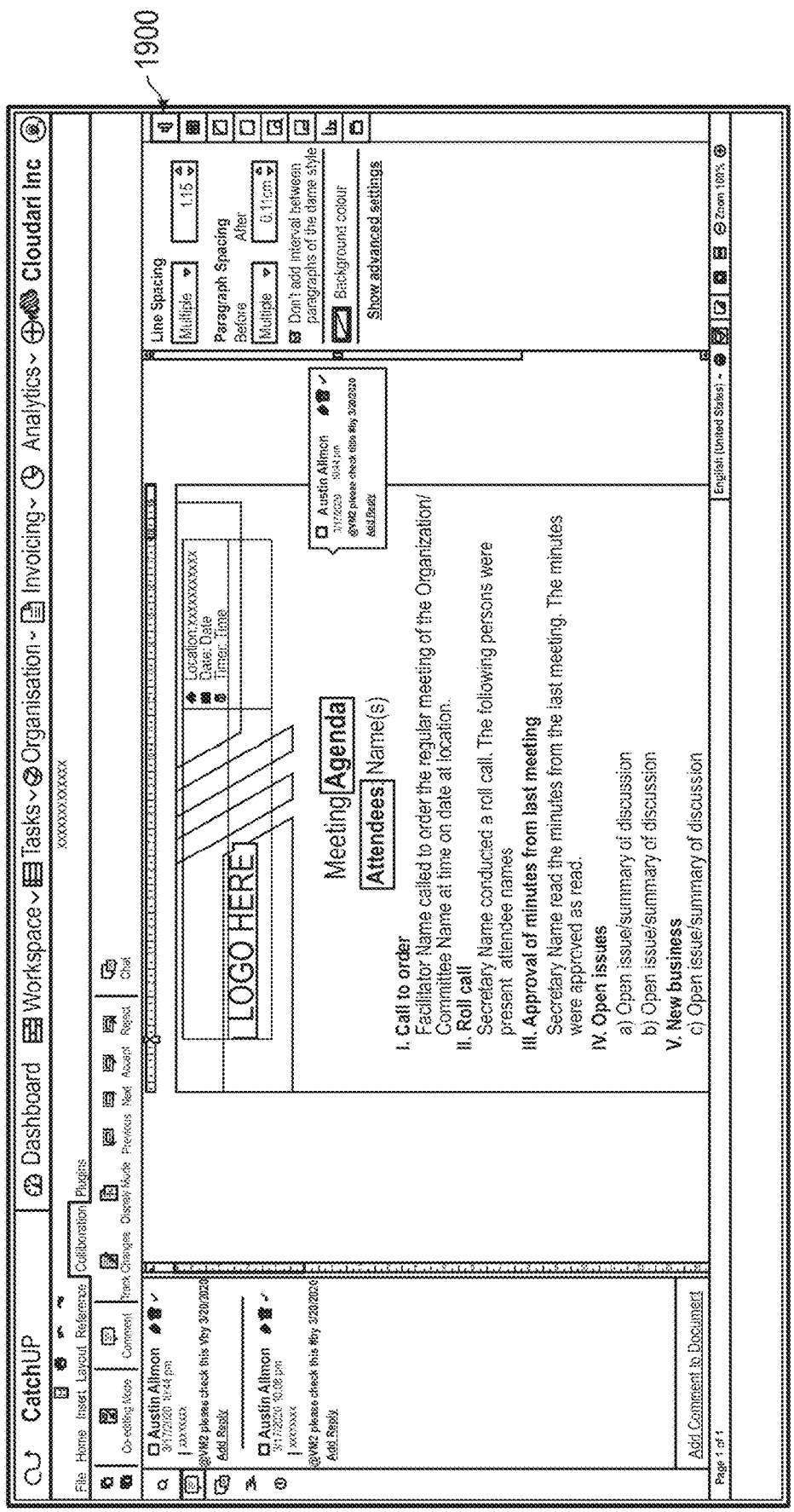
FIG. 19 is an exemplary interface of the CatchUp Glass Viewer for office format documents, according to an embodiment of the invention.

Referring now to FIG. 19 an exemplary interface 1900 of the CatchUp Glass Viewer for office format documents, is described in more detail.

Figure 20:
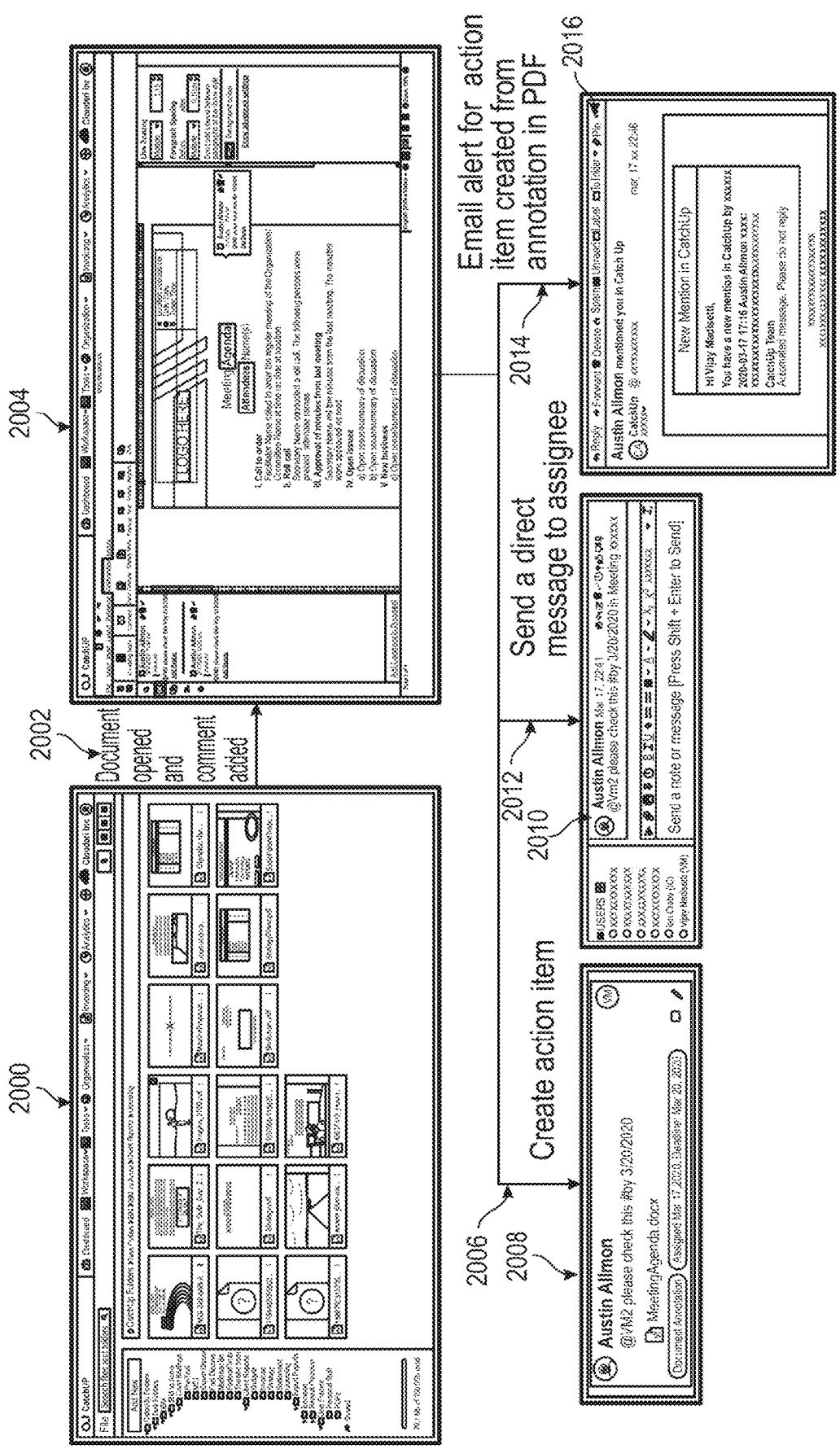
FIG. 20 is an illustration of the online process for creating action items and alerts from comments in office documents, according to an embodiment of the invention.

Referring now to FIG. 20 an illustration of the online process for creating action items and alerts from comments in office documents, is described in more detail. A user can browse a documents within the user or task folders using the CatchUp document management interface 2000 and open a PDF or Office format document in CatchUp GlassViewer web application 2004 and add comments and annotations to the document 2002. Within a comment the user can mention another user and assign some action item with deadline and optional number of hours. For example, "@AB spend #hours 2-3 on reviewing this section #by 3/25/2020". When the annotations are saved the comments are parsed and action items are created 2006. The action item can be seen from the Kanban view 2008. The CatchUp Server may send a direct message 2012 with the CatchUp messaging view 2010 and also may send 2014 an email alert 2016 when the action item is created.

Figure 21:
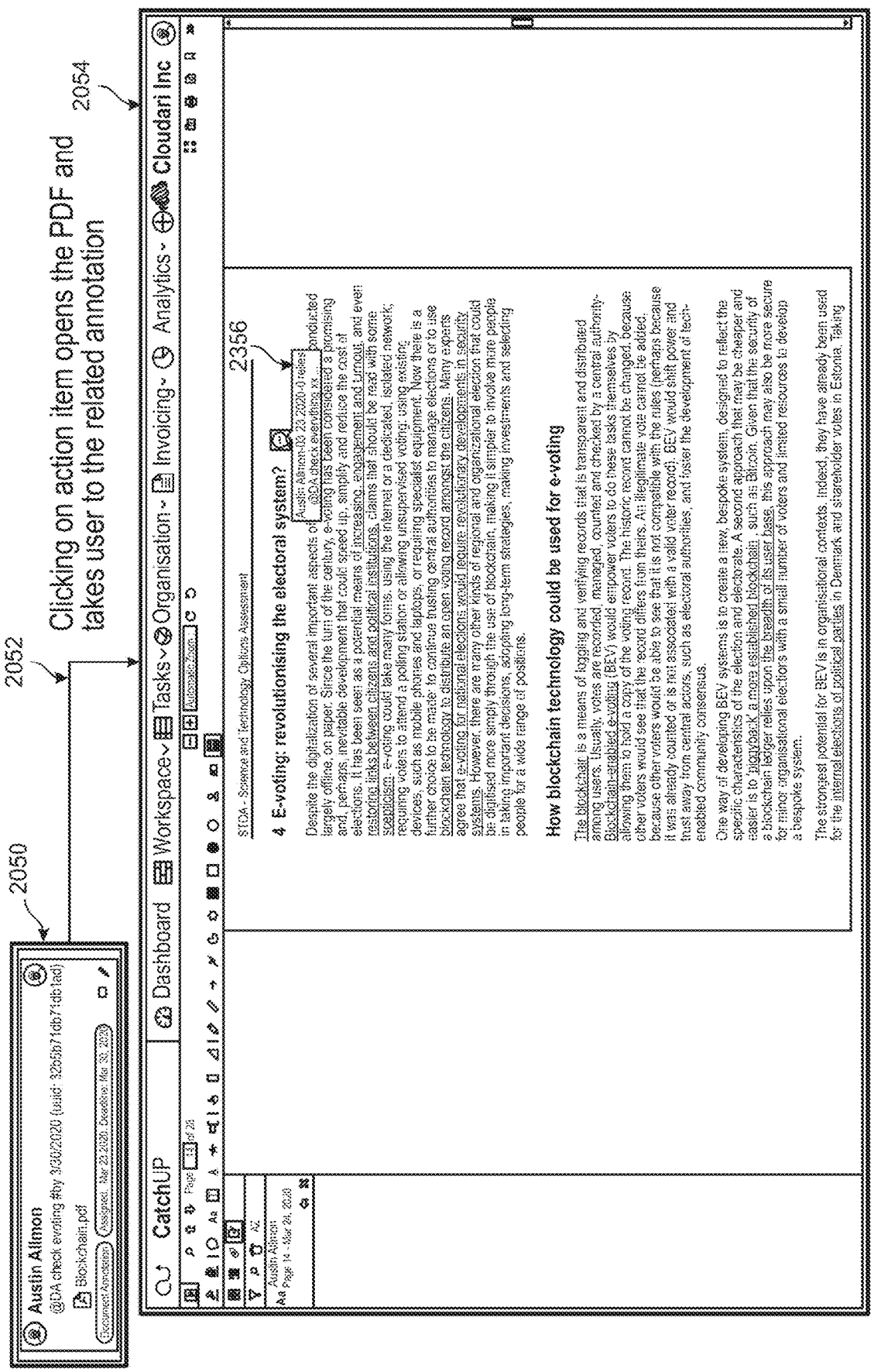
FIG. 21 is an illustration of the linking between an action item and the corresponding annotation within a document, according to an embodiment of the invention.

Referring now to FIG. 21 an illustration of the linking between an action item and the corresponding annotation within a document, is described in more detail. From the Kanban view 2050, when the user clicks an action item 2052, it opens the document within the CatchUp Glass Viewer 2054 and jumps directly to the related annotation/comment 2056.

Figure 22:
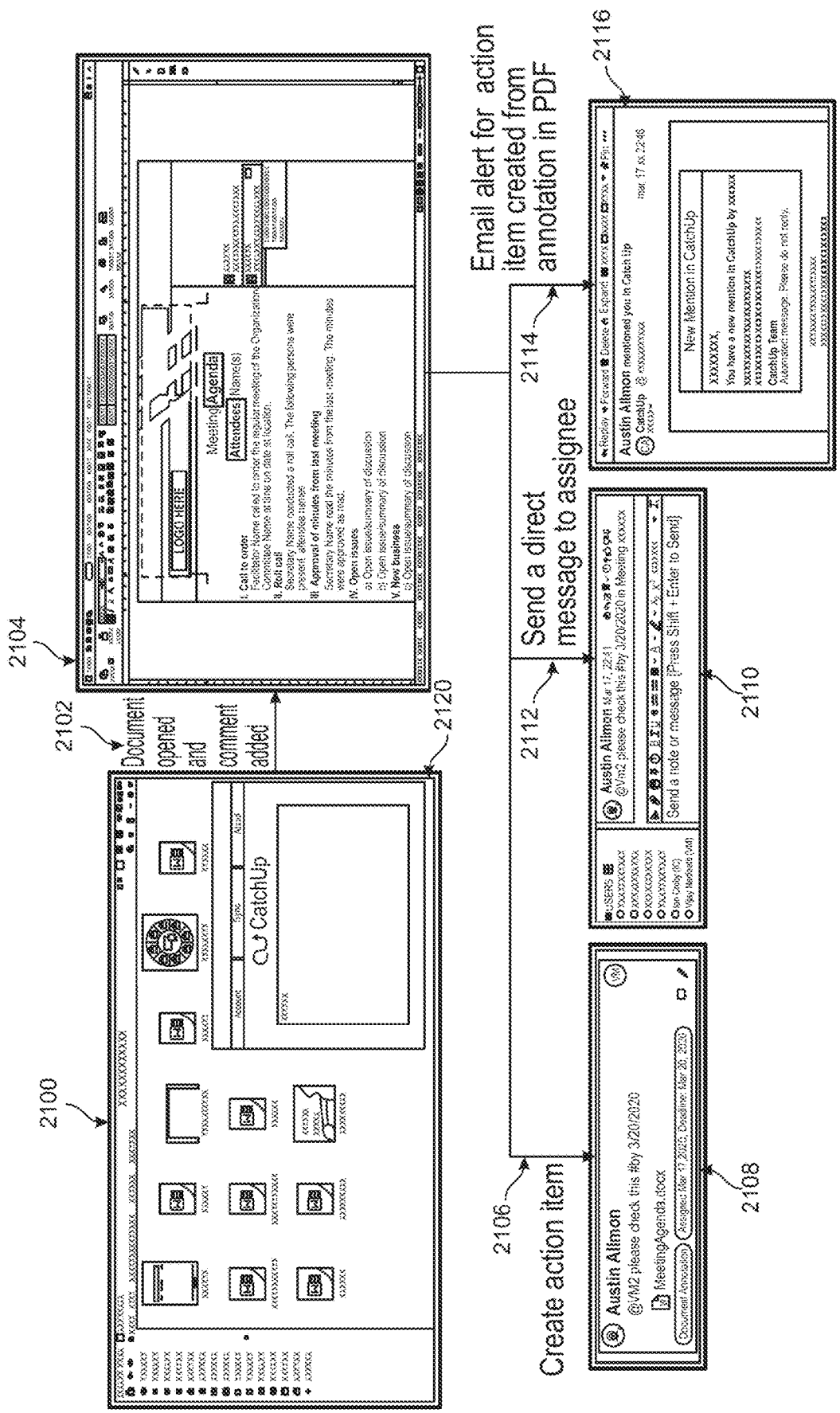
FIG. 22 is an illustration of the offline process for creating action items and alerts from comments in office documents, according to an embodiment of the invention.

Referring now to FIG. 22 an illustration of the offline process for creating action items and alerts from comments in office documents, is described in more detail. A user can browse a documents within the user or task folders synchronized to the user's local machine 2100 using the CatchUp syncer application 2120 and open a PDF or Office format document in a native desktop application 2104 and add comments and annotations to the document 2102. Within a comment the user can mention another user and assign some action item with deadline and optional number of hours. For example, "@AB spend #hours 2-3 on reviewing this section #by 3/25/2020". When the document is saved it is synced to the CatchUp cloud by the CatchUp syncer application 2120.

The comments from the synced document are parsed and action items are created 2106. The action item can be seen from the Kanban view 2408. The CatchUp Server may send the user a direct message 2112 with the CatchUp messaging view 2410 and also may send 2114 an email alert 2416 when the action item is created.

Figure 23:
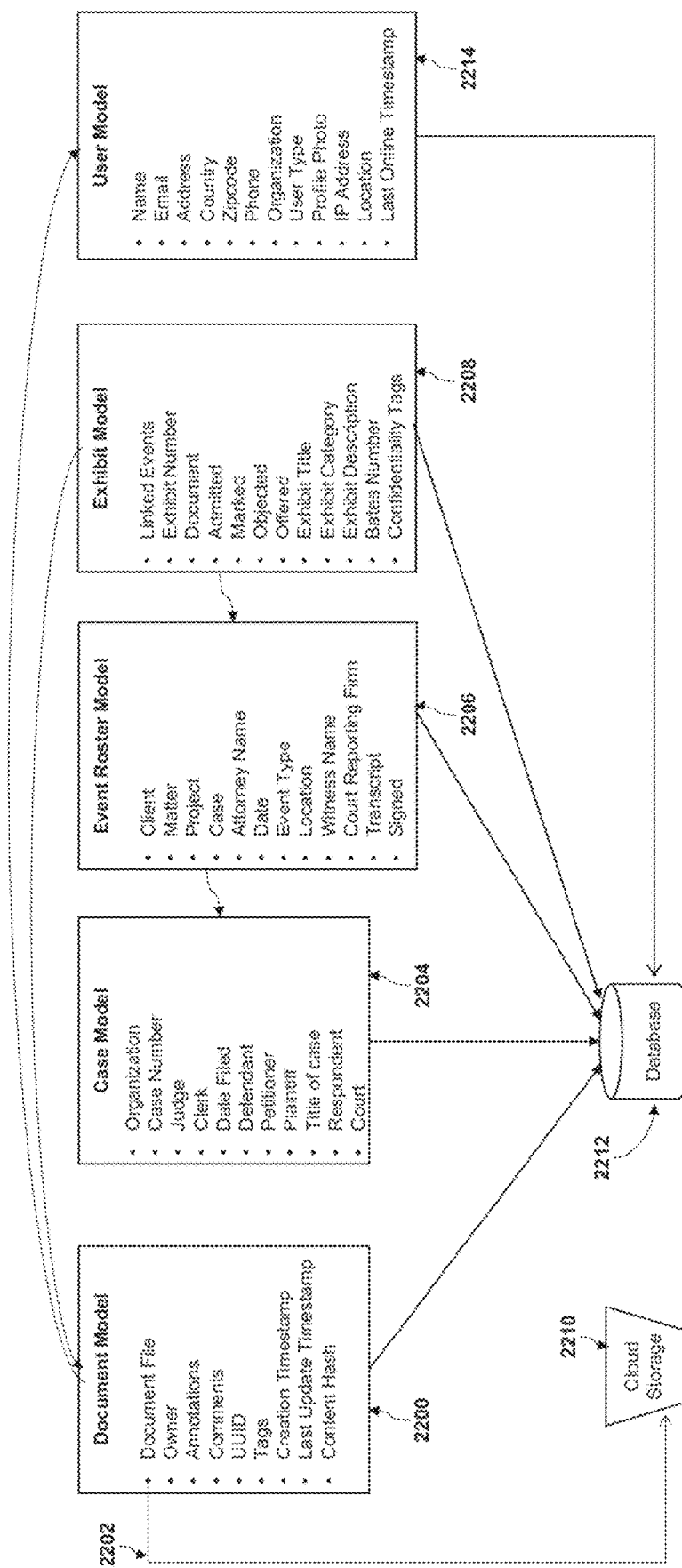
FIG. 23 is a schematic view of data structures maintained within CatchUp for linking of documents to events, according to an embodiment of the invention.

Referring to FIG. 23, the data structures maintained within CatchUp for linking of documents to events, are described in more detail. The Document model data structure 2200 includes a link to the document file which is stored in a Cloud Storage 2210, and additional fields such as Owner, Annotations, Comments, UUID, Tags, Creation Timestamp, Last Update Timestamp and Content Hash. The case details are stored in a separate Case model 2204. The Case model 2204 includes fields such as Organization, Case Number, Judge, Clerk, Date Filed, Defendant, Petitioner, Plaintiff, Title of case, Respondent and Court. The Event Roster model 2206 stores event details and includes fields such as Client, Matter, Project, Case, Attorney Name, Date, Event Type, Location, Witness Name, Court Reporting Firm, Transcript and Signed. The Exhibit Roster model 2208 stores exhibit details and includes fields such as Linked Events, Exhibit Number, Document, Admitted, Marked, Objected, Offered, Exhibit Title, Exhibit Category, Exhibit Description, Bates Number and Confidentiality Tags. While the document file is stored in cloud storage 2210, the document meta-data and document-event linking information is stored in a database 2212. Each of the models may be stored as records in respective databases comprised by the server or within the database 2212.

Figure 24:
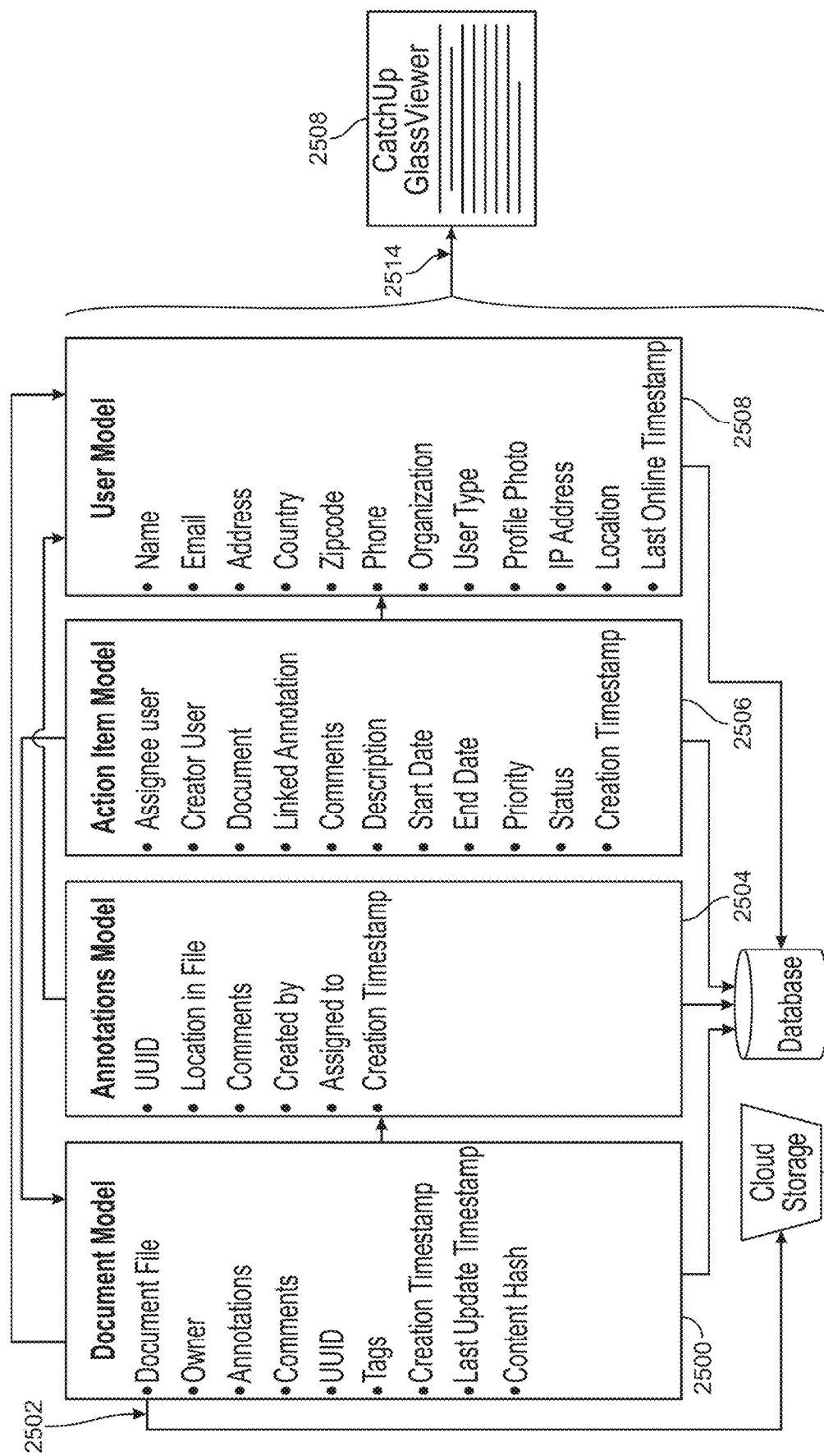
FIG. 24 is a schematic view of data structures maintained within CatchUp for linking of documents to events, according to an embodiment of the invention.

Referring to FIG. 24, data structures maintained within CatchUp for annotations and action items linked to documents, are described in more detail. The document model data structure 2500 includes a link to the document file which is stored in a Cloud Storage 2510, and additional fields such as Owner, Annotations, Comments, UUID, Tags, Creation Timestamp, Last Update Timestamp and Content Hash. The document annotations are stored in a separate Annotations model 2504. The Annotation model 2504 includes fields such as UUID, Location in File, Comments, Created by, Assigned to and Creation Timestamp. The Actions Items created by processing annotations and comments are stored in the Action Item Model 2506. The Action Item model 2506 includes fields such as Assignee User, Creator User, Document, Linked Annotation, Comments, Description, Start Date, End Date, Priority, Status, and Creation Timestamp. The Document, Annotations and Action Item models reference the User Model 2508 which includes fields such as Name, Email, Address, Country, Zipcode, Phone, Organization, User Type, Profile Photo, IP Address, Location, and Last Online Timestamp. While the document file is stored in cloud storage 2510, the document meta-data and annotations are stored in a database 2512. When a document is accessed within the CatchUp Glassviewer, the annotations are rendered in a layer above the document at specific locations.

Referring to the two figures above, the linked data structures allow optimization of resources and speed up computer operations through the merged processing and also allow allocation of faster storage to the more frequent tasks and documents. The use of the multiple data structures and linking between them greatly improves the operation of the computing system, since extensive searching, lookup and calculation is avoided through use of these dynamic links that are evaluated through the linked structures. Unlike previous approaches the linked data structures show which files are most used by the user and can be used to store these files in online and faster storage. Also, files used in secure events can be stored more securely. The linked tables allows offloading to specialized processors and learning networks resulting in 30-50 percent improvement in computer performance.

Figure 25:
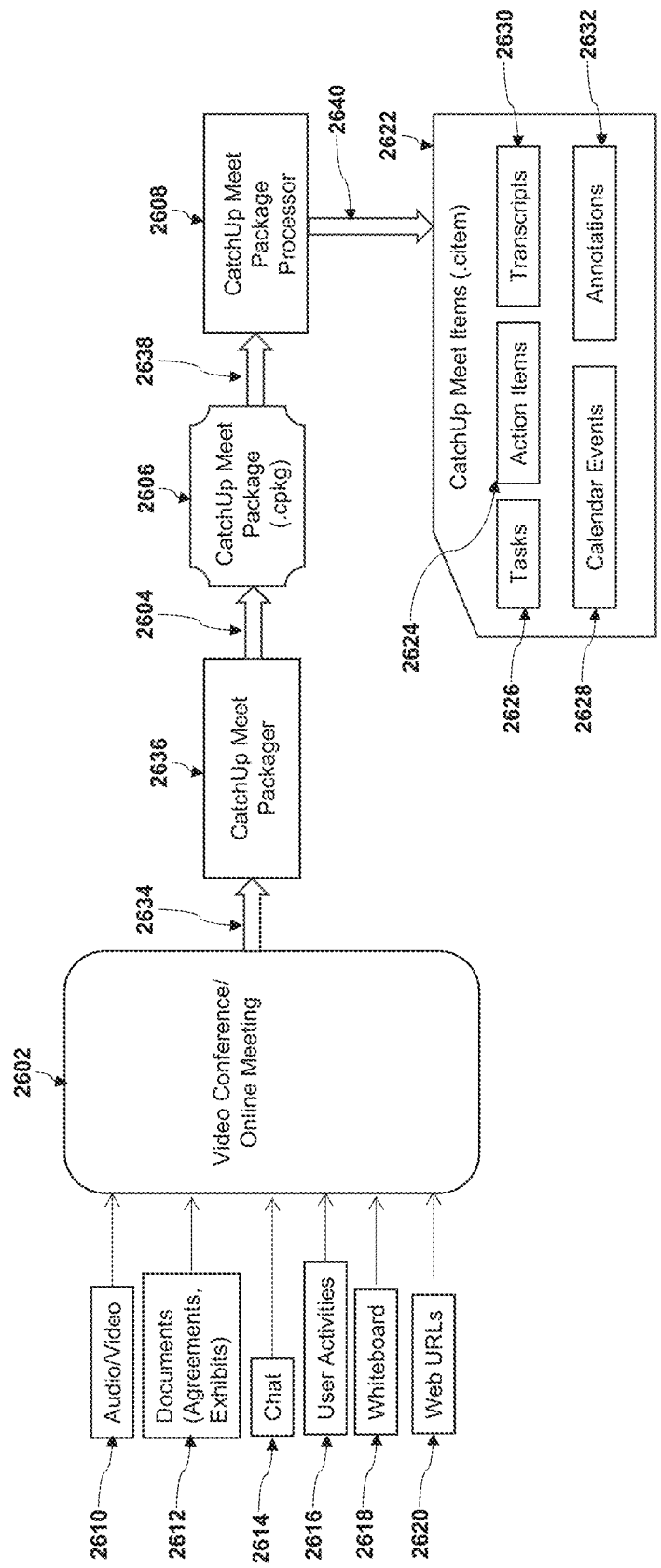
FIG. 25 is an illustration of the creation of CatchUp Meet Package and Items according to an embodiment of the invention.

Referring to FIG. 25, the CatchUp Meet Package and CatchUp Meet Items, are described in more detail. A Video Conference or Online Meeting 2602 comprises audio/video 2610 and may include documents (such as agreements, exhibits and other types) 2612, chat messages sent by participants 2614, user activities (such as questions asked, agreements, votes or any other type) 2616, whiteboard shared during the meeting 2618, and web URLs shared during the meeting 2620. The CatchUp Meet Packager 2636 receives 2634 and packages 2604 video conference/online meeting 2602 along with the audio/video 2610, documents 2612, chat 2614, user activities 2616, whiteboard 2618, web URLs 2620 and any other items shared by the participants in the meeting into a package/archive, referred to as the CatchUp Meet Package 2606 (with .cpkg file extension). The CatchUp Meet Package (.cpkg file) 2606 is a recording of the meeting along with all the items shared. The CatchUp Meet Package Processor 2608 accepts 2638 the CatchUp Meet Package (.cpkg file) as input and generates 2640 a CatchUp Meet Items file 2622 (with .citem file extension). The CatchUp Meet Package Processor 2608 utilizes AI, Machine Learning, Image Processing, Audio/Video Processing and Search tools for generating transcripts from audio/video and recognize use of certain phrases (such as CatchUp, generate an action item for user XYZ, for instance). Reference to the related documents, URLs, chat messages may be linked to the audio/video and the corresponding transcript. The CatchUp Meet Package Processor generates Transcripts 2630, Tasks 2626, Action Items 2624, Calendar Events 2628, Annotations 2632 and establishes links/references between them.

Figure 26:
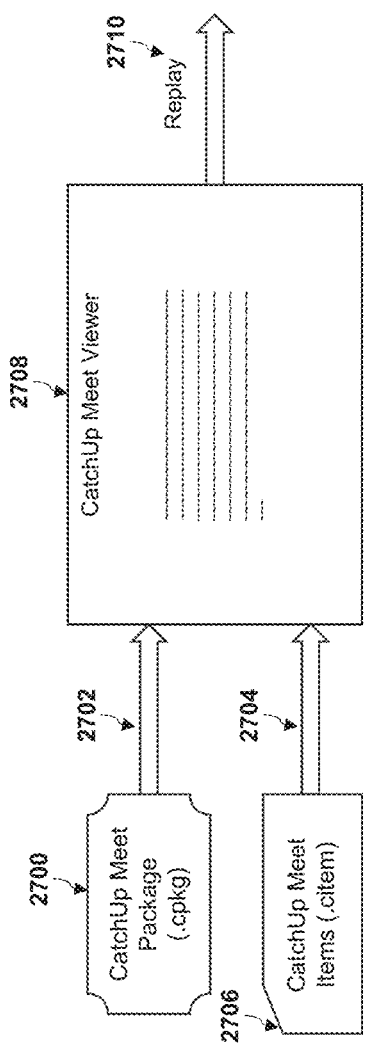
FIG. 26 is an illustration of the replay of CatchUp Meet Package and Items in a CatchUp Meet Viewer according to an embodiment of the invention.

Referring to FIG. 26, the CatchUp Meet Viewer, is described in more detail. The CatchUp Meet Package (.cpkg file) 2700 and CatchUp Meet Items (.citem file) 2706 together allow maintaining the full copies of a video conference/online meeting along with the documents, chat, user activities, whiteboard, web URLs uploaded/used during the meeting, and the Transcripts, Tasks, Action Items, Calendar Events, Annotations that are generated by doing post processing, such that these items are linked to the transcript and are accessible 2702, 2704 and "playable" 2710 along with the video/audio using a CatchUp Meet Viewer 2708.

Figure 27:
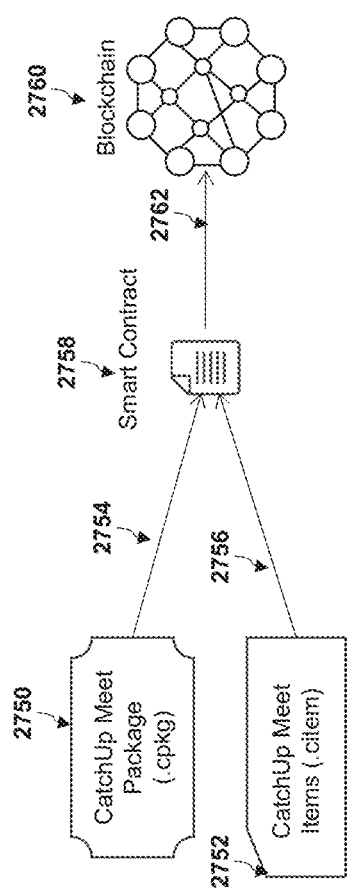
FIG. 27 is an illustration of the certification of CatchUp Meet Package and Items and deployment in a smart contract on a blockchain network according to an embodiment of the invention.

Referring to FIG. 27, the process of certification of CatchUp Meet Package and CatchUp Meet Items on a blockchain, is described in more detail. The CatchUp Meet Package (.cpkg file) 2750 comprising full copies of the audio/video meeting and the documents, chat, user activities, whiteboard, web URLs uploaded/used during the meeting and the CatchUp Meet Items (.citem file) 2752 comprising the Transcripts, Tasks, Action Items, Calendar Events, Annotations that are generated by doing post processing can be hashed, timestamped and certified on a blockchain 2760 by recording the hashes 2754, 2756 within a Smart Contract 2758 that is deployed 2762 on the blockchain or recorded as extra data along with a transaction sent to the blockchain.

Figure 28:
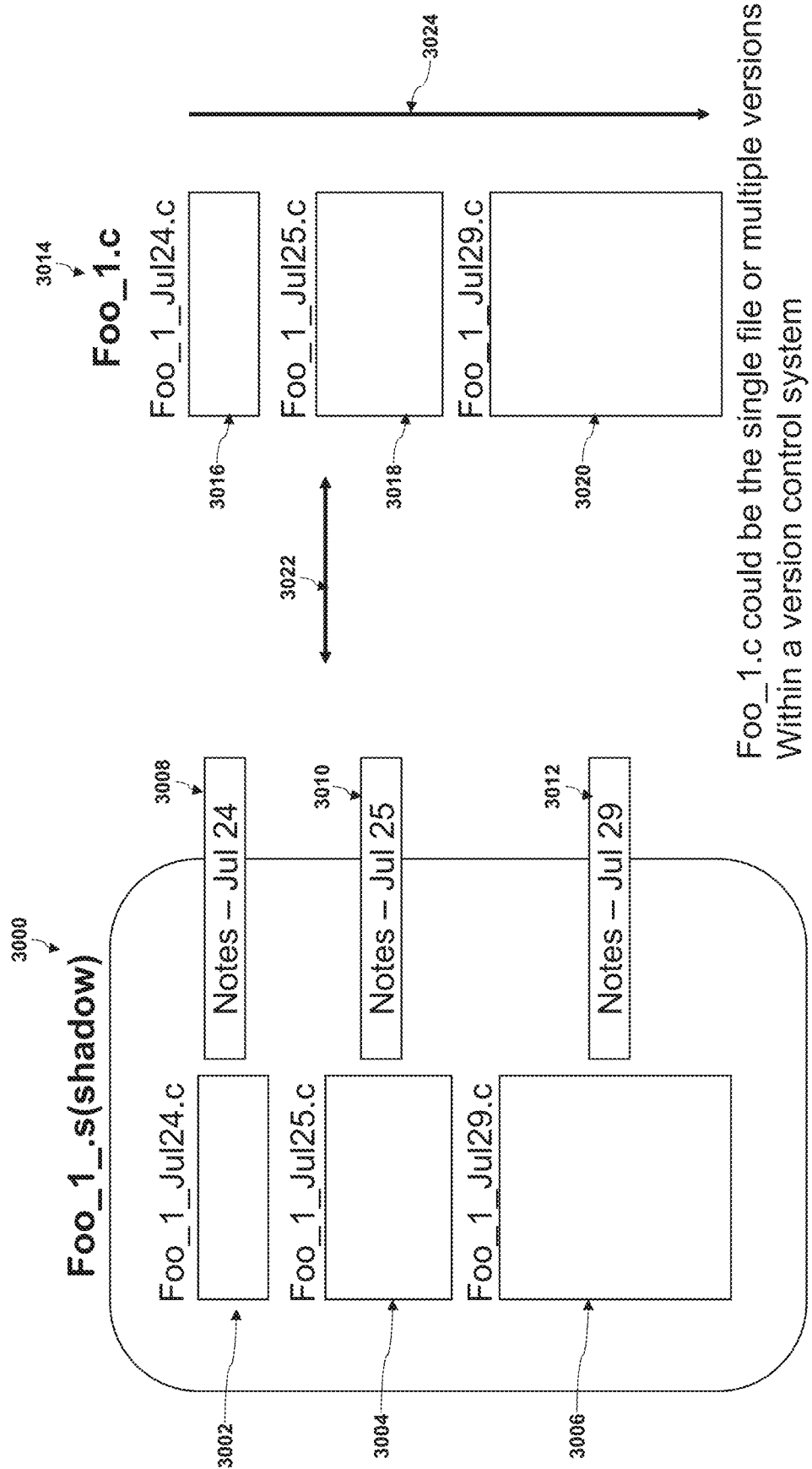
FIG. 28 is an illustration of shadow file with parent folder, according to an embodiment of the invention.

Referring to FIG. 28, an illustration of shadow file with parent folder, is described in more detail. The CatchUp code collaboration tools are integrated with environments that software engineers are comfortable with, such as Git, GitHub, GitLab, BitBucket, VCS, Perforce, and Visual Studio. For each code folder and file 3014, there is a shadow folder and shadow file 3000, along with optional versions merged or abstracted into the shadow file. The shadow folder and file 3000 will be linked logically 3022 (and/or physically) to the original folder and code file 3014. The CatchUp code collaboration tools (including GlassViewer for Code) open the shadow files when the original code file is clicked upon, and store any comments and notes 3008, 3010, 3012 entered by users, by timestamp and by lines of code referenced. As the code file is changed 3024, e.g. originating with a first version of the code 3016, a second version of the code 3018, and a third version of the code 3018, at least one of the new code and the entire file is appended to the shadow code file along with timestamps, such that the shadow code file will comprise a first plurality of lines of code 3002, a second plurality of lines of code 3004, and a third plurality of lines of code 3006 that each correspond to the versions of the code 3016, 3018, 3020 comprised by the code file 3014. The appending to the shadow code file can be done based on a time interval, a code size duration, upon manual triggering by the user, and by any other method or criteria condition as may be known in the art. For example, the new version of the code file 3018, 3020 could be appended to the shadow file 3004, 3006 for that code file every 7 days or 15 days, assuming certain conditions of change occur. Types of change conditions include, but are not limited to, changes to a threshold proportion of the code file, changes to a threshold number of lines of code comprised by the code file, elapsing of a length of time, creation of a new version of the code file, and combinations thereof. There may be no need to append a file that has not changed, for example. Comments are attached to certain lines in certain versions of the code file embedded in the shadow file.

Figure 29:
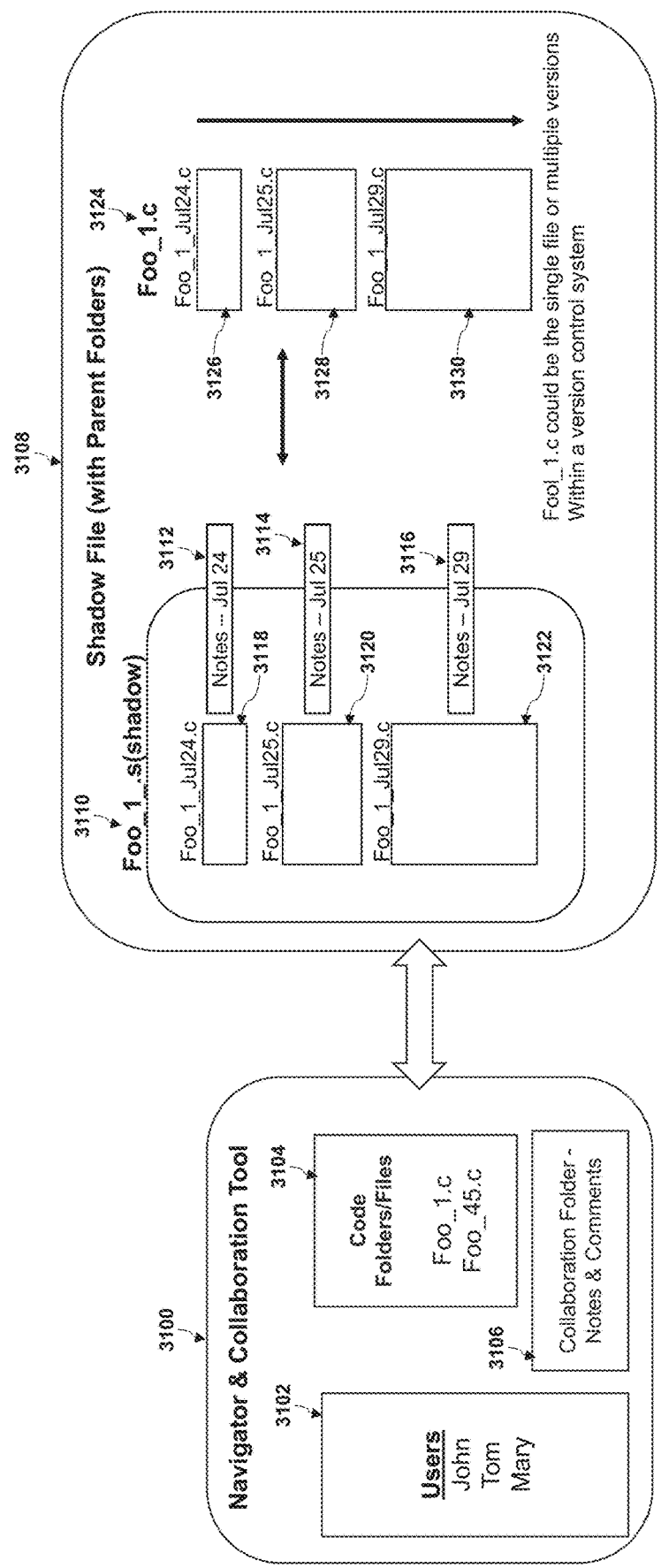
FIG. 29 is an illustration of the navigator and collaborative features in CatchUp, according to an embodiment of the invention.

Referring to FIG. 29, an illustration of the navigator and collaborative features in CatchUp, is described in more detail. The shadow files 3110 and folders 3108 can be modified and analyzed without modifying the actual source code files 3126, 3128, 3130. The source code files 3126, 3128, 3130 may be incrementally added to the shadow code file as corresponding pluralities of code 3112, 3114, 3116. Files or folders 3104 can be checkpointed into it or appended to the shadow folder 3108 over time. The rich notes, design details, and other collaborative information 3106 entered by different users can provide insight. When users 3102 click on certain portions of the source code files 3104 on the right, the CatchUp code collaboration tools 3100 can refer to those portions in the shadow file and extract the linked comments and notes and present them through a rich user interface to the team.

Figure 30:
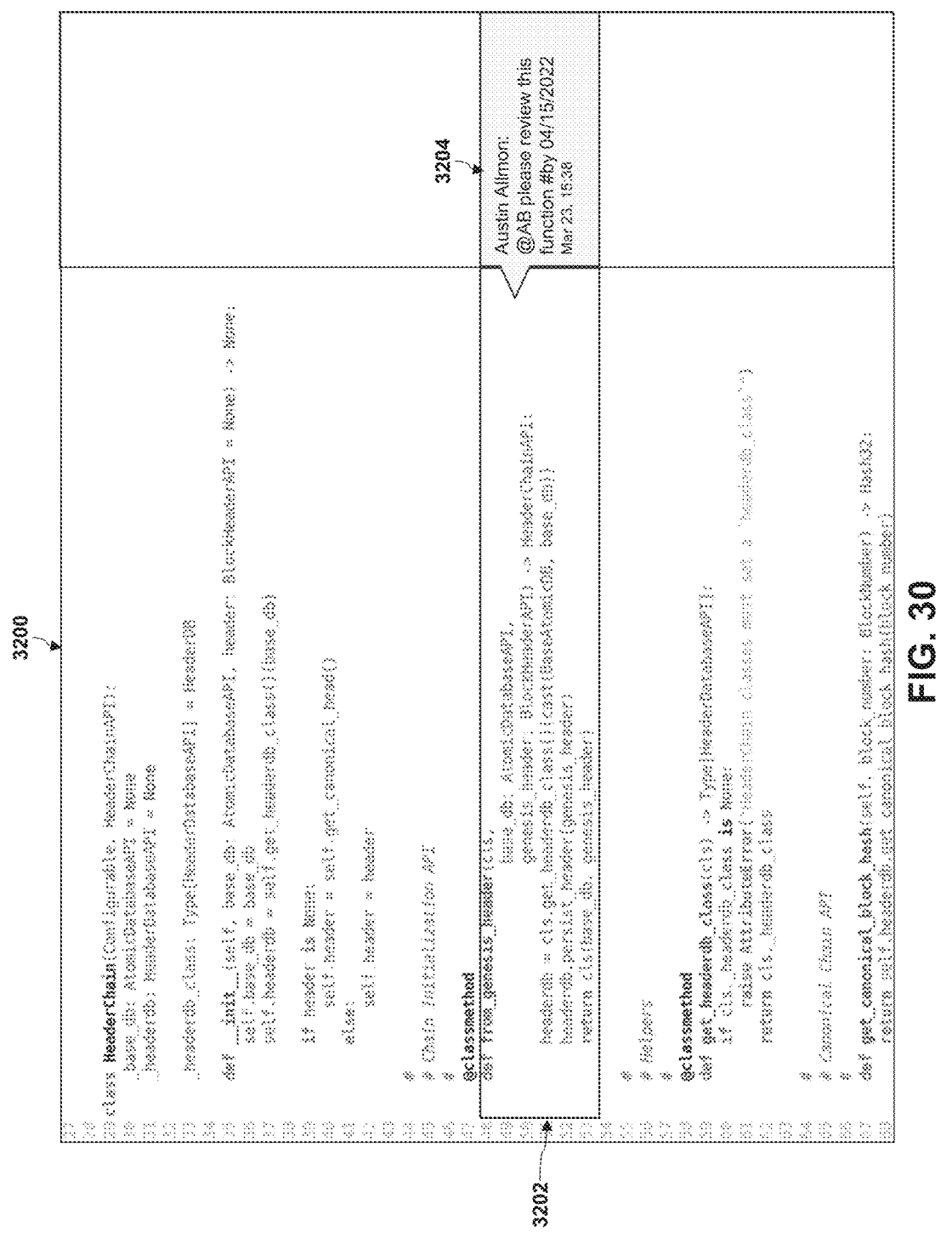

Referring to FIG. 30, an illustration of the CatchUp GlassViewer for Code Collaboration, is described in more detail. The GlassViewer 3200 allows annotating and commenting 3204 the shadow source code files, namely one or more lines of code comprised thereby 3202, linked to the original code files without modifying the actual source code files. In one embodiment, the shadow file can be a PDF file that keeps an appended record of comments made to the code. Whenever changes are made to the code file, it is appended to the shadow PDF file and the pointer to the active pages in the shadow file are updated. The original comments are still linked to the earlier PDF pages that are inactive. For example, if the code file is two pages long, and comments are made to the first two pages, then a two page PDF file comprising a first plurality of shadow code lines that correspond to each code line of a plurality of code lines comprised by the code file as originally saved is created, and when the code file is increased from two pages to four pages, and comments are added to pages 3 and 4, the shadow PDF is increased to six pages and the comments on pages 3 and 4 are moved to a second plurality of shadow code lines comprised by pages 5 and 6 of the now-appended shadow PDF file. The original comments to the first two pages are still left in the first plurality of shadow code lines on pages 1 and 2 of the shadow PDF file. A master parser shows all the comments in a timestamped order, and the first comments when clicked to the first two pages, and the later comments go to pages 5 and 6. This way the system does not have to move comments from earlier portions of the shadow file to later versions. Also, some of the comments to earlier portions of the code file may not make sense in later versions of the code file. As the GlassViewer is scrolled in increasing comments' order, it goes through the following page order in the shadow PDF file-pages 1, 2, 5, 6. Pages 3 and 4 of the shadow PDF file do not comprise the comments seen on pages 1 and 2 or duplicates of those comments. This is very useful in cases such as when there is a function in the code that was removed. In such cases, current tools have no way of knowing or showing this. With GlassViewer approach, the user can go back to those comments that link to the PDF scan of that version of the code linked to that comment and that explains the rationale in the historical archive. The GlassViewer tool keeps snapshots and checkpoints of the code as part of the shadow file providing backup capabilities as well.

Figure 31:
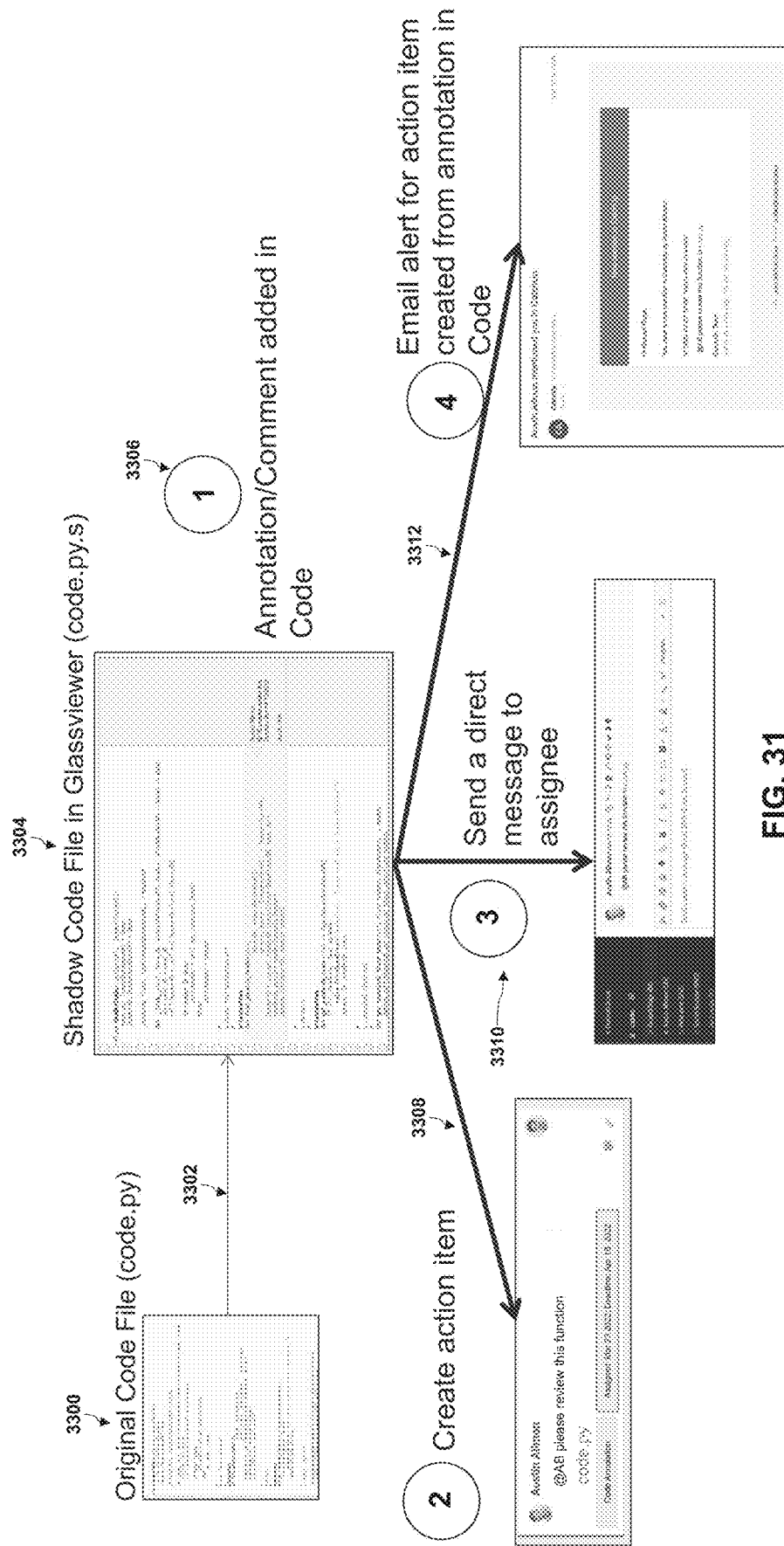
FIG. 31 is an illustration of the process for creating action items and alerts from annotations/comments in code files, according to an embodiment of the invention.

Referring to FIG. 31, an illustration of the process for creating action items and alerts from annotations/comments in code files, is described in more detail. CatchUp features an enterprise grade code collaboration system to develop and collaborate on code in real-time. A user may view and annotate a shadow code file 3304 linked 3302 to an original code file 3300 using the CatchUp Code GlassViewer 3304. The CatchUp Code GlassViewer 3304 allows viewing and annotating code files including comments, text highlighting, and other tools. A user can browse a code file within the CatchUp code management interface and open the code file in CatchUp Code GlassViewer web application 3304 and add comments and annotations 3306, establishing the user as a creating user. Within a comment the creating user can mention another user and assign some action item with deadline and optional number of hours to that user, defining an assigned user. For example, "@AB spend #hours 2-3 on reviewing this function #by 8/25/2022". When the annotations are saved the comments are parsed and action items are created. The action item can be seen from the Kanban view 3308. The CatchUp Server may send a direct message 3310 with the CatchUp messaging view to the assigned user and also may send an email alert 3312 to the assigned user when the action item is created. Annotations in a shadow code file may be viewed and edited by a variety of users, including the creating user, the assigned used, and other users, including users associated with at least one of the code file 3300 and the shadow code file 3304.

Figure 32:
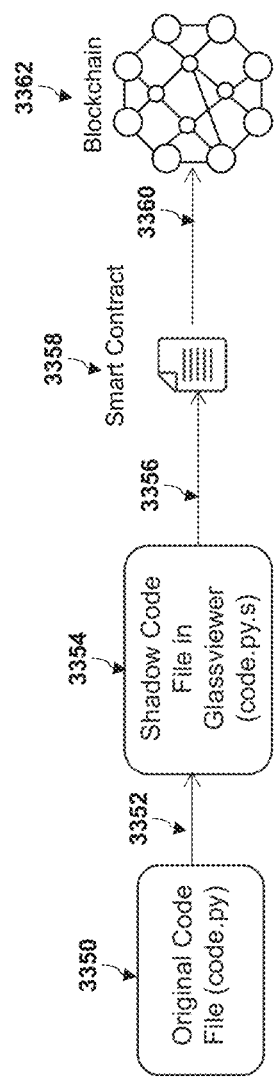
FIG. 32 is an illustration of the certification of code GlassViewer comments in a smart contract on a blockchain network, according to an embodiment of the invention.

Referring to FIG. 32, an illustration of the certification of code GlassViewer comments in a smart contract on a blockchain network, is described in more detail. A code shadow file 3354 linked 3352 to an original code file 3350 comprising annotations and comments can be hashed, timestamped and certified on a blockchain 3362 by recording the hashes 3356 within a Smart Contract 3358 that is deployed 3360 on the blockchain 3362 or recorded as extra data along with a transaction sent to the blockchain 3362.

Figure 33:
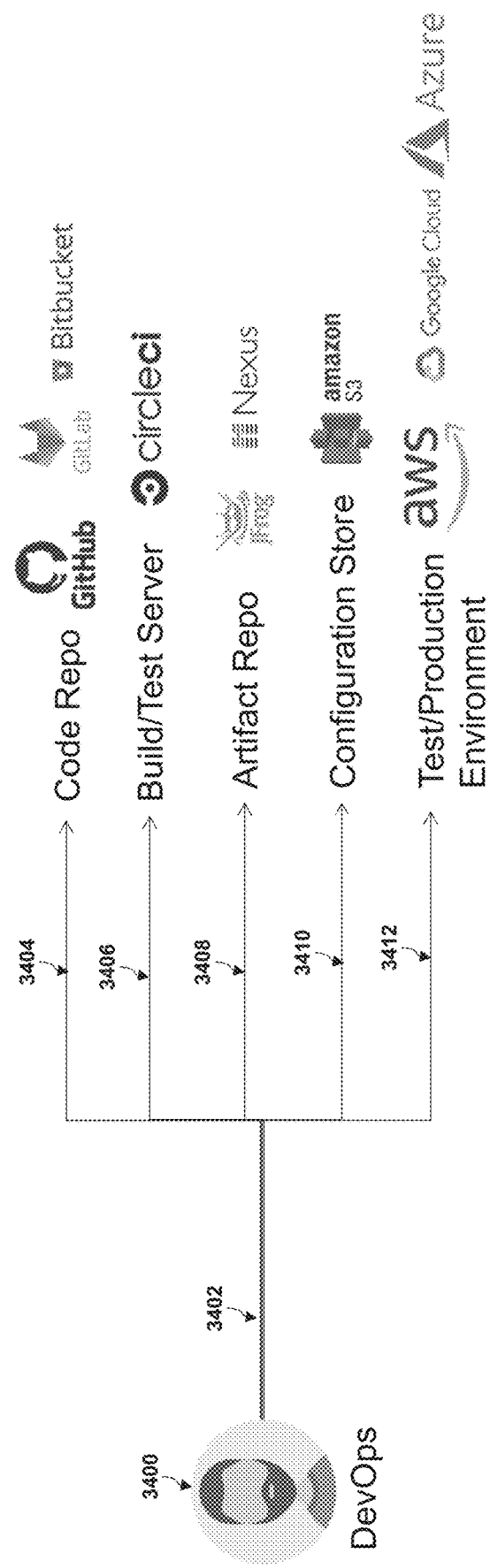
FIG. 33 is an illustration of the existing workflow for DevOps, according to an embodiment of the invention.

Referring to FIG. 33, an illustration of an existing workflow for DevOps, is described in more detail. DevOps teams 3400 have to work with 3402 different set of tools such as Code Repositories 3404, Build/Test Servers 3406, Artifact Repositories 3408, Configuration Stores 3410, and Test/Production Environments 3412. Collaboration with these diverse set of tools is a challenging task for DevOps teams.

Figure 34:
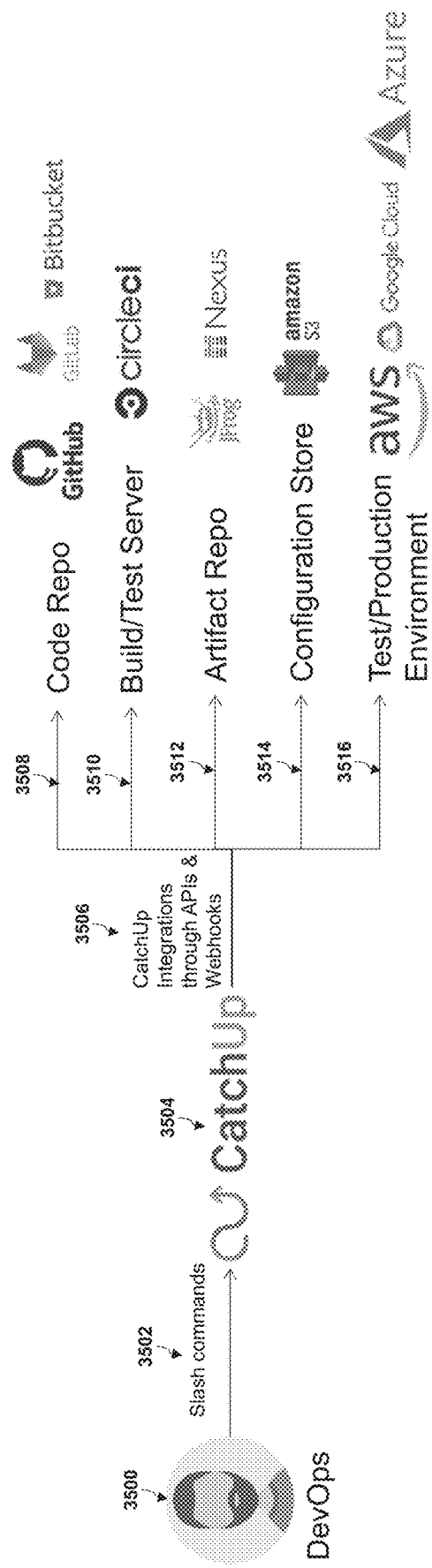
FIG. 34 is an illustration of the improved workflow for DevOps including ChatOps within CatchUp, according to an embodiment of the invention.
Figure 35:
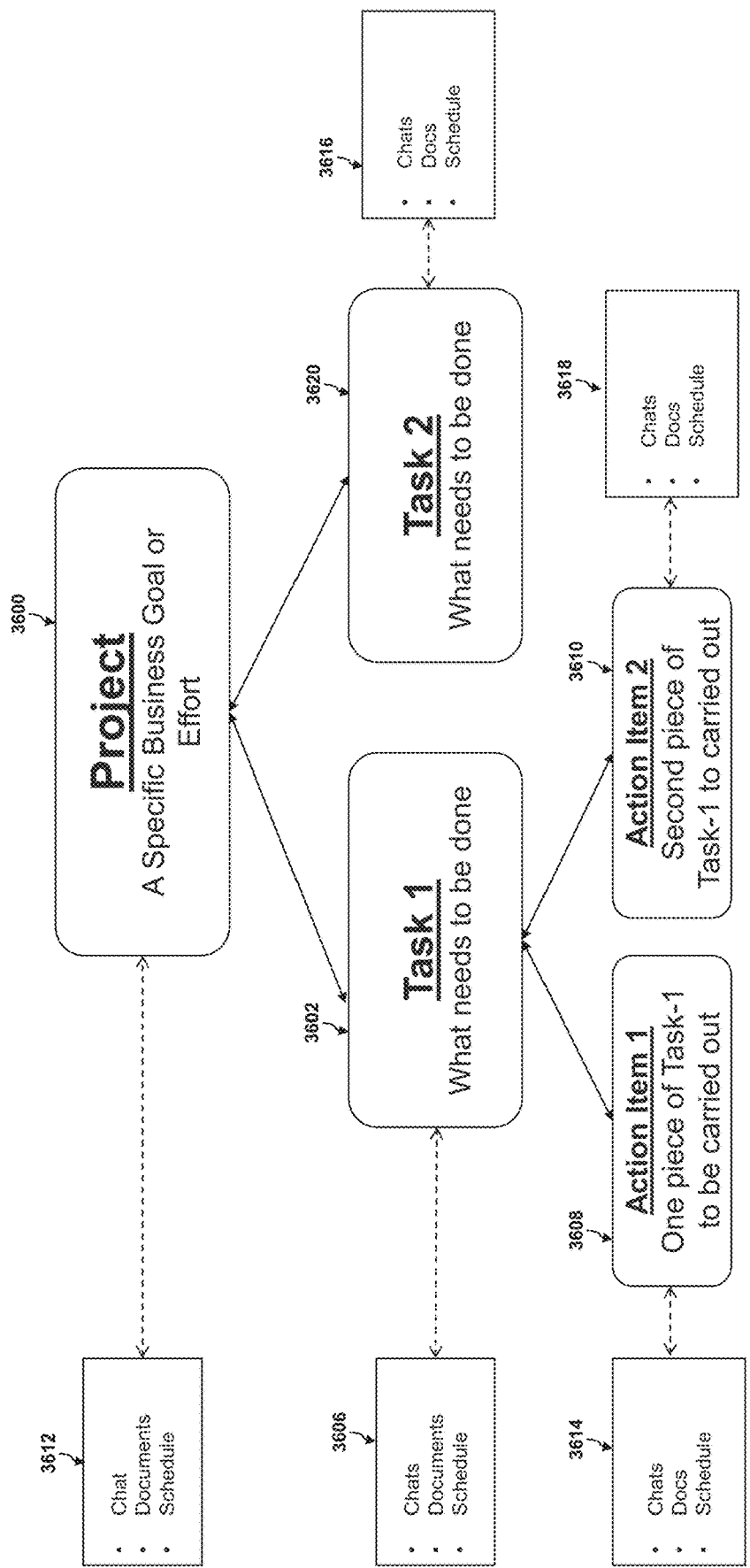
FIG. 35 is an illustration of hierarchical chats at multiple levels within CatchUp, according to an embodiment of the invention.

Referring to FIG. 34, an illustration of the improved workflow for DevOps including ChatOps within CatchUp, is described in more detail. ChatOps features within CatchUp enable conversation driven collaboration on code. CatchUp uses APIs 3506 for interacting with different services. CatchUp uses Webhooks 3506 for listening to incoming events from different services. Incoming events are posted as messages/notes in CatchUp. Outgoing actions on services are performed with Slash commands. Exemplary features of a code repository integration (such as GitHub, GiLlab, Mattermost) are listed below:

1) Reminders: Reminders in the form of messages/notes letting users know what issues and pull requests need their attention.
2) Post actions: Create a GitHub issue from a post or attach a post message to an issue.
3) Update Events: Stay up-to-date with how many reviews, unread messages, assignments, and open pull requests are there.
4) Slash commands: Interact with the GitHub plugin using the/github slash command integration with Mattermost like APIs.
5) Notifications: Get a direct message in CatchUp for events such as:
   i) Issues: Opened or closed issues
   ii) Pulls: New or merged pull requests, as well as draft pull requests
   iii) Commits: New commits on the default branch
   iv) Releases: Published releases
   v) Deployments: Deployment review notifications and Deployment status updates.
   vi) Reviews: Pull request reviews
   vii) Comments: New comments on issues and pull requests
   viii) Branches: Created or deleted branches
   ix) Commits: All commits pushed to any branch
   x) Labels: Filter issues, pull-requests and comments based on their labels.
   xi) Discussions: Discussions created or answered Referring to FIG. 35, an illustration of a hierarchical data object system with hierarchical real-time text communication groups (hereinafter referred to as "chats") at multiple levels within CatchUp, is described in more detail. Within CatchUp, work is broken down into a hierarchy of tiered data objects. Various nomenclature may be employed in describing the tiers of data objects. In some embodiments, they may be titled in ascending number, e.g. first-tiered hierarchical data objects, second-tiered hierarchical data objects, third-tiered hierarchical data objects, etc. In some embodiments, the data objects may be titled with reference to the scope of work they reflect, for example, Projects, Tasks and Action data objects, with each data object being directed to an item associated with the scope of work (e.g. project items, task items, action items, etc.). Projects could represent, for example, long term objectives, such as a Vacation to Paris, while tasks may be shorter term objectives, such as "buying tickets" or "identifying sightseeing locations in Paris", and then action items could smaller tasks that could provide results for "finding best tickets" or "looking for the best airline" within the "buying tickets" task. Each of these project and related action items may require their own planning and execution in its own context while related to the broader objectives and results (or OKRs). For each data object, there may be one or more users, or a plurality of users, associated with each data object and have privileges to at least access the various data associated with the data object, including, but not limited to, the content of the data object, chats associated with the data object as described below, and context files related to the data object. The users associated with each data object may be unique, there may be one or more shared users between data objects, or the users associated with one data object may be identical to those of another data object. For example, users associated with one second-tiered hierarchical data object may be identical to the users associated with another second-tiered hierarchical data object and/or a third-tiered hierarchical data object. As another example, a user associated with a first-tiered hierarchical data object may also be associated with a second-tiered hierarchical data object. The examples are exemplary only, do not limit the scope of the invention, and all possible combinations and permutations are contemplated and included within the scope of the invention.

The software system provides hierarchical chats, that associates distinct chats (and their interfaces) at multiple levels in this work and project hierarchy. For example, Project 3600 has tasks 3602 and 3604. While two tasks are shown, it is contemplated and included within the scope of the invention that any number of tasks (i.e. second-tiered hierarchical data objects) may be linked to a project (i.e. first-tiered hierarchical data object). Task 3602 has Action Items 3608 and 3610. While two action items are shown, it is contemplated and included within the scope of the invention that any number of action items (i.e. third-tiered hierarchical data objects) may be linked to a task (i.e. second-tiered hierarchical data object).

CatchUp supports hierarchical real-time or offline chats (such as chats at Project layer, Task layer and Action item layer) which are used for coordination and collaboration. A hierarchy of chats exists at multiple levels Not all tiers within the software system may have a chat at that tier, but one or more chats associated with data objects at different tiers is contemplated. Each of the chats (and other related context files for that chat (e.g., documents, calendars, shared Wikis)) is tied to a particular level and a particular action item, or task, or project, or to a plurality of them. Chat context 3606 is associated with its own user interface to Task 1 3602, while chat context 3616 is associated with Task 2 3620 and linked to it and not to Project or Action Items (above and below it in the hierarchy). Accordingly, Chat contexts 3606 and 3616 may be accessed by the users associated with Tasks 1 3602 and 2 3620 respectively. Similarly, each of the Action items 1 and 2 (3608 and 3610, respectively) have their own respective chats and related contexts at 3614 and 3618, respectively. Some of the levels in this work hierarchy may share common chats, but at least some chats and their interfaces are linked to specific tasks or action items in the broader context of the project. A particular level in a hierarchy may have no tasks, but other levels have their own respective tasks. The technical benefit of having multiple chats associated with different data objects/tables (where tables correspond to levels, for example) may be an improved performance of the underlying computer system as reads and writes to a particular level of the hierarchy can be performed concurrently with reads and writes in other levels of the hierarchy. Additionally, each chat corresponding to a task or an action item may have its own distinct user interface, for example.

Referring to FIG. 36, an illustration of the chat hierarchies within CatchUp, is described in more detail. Chats exists at multiple levels and for different nodes, where a node can be one of Projects, Tasks or Action Items. The nodes may be organized into a tree hierarchy such as nodes 3700, 3702, 3704, 3706, 3708, or a non-tree hierarchy such as nodes 3710, 3712, 3714, 3716, 3718, 3720. Many such hierarchies may be claimed, with a tree hierarchy being a specific case.

Figure 37:
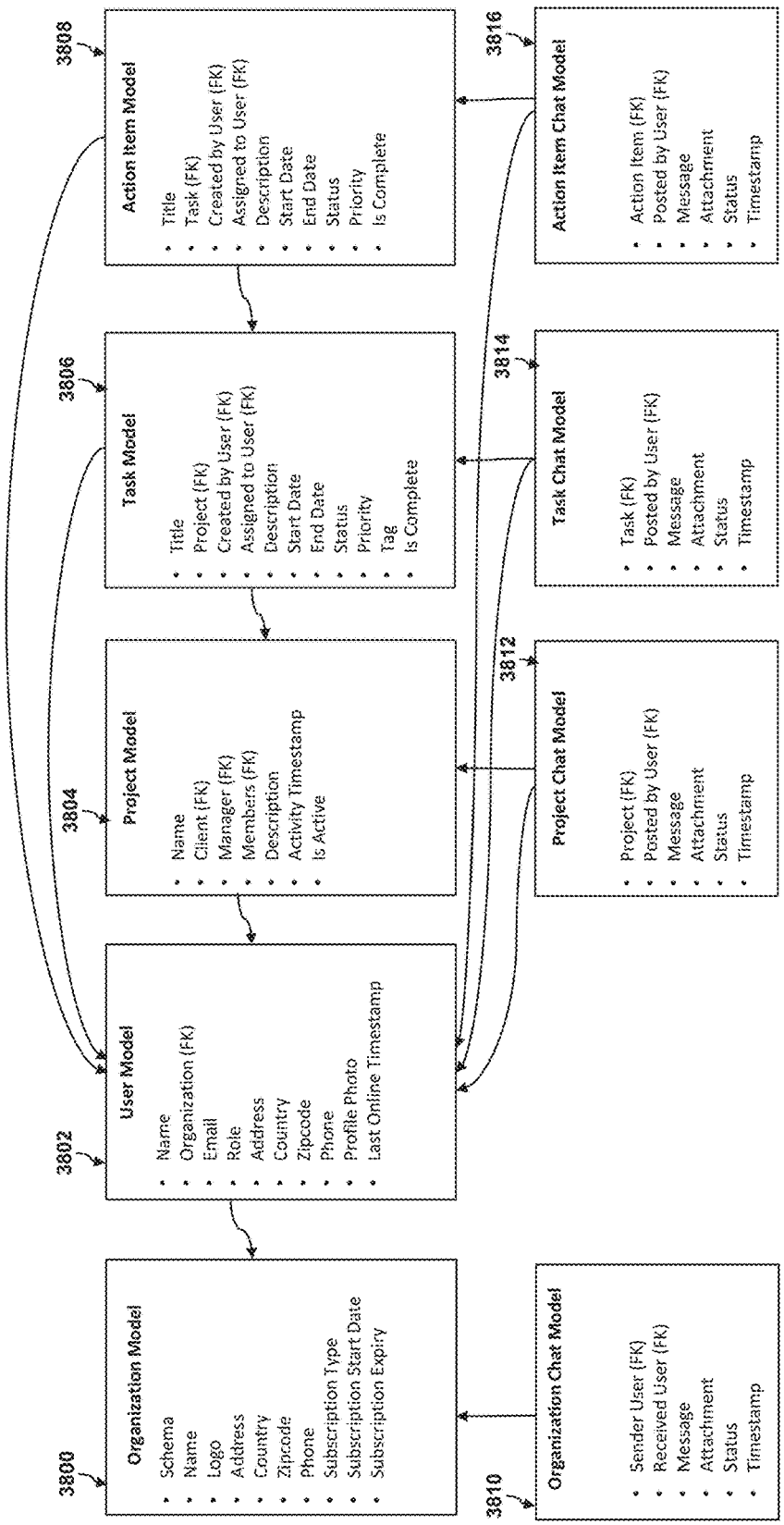
FIG. 37 is a schematic view of data structures maintained within CatchUp for hierarchical chats, according to an embodiment of the invention.

Referring to FIG. 37, a schematic view of data structures maintained within CatchUp for hierarchical chats, is described in more detail. An Organization data model 3800 stores the details of an organization and includes fields such as Schema, Name, Logo, Address, Country, Zipcode, Phone, Subscription Type, Subscription Start Date and Subscription Expiry. A User data model 3802 stores details of a user and includes fields such as Name, Organization, Email, Role, Address, Country, Zipcode, Phone, Profile Photo and Last Online Timestamp. A Project data model 3804 stores details of a project and includes fields such as Name, Client, Manager, Members, Description, Activity Timestamp and Is Active. A Task data model 3806 stores details of a task and includes fields such as Title, Project, Created by User, Assigned to User, Description, Start Date, End Date, Status, Priority, Tag and Is Complete. An Action Item data model 3808 stores details of an action item and includes fields such as Title, Task, Created by User, Assigned to User, Description, Start Date, End Date, Status, Priority and Is Complete. An Organization Chat data model 3810 stores details of organization chat and includes fields such as Sender User, Received User, Message, Attachment, Status and Timestamp. A Project Chat data model 3812 stores details of a project chat and includes fields such as Project, Posted by User, Message, Attachment, Status and Timestamp. A Task Chat data model 3814 stores details of task chat and includes fields such as Task, Posted by User, Message, Attachment, Status and Timestamp. An Action Item Chat data model 3816 stores details of an action item chat and includes fields such as Action Item, Posted by User, Message, Attachment, Status and Timestamp. Each of the models may be stored as records in respective databases comprised by the server or within a centralized database. In certain embodiments, separate databases may be used for storing the data models for separate organizations. All these options contribute to improved performance and scalability when the number of users can be very large and real-time responses are desired.

Figure 38:
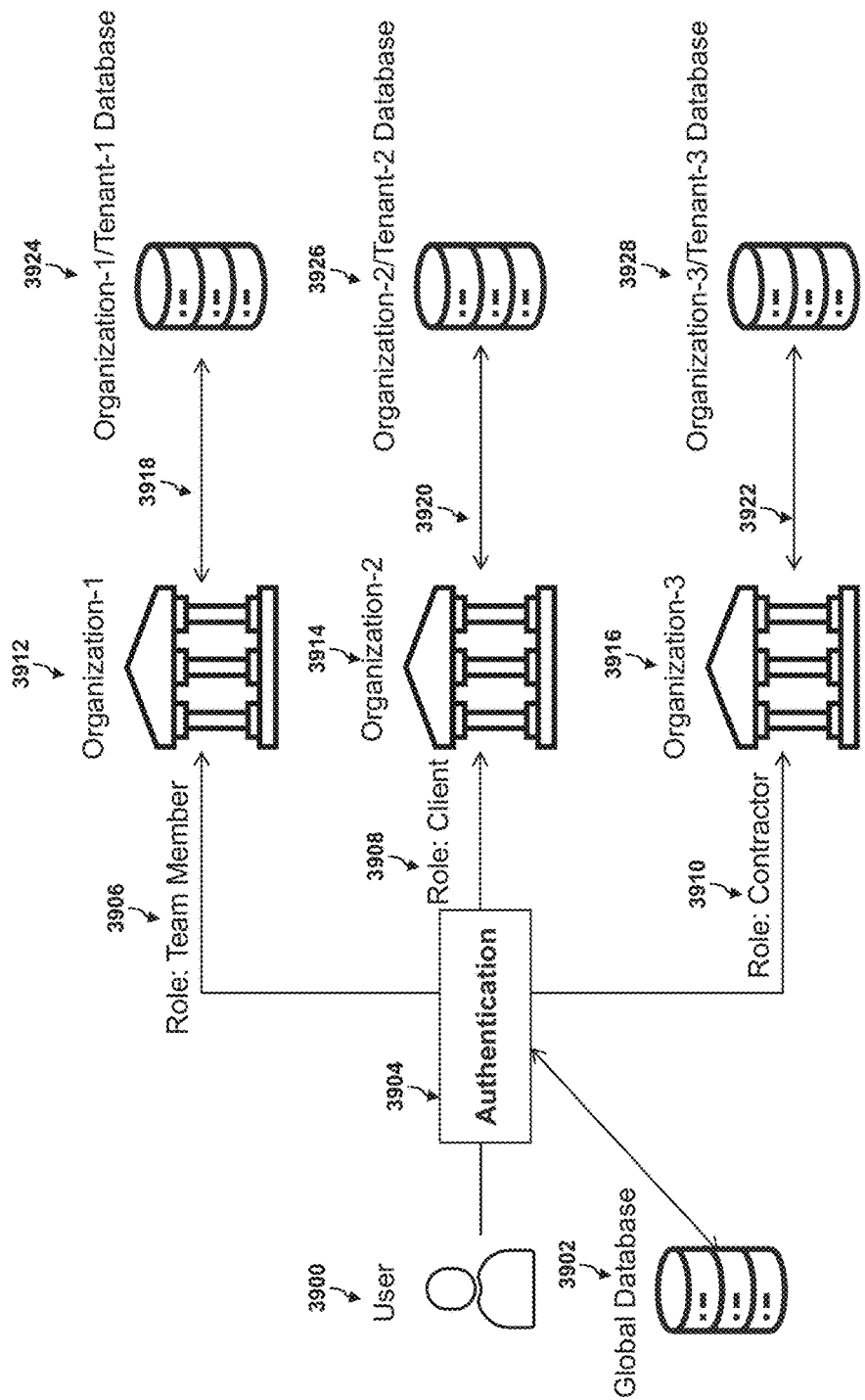
FIG. 38 is an illustration of multi-tenant structure within CatchUp, according to an embodiment of the invention.

Referring to FIG. 38, an illustration of multi-tenant structure within CatchUp, is described in more detail. For scalability of the system where a user may be part of multiple organizations, either separate databases or separate database schemas as used for storing global data (such as user login credentials) and organization/tenant specific data. A User 3900 can be part of multiple Organizations 3912, 3914, 3916 and have different roles in different organizations (such as Client 3908, Team Member 3906, Contractor 3908 or Admin (not shown)). At the time of user authentication the user credentials are retrieved from the global database 3902. After the user is authenticated, the user is given the option to select one of the organizations of which the user is a member. Once the user selects an organization, database is switched 3918, 3920, 3922 to the one specific to the organization (3924,3926 or 3928). This approach again results in improved performance and scalability and real-time performance.

Figure 39:
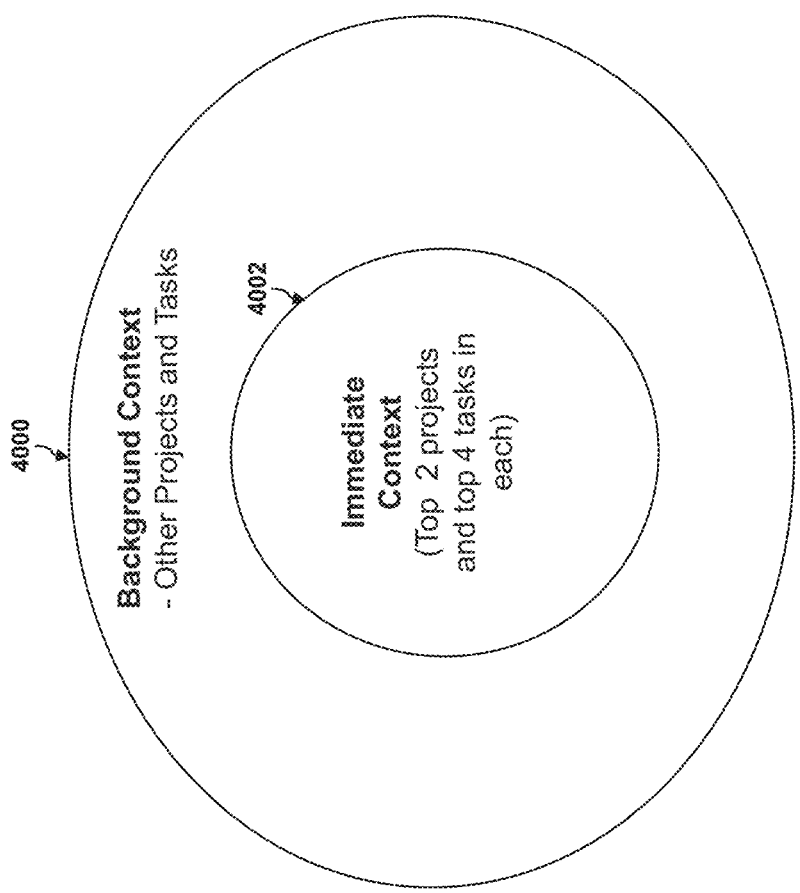
FIG. 39 is an illustration of configurable context for chat hierarchies within CatchUp, according to an embodiment of the invention.

Referring to FIG. 39, an illustration of configurable context for chat hierarchies within CatchUp, is described in more detail. An immediate context 4002 comprises recent or hotlisted Projects, Tasks or Actions Items. The immediate context may be selected from user's usage over the past few days or manually selected. The context is configurable and the user can pick top 2 or top 5 projects for immediate context. Alerts and notifications can be configured to be received for all activity from across the Projects, Tasks or Action Items (background context 4000) or only for activity from the items in the immediate context 4002.

Figure 40:
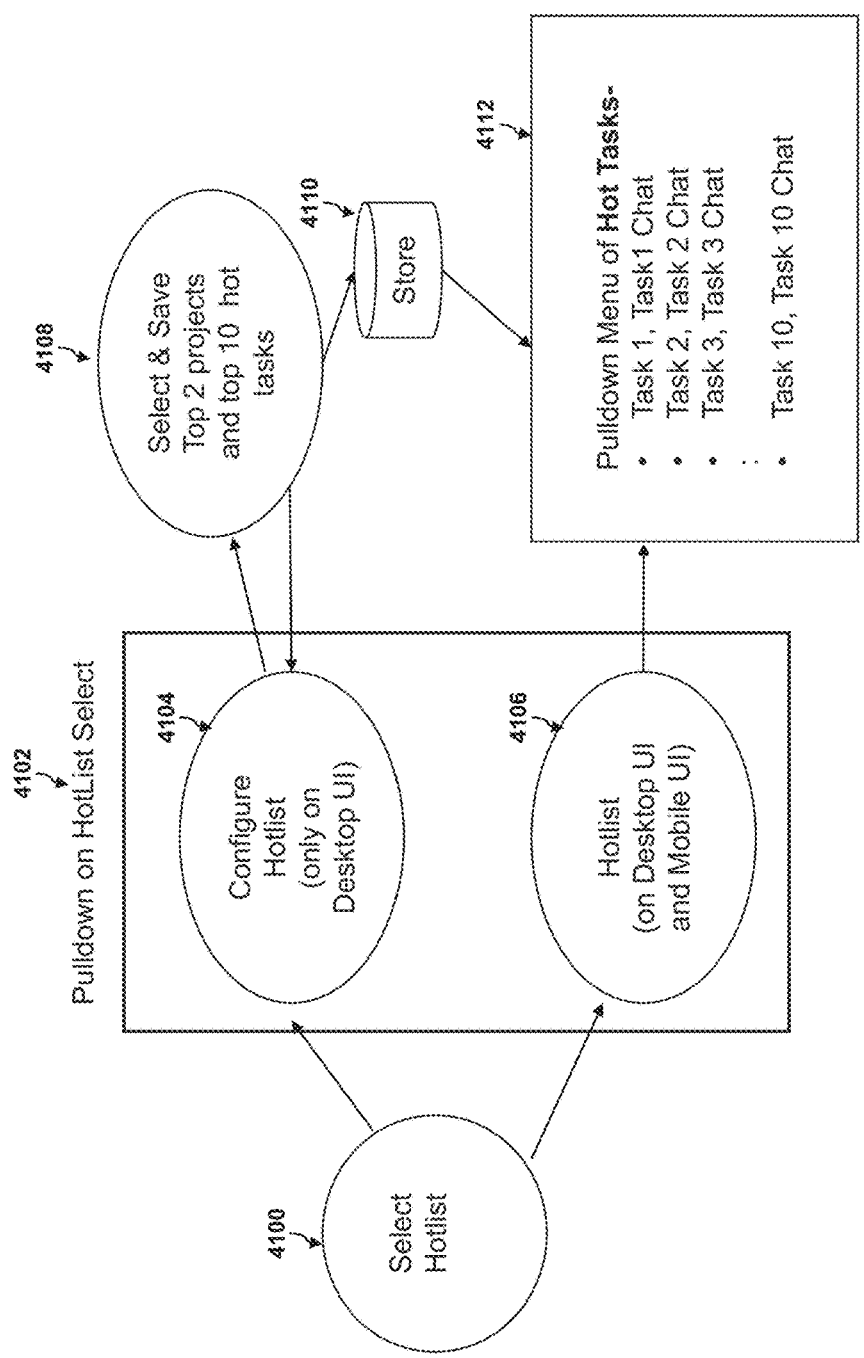
FIG. 40 is an illustration of the configurable hotlists within CatchUp, according to an embodiment of the invention.

Referring to FIG. 40, an illustration of the configurable hotlists within CatchUp, is described in more detail. A user may be able to select 4100 a hotlist of Projects, Tasks or Actions Items 4104, 4106. For example, the user can select and save top 2 projects and top 10 tasks within those projects are added to the hotlist 4108 and is stored in the database 4110. The selected projects and associated tasks may be accessible via pulldowns 4102, 4112. An Artificial Intelligence (AI) system can be used to generate a hotlist from the past usage or from popular "playlists" of other users with similar profiles, in certain embodiments.

Figure 41:
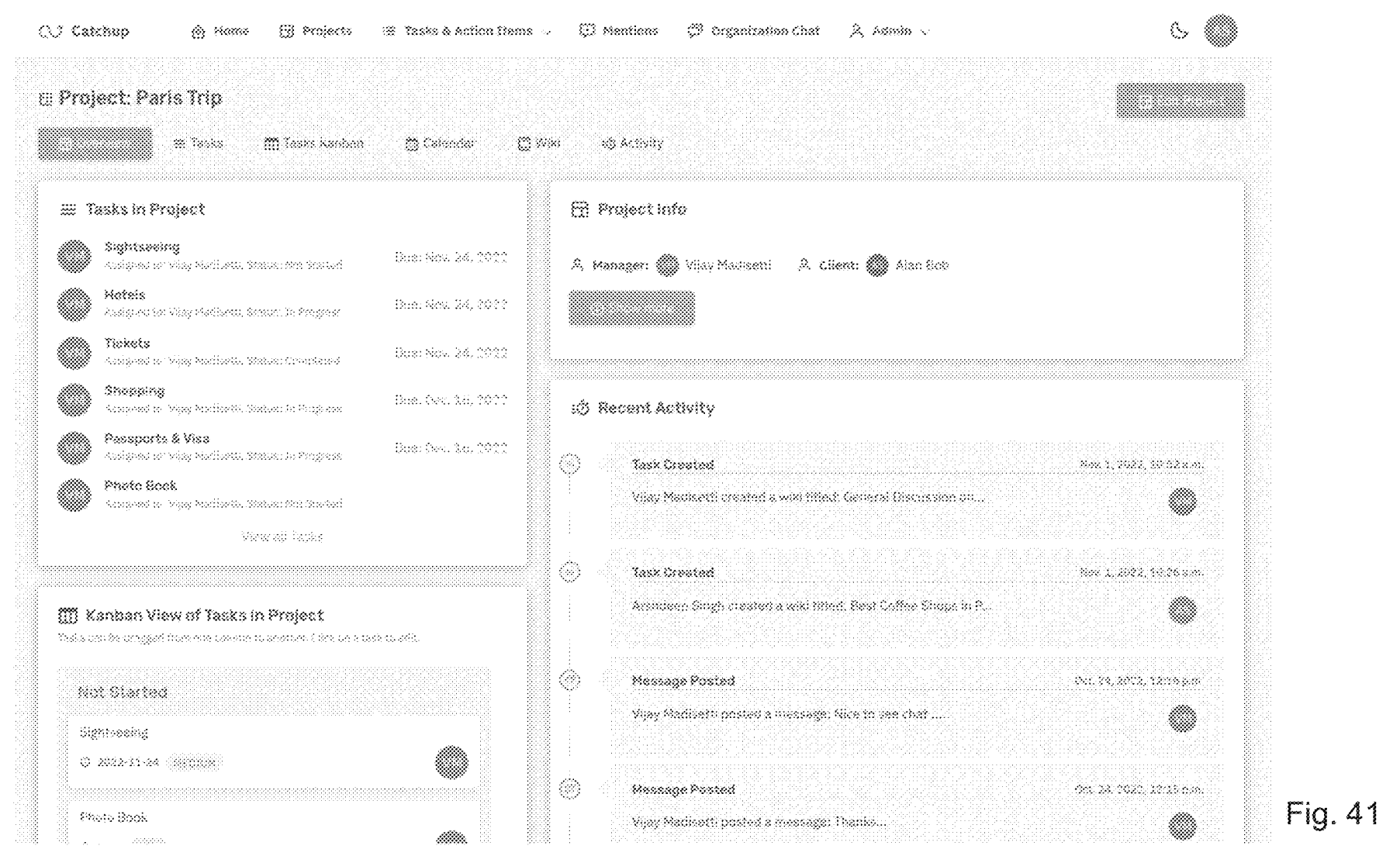

Referring to FIG. 41, an illustration of a Project within CatchUp, is described in more detail. A Project is a specific business goal or effort. A project has one or more Tasks which define what needs to be done. A Project defines a near-term (6-12 months) objective and the expected results. For example, a person may want to take a vacation to Paris. The short-term results would be to (1) identify the city of visit, (2) find good tickets and hotels (3) identify good itinerary for shopping and sight-seeing, and (4) document the trip. These can be optionally related to the OKR (Objective, Key Results) methodologies, Agile or Scrum methodologies used for project and work management.

Figure 42:
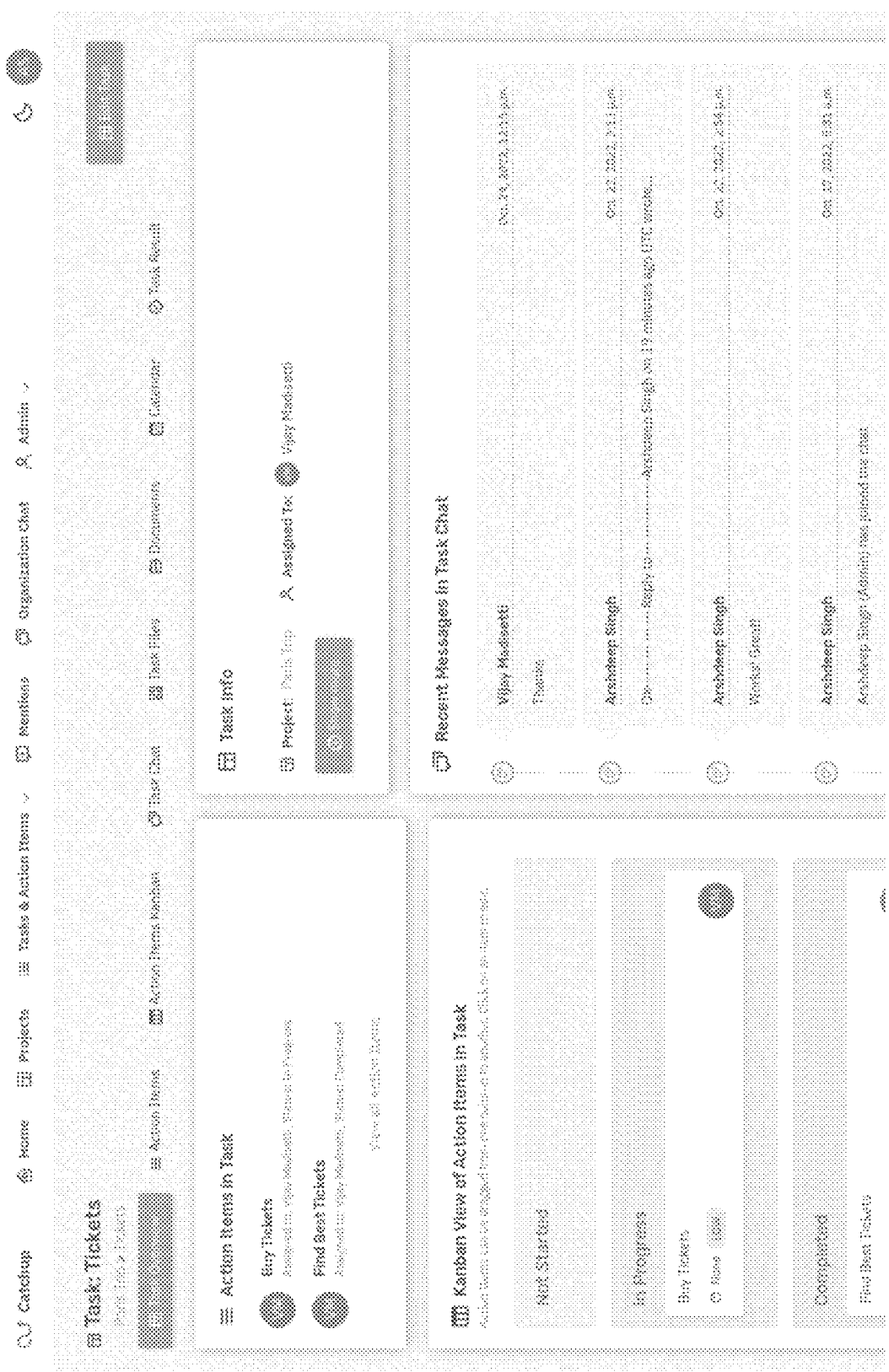
FIG. 42 is an illustration of a Task within CatchUp, according to an embodiment of the invention.

Referring to FIG. 42, an illustration of a Task within CatchUp, is described in more detail. A Task defines what needs to be done. For example, for the Paris Trip project as described above, the tasks or work items or short-term objectives that need to be done, one for each result include— (1) buy tickets, (2) plan shopping, (3) plan sight-seeing, (4) document and photograph, etc. Each Task has a timeline between 3-6 months.

Figure 43:
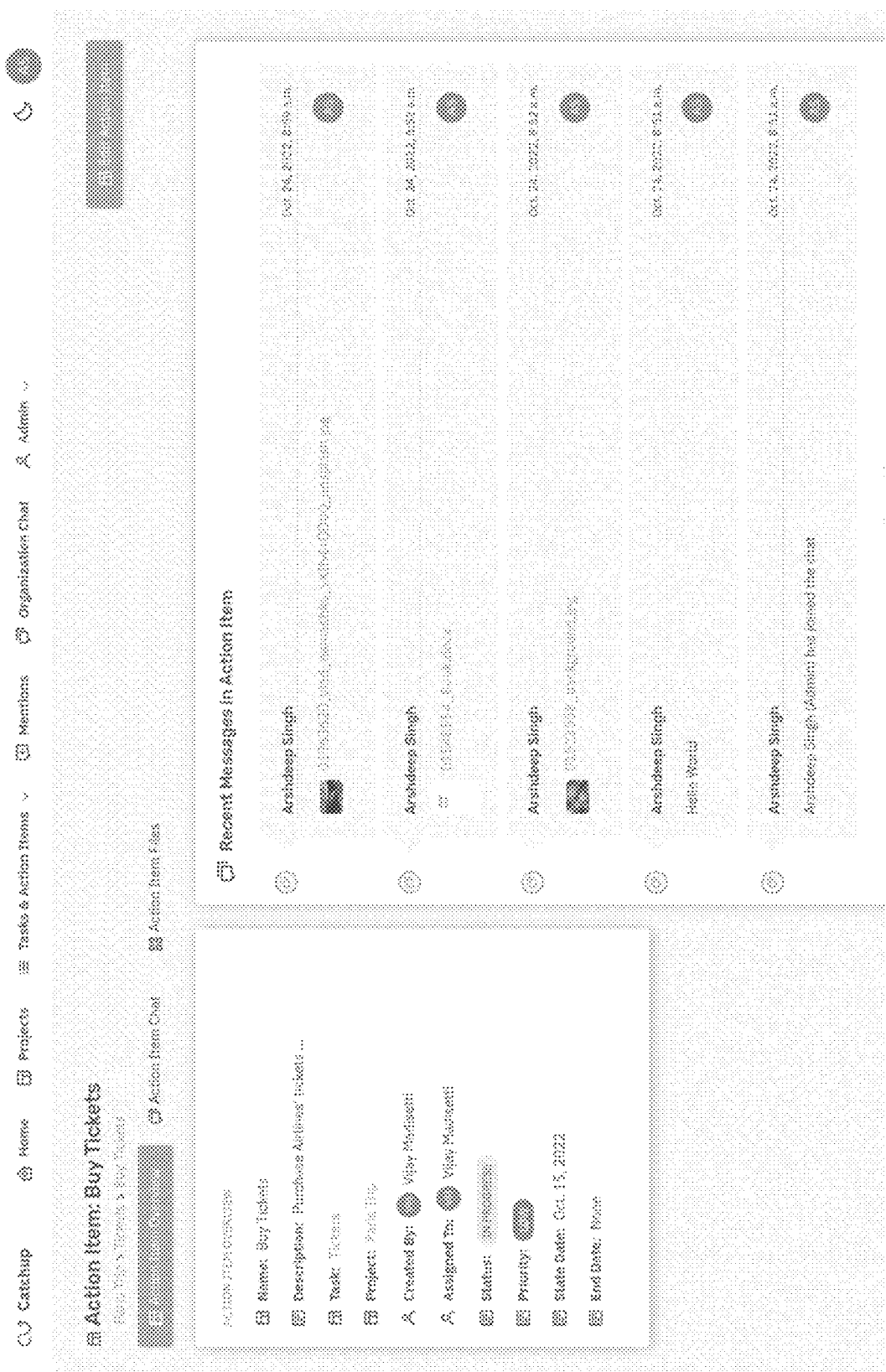
FIG. 43 is an illustration of an Action Item within CatchUp, according to an embodiment of the invention.

Referring to FIG. 43, an illustration of an Action Item within CatchUp, is described in more detail. An Action Item defines a portion of the work of a Task that needs to be done. For example, for the Paris Trip project as described above, the main set of action items needed to complete the "Tickets" task include (1) find best tickets (price, timing) and (2) buy tickets. A time period and sequence of action items may be defined. Each action item has a timeline of 1-2 months. Action Item is a To Do Item (usually 1-2 month) that allows one to accomplish one of short term objectives.

Figure 44:
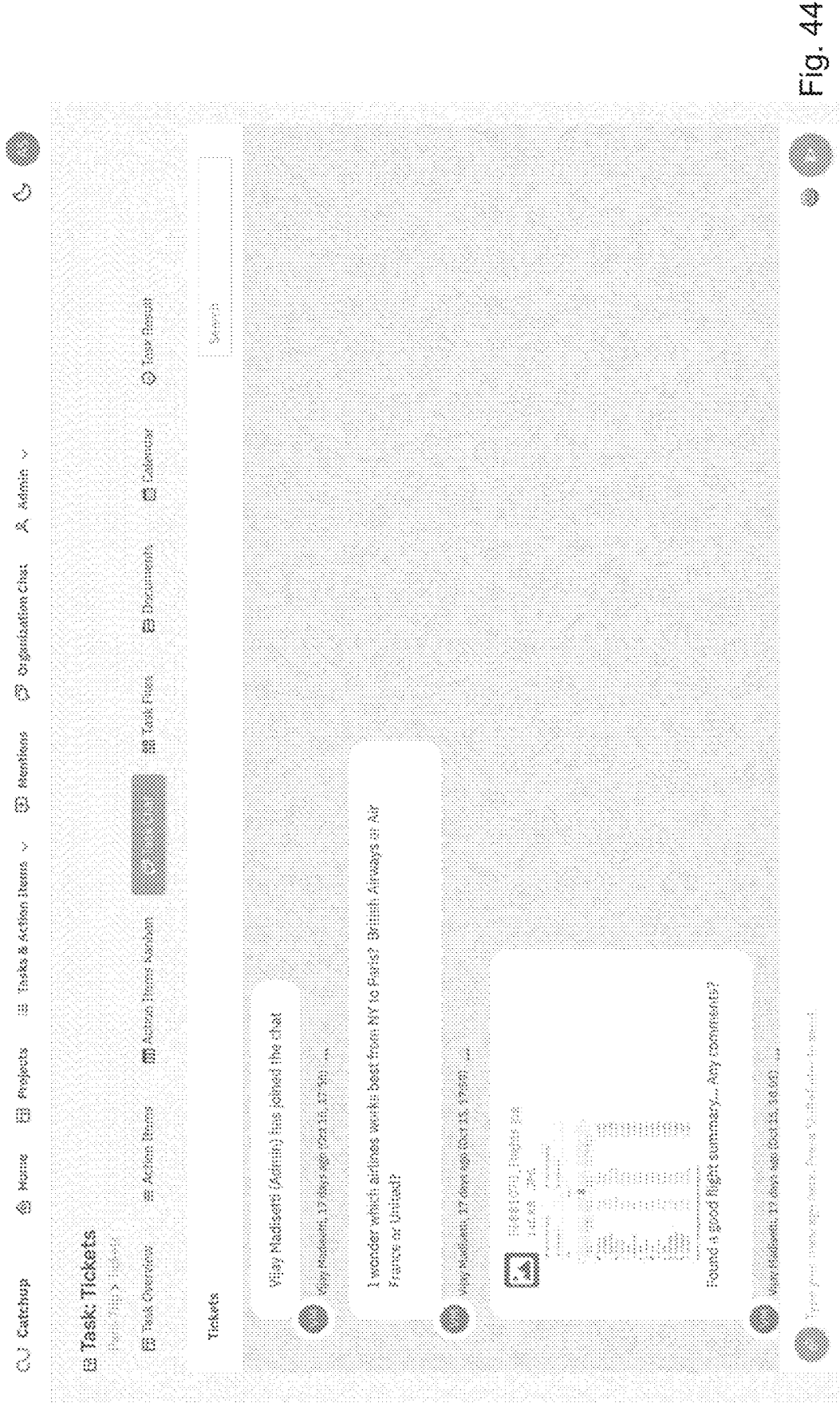
FIG. 44 is an illustration of a Task Chat within CatchUp, according to an embodiment of the invention.

Referring to FIG. 44, an illustration of a Task Chat within CatchUp, is described in more detail. A Project has multiple Tasks, each having chat.

Figure 45:
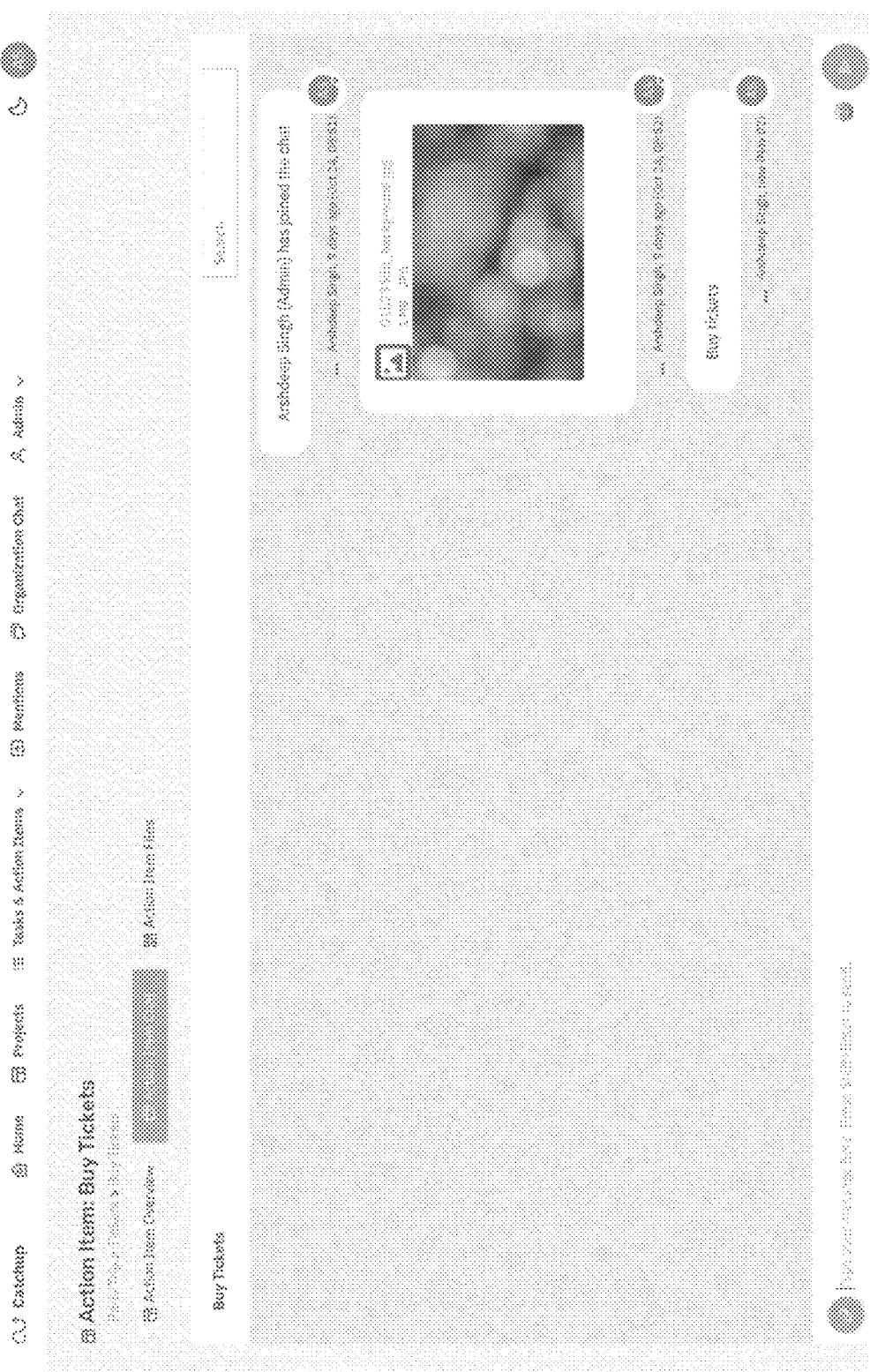
FIG. 45 is an illustration of an Action Item Chat within CatchUp, according to an embodiment of the invention.

Referring to FIG. 45, an illustration of an Action Item Chat within CatchUp, is described in more detail. A Task has multiple Action Items, each having chat.

Figure 46:
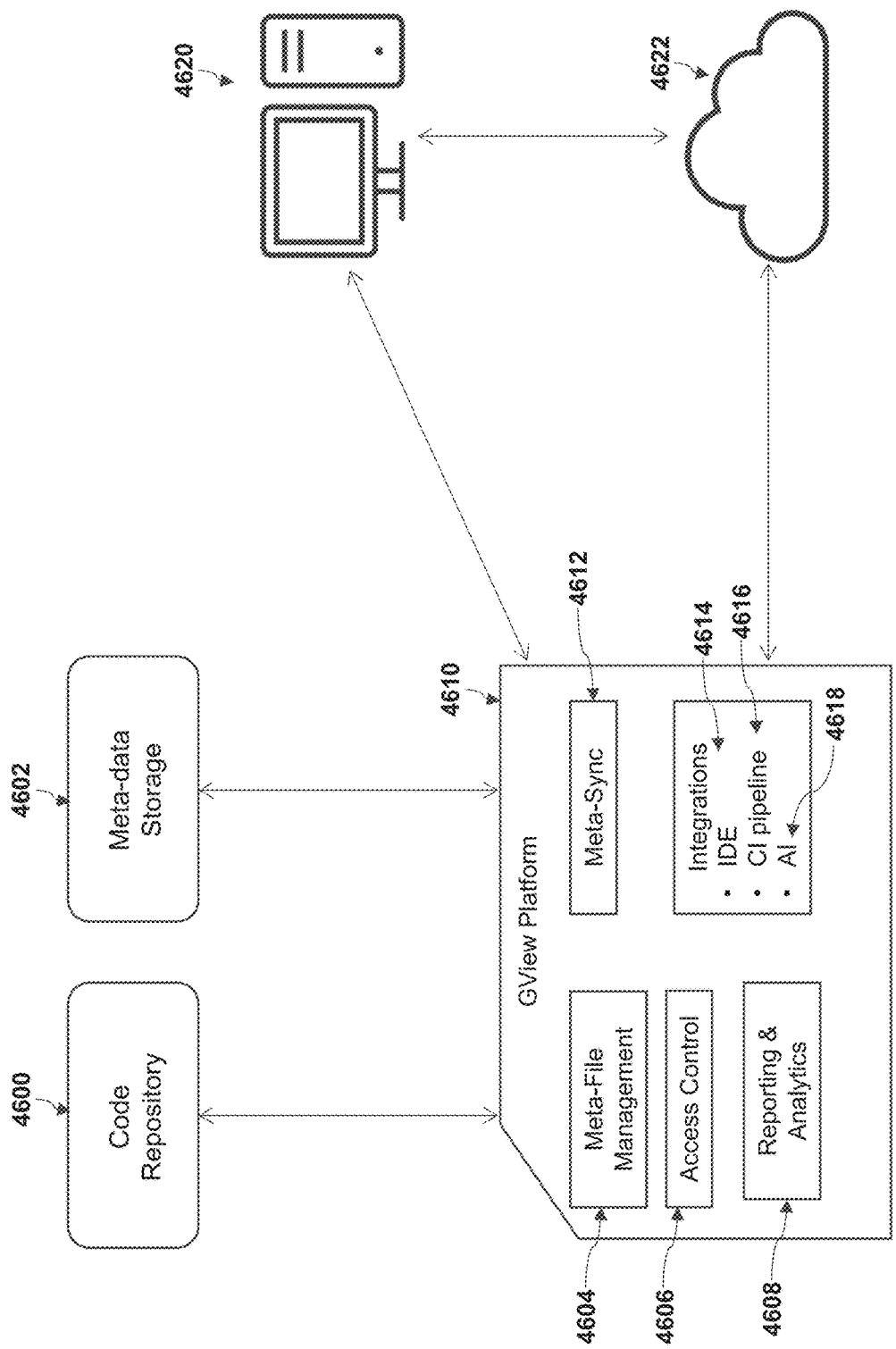
FIG. 46 is a diagram of a system for generating and maintaining meta-files to facilitate code development and annotations for improving code development compliance with design decisions according to an embodiment of the invention.

Referring now to FIG. 46, a schematic block diagram of a code development and annotation system is described in detail. In some embodiments, the system 4610 may be positioned in communication with an existing code repository or database 4600 to retrieve and update source code files. In some embodiments, the code repository 4600 may be comprised by the system 4610. The code repository 4600 may be any storage medium which may contain source code files in a non-transitory condition. A metadata storage 4602 component may be configured to have stored thereon meta-files containing design decisions, annotations, and metadata associated with source code files stored in the code repository 4600. These meta-files serve as containers for storing not only the source code but also annotations, comments, and metadata related to the strategic design decisions that influenced the implementation of that particular code segment or module. The meta-files are structured to separate the source code content from the design notes and metadata sections. This separation allows for better organization, parsing, and retrieval of the relevant information. The design notes and metadata sections can be further subdivided into categories such as Strategic Decisions, Feature Roadmap, API/Library Choices, Performance Considerations, and Security Concerns, among others.

The system 4610 may further comprise a meta-sync module 4612, which may also be referred to as a sync module. The meta-sync module 4612 may be configured to facilitate bi-directional synchronization between the source code files stored in the code repository 4600 and their corresponding meta-files stored in the meta-data storage 4602, handling change detection and conflict resolution. It is contemplated and included within the scope of the invention the system 4610 may comprise a non-transitory computer-readable storage medium comprising software that is executable to create the meta-sync module 4612 and a process configured to execute such software. It is further contemplated and included within the scope of the invention that said storage medium and processor may be configured to facilitate performance of the below-described modules of the system 4610.

The meta-sync module 4612 may be configured to ensure changes to the code files stored in the code repository 4600 are consistently reflected in the corresponding meta-file and vice versa. The meta-sync module 4612 monitors for code changes and handles the necessary updates to the meta-files. The meta-sync module 4612 may employ various techniques to detect changes to the source code files, such as file monitoring, event triggers, or periodic sync operations. Once a change is detected, the meta-sync module may update the corresponding meta-file with the latest source code content, maintaining the integrity and consistency of the data. In the reverse direction, when changes are made to the design notes or metadata sections of a meta-file, the Meta-Sync module 4612 ensures that these changes are reflected in the associated source code file, if applicable. This bi-directional synchronization enables developers and architects to seamlessly collaborate and maintain the alignment between the source code and the documented design decisions in addition to enforcing security policies. Conflict resolution strategies may also be implemented within the meta-sync module 4612 to handle situations where simultaneous changes are made to both the source code and the meta-file. These strategies may involve merge algorithms, version control systems, or manual intervention to resolve conflicts and maintain data integrity.

In some embodiments, the meta-sync module 4612 may be operable to receive a code file from a user, defined as a received code file. The received code file may comprise received code content and received metadata content. Upon receiving the received code file, the meta-sync module 4612 may identify the received code file as one of a new code file and an updated code file. A new code file may be understood as a code file not stored on the code repository 4600. Such new code files may be received via one of the code repository 4600 and/or from a user device 4620, which may be received directly or via a network 4622, such as the Internet. Identification of the code file as a new code file may be accomplished by any means or method as is known in the art, including, but not limited to, review of the code file name, review of the code content of the received code file, review of metadata comprised by the code file, such as a unique ID associated with the code file, and the like. The meta-sync module 4612 may further be configured to, upon identifying the received code file as a new code file, generate an indication of a new code file, and send the indication to a meta-file management module 4604 along with the received code file.

An updated code file may be understood as an update to a code file already stored in the code repository 4600 and may be identified by the meta-sync module 4613 by similar means or methods as identified above. The meta-sync module 4613 may further be configured to, upon identifying the received code file as an updated code file, generate an indication of an updated code file and send the indication of an updated code file along with the received code file to a meta-file management module 4604.

The system 4610 may comprise a meta-file management module 4604 as mentioned above. The meta-file management module 4604 may be a software module operable to create, update, and maintain the meta-files, handling the parsing and structuring of their content. The Meta-File Management module 3004 is responsible for creating, updating, and maintaining these meta-files. It provides APIs for reading, writing, and querying the meta-file data, enabling seamless integration with other components of the system 4610. This module also handles the parsing and structuring of the meta-file content, ensuring that the source code and design notes are appropriately separated and organized.

In some embodiments, the meta-file management module 4604 may be configured to receive the indications of a new code file and/or an updated code file from the meta-sync module 4612. The meta-file management module 4604 may further be configured to, responsive to receiving an indication of a new code file from the meta-sync module 4612, generate a new meta-file comprising the new metadata content and the received code file, store the code content of the received code file in the code repository 4600, and store the received metadata content in the metadata storage 4602. The meta-file management module 4604 may be configured to, responsive to receiving an indication of an updated code file from the meat-sync module 4612, identify a stored code file in the code repository 4600 associated with the received code file and comprising stored code content, identify a stored meta-file stored in the metadata storage 4602 associated with the stored code file, the stored meta-file comprising stored metadata content, and identify the received code file as comprising at least one of updated code content and updated metadata content. Such identification may be accomplished by any means or method as is known in the art including, but not limited to, comparing the code content of the received code file to the code content of the stored code file, comparing the meta-content of the received meta-file with the meta-content of the stored meta-file, comparing the respective hash values of the received and stored code files and received and stored meta-files, and the like. The meta-file management module 4604 may be further configured to, responsive to identifying the received code file as comprising updated code content, update the stored meta-file to comprise the updated code content. The meta-file management module 4604 may be further configured to, upon identifying the updated code file as comprising updated metadata content, update the stored meta-file to comprise the updated metadata content.

The system 4610 may further comprise a role-based access control (RBAC) module 4606. The RBAC module 4606 may be configured to manage permissions for viewing, editing, and annotating meta-files. The RBAC module 4606 may allow administrators to define roles and associate them with specific access privileges. For example, managers and architects may be granted full access to view and annotate all sections of the meta-files, including the design notes and metadata. On the other hand, developers may have limited access, allowing them to view only the source code portions of the meta-files, while the design notes and strategic metadata remain obfuscated or inaccessible. The RBAC module 4606 may integrate with existing authentication and authorization systems within the organization, ensuring a consistent and secure access control experience across the system 4610 and other enterprise applications. Access controls may be enforced at various levels, including the ability to view, edit, or annotate specific sections of the meta-files, as well as the ability to commit changes to the version control system. This granular control over access privileges improves confidence that sensitive design information remains confidential and accessible only to those with the appropriate permissions.

Accordingly, each meta-file comprised by the system 4610 may further comprise an access privilege profile. The access privilege profile may define various user roles and the level of access each user role may have with regards to the code content and the metadata content of the meta-file. Types of access include read access, write access, copy access, delete access, annotate access, and the like. Moreover, the access control module 4606 may comprise one or more user roles. Each user of the system 4610 may be assigned a user role to define their level of access to a given meta-file. Types of roles comprise administrators, architects, owners, managers, programmers, developers, and the like.

The system 4610 may include various integration modules such as integrated development environment (IDE) integration module 4614, a Continuous Integration (CI) integration module 4616, and an artificial intelligence (AI) integration module 4618. The IDE integration module 4614 extends IDEs and code editors to display meta-file information alongside the source code, enhancing code navigation and search capabilities. Developers can readily access and reference the design rationale, strategic decisions, and other metadata while working on the code implementation. Furthermore, the invention enhances code navigation and search capabilities by incorporating meta-file data into these functionalities. Developers can easily navigate to specific code segments or files based on the associated design decisions or metadata, streamlining the code comprehension and maintenance processes. The IDE integration module 3014 provides intuitive user interfaces and tools that enable developers to quickly reference relevant design decisions, architectural principles, and implementation rationale without leaving their familiar development environment.

The CI integration module 4616 integrates with the CI pipeline, analyzing meta-file data during builds to ensure adherence to architectural principles and maintain code quality. The CI integration module 4616 analyzes the meta-file data during the build process, performing checks and validations based on the documented design decisions, architectural guidelines, and other metadata. This includes verifying that the implemented code aligns with the specified strategic decisions, follows the defined product roadmap, and complies with performance, security, and other non-functional requirements documented in the meta-files. Such compliance may be summarized as compliance with a validation criterion. If any deviations, violations, or other indications of non-compliance with the validation criterion are detected, the CI integration module 4616 can generate alerts, fail the build, and/or trigger additional review processes, depending on specific quality assurance practices. Additionally, the CI integration module 4616 can generate reports and metrics based on the meta-file data, providing insights into design decision adherence and architectural compliance over time.

The AI integration module 4618 may utilize generative AI (or Large Language Models, LLMs, for code generation) and automation technologies to streamline the annotation process and enhance the overall user experience. The AI integration module 4618 may employ Natural Language Processing (NLP) or other Neural Networks (or GANs), or other Generative AI techniques to automatically extract design decisions, rationale, and other relevant information from existing code comments, documentation, and other sources. This automated extraction process can significantly reduce the manual effort required to annotate meta-files, particularly when integrating the system 4610 into existing codebases or legacy systems. The AI integration module 4618 may further analyze the metadata for determining a validation criterion to be used by the CI integration module 4616 as described above.

Additionally, the AI integration module 4618 may integrate with AI-assisted code generation tools, enabling these tools to consume the meta-file data and generate code that is aligned with the documented design decisions and architectural principles. This integration ensures that the generated code remains consistent with the overall product strategy and adheres to the specified guidelines and constraints. Automation capabilities are also incorporated into various aspects of the system 4610, such as meta-file updates, synchronization processes, and report generation. This automation streamlines repetitive tasks, improves efficiency, and reduces the potential for human errors.

The system 4610 may further comprise a reporting and analytics module 4608. The reporting and analytics module 4608 may be configured to aggregate and analyzes meta-file data, generating reports, visualizations, and insights for tracking design decisions and assessing architectural compliance. These reports can be filtered and customized based on specific projects, components, teams, or other relevant criteria, allowing for targeted analysis and actionable insights. The reporting and analytics module 4608 may support querying and exploration of the meta-file data, enabling architects, project managers, and other stakeholders to investigate specific design decisions, understand their rationale, and evaluate their impact on the codebase and overall product strategy. Furthermore, the reporting and analytics module 4608 can integrate with existing business intelligence and data analytics platforms, allowing organizations to combine the meta-file data with other relevant data sources, such as project management tools, issue tracking systems, and customer feedback channels. This integration provides a holistic view of the software development lifecycle and enables data-driven decision-making that considers both technical and business factors.

Figure 47:
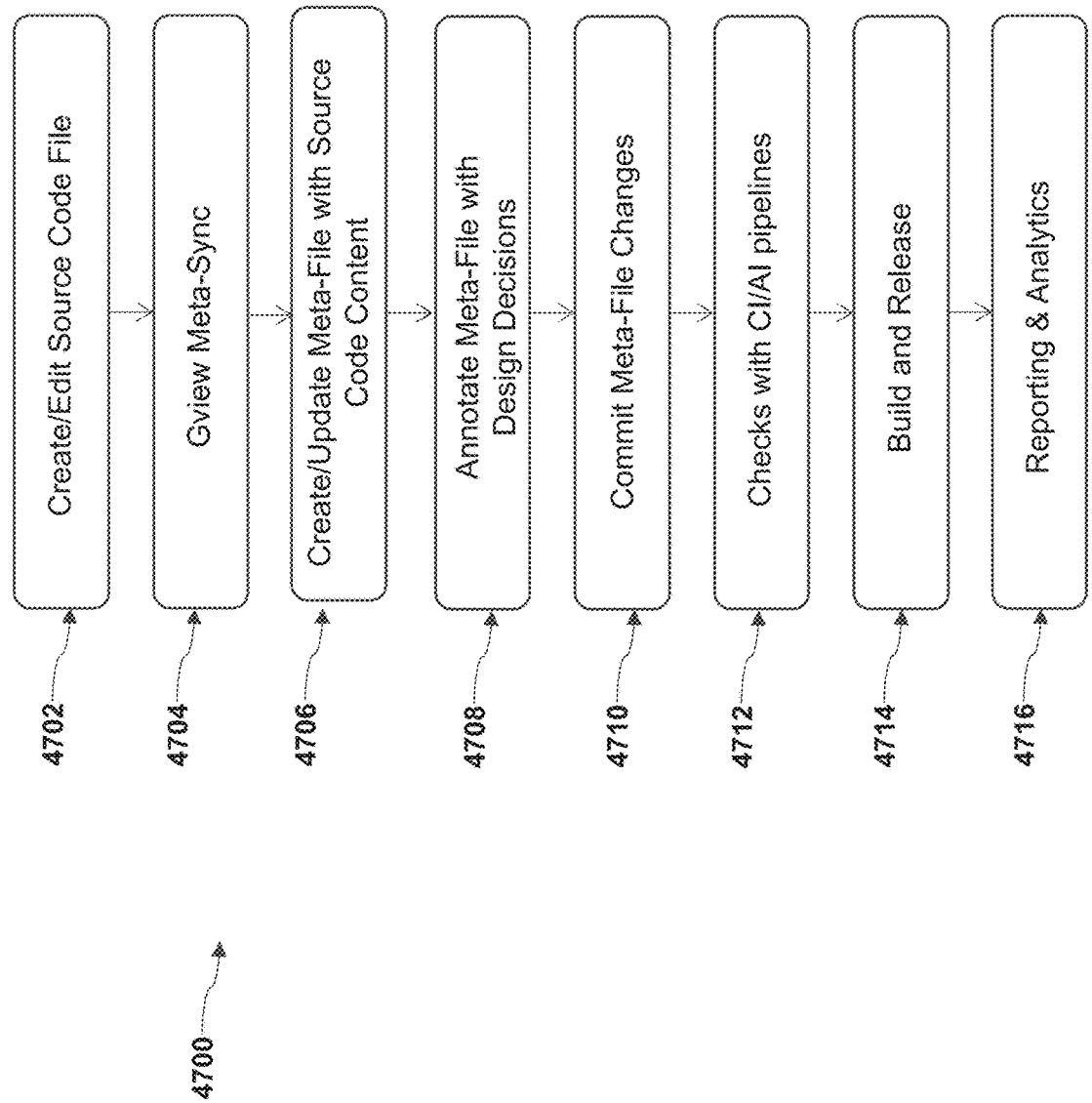
FIG. 47 is a flowchart illustrating a method of improving code development compliance with design decisions according to an embodiments of the invention.

Referring now to FIG. 47 a flowchart illustrating a method 4700 according to an embodiment of the invention is presented. This flowchart illustrates the continuous cycle of code development, meta-file annotation, integration, validation, reporting, and decision-making facilitated by embodiments of the invention. The method 4700 may comprise receiving a source code file being created or edited 4702. The source code file may be received at a code repository and/or received at a server. The method 4700 may continue with detecting a change to the source code file and using the meta-sync mechanism syncs the file in the GView system 4704. At 4706 a corresponding meta-file is created or updated with the source code content. An IDE displays the meta-file annotations alongside the source code for reference. The user may then annotates the meta-file with design decisions, rationale, and metadata at 4708. The changes to the meta-file are committed to the meta-data storage at 4710. The method 4700 continues at 4712 with the Continuous Integration (CI) module performing checks and validations based on the meta-file data (e.g., adherence to architectural principles). If the checks pass, the source code and meta-file changes are merged into the main branch. Optional AI checks are performed by the AI integration module, for example, using assisted code generation tools which consume the meta-file data to generate code or check whether the code aligns with the documented design decisions. At 4714 the updated source code and meta-files are built and released to the production environment. Finally, the method 4700 concludes at 4716 with the reporting and analytics module generates reports and insights based on the meta-file data, tracking design decisions and architectural compliance. The method 4700 may repeat as developers and architects make further changes to the source code and update the corresponding meta-files.

Figure 48:
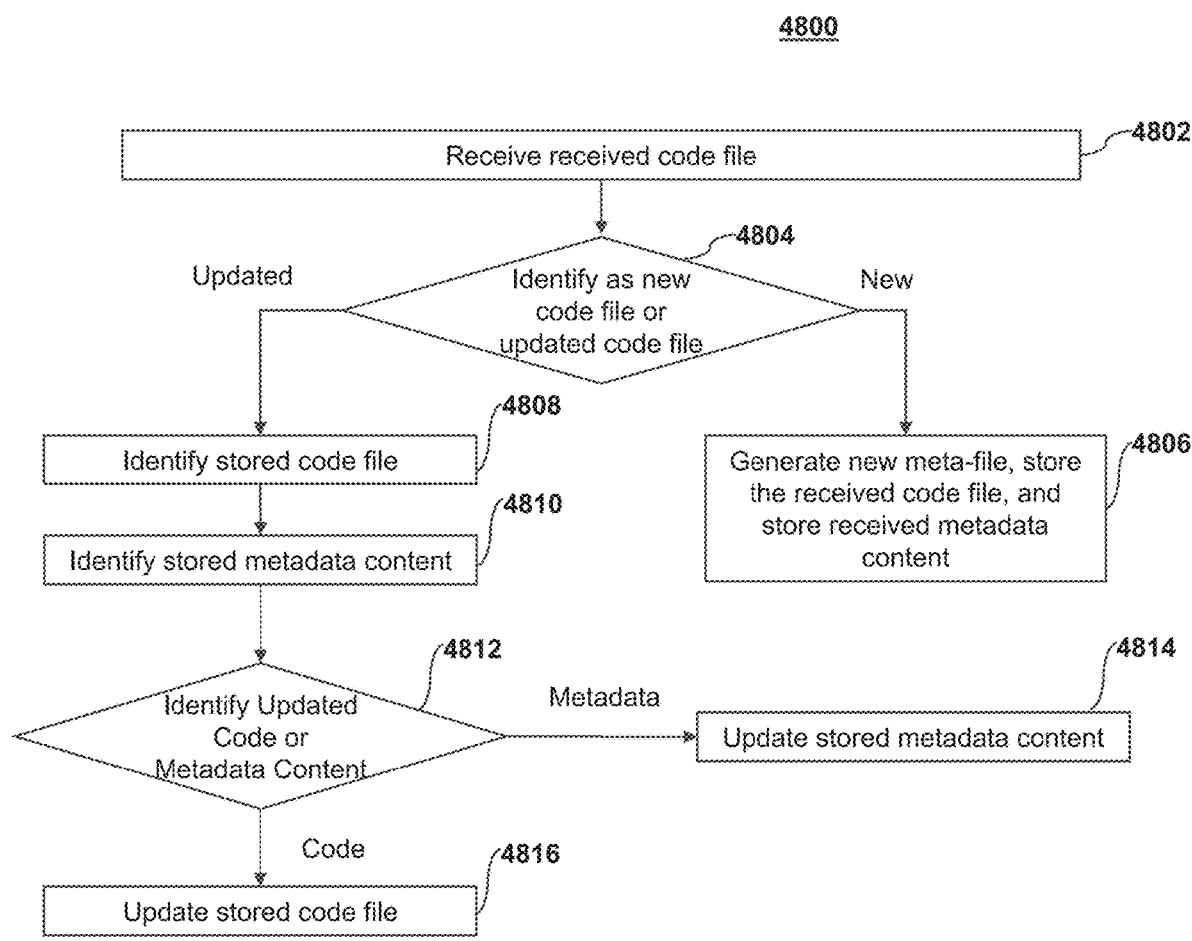
FIG. 48 is a flowchart illustrating another method of improving code development compliance with design decisions according to an embodiments of the invention.

Referring now to FIG. 48, a method 4800 according to an embodiment of the invention is presented. The method 4800 may include receiving a received code file at 4802. At 4804 the received code file may be identified as being one of a new code file for which a version has not been previously stored in a code repository ore an updated code file for which a previous version is stored in the code repository. If at 4804 the received code file is identified as a new code file, the method 4800 may continue at 4806 with generating a new meta-file, storing the received code file in the code repository, and storing received metadata content received along with the received code file in a meta-data storage. If at 4804 the received code file is identified as an updated code file, the method 4800 may continue at 4808 with identifying a stored code file that is stored in the code repository and associated with the received code file and at 4810 with identifying stored metadata content associated with the stored code file. In some embodiments, 4808 and 4810 may be accomplished by identifying a single meta-file comprising the stored code file and the stored metadata content.

The method 4800 may continue at 4812 with identifying the updated code file as comprising one or both of updated code content and/or updated metadata content. Where the updated code file is identifies as comprising updated metadata content at 4812, the method 4800 may continue at 4814 with updating the stored metadata content to comprise the updated metadata content. In some embodiments, where the updated metadata content comprises new metadata content, the new metadata content may be added to the stored metadata content. Where the updated metadata content is determined to remove metadata content when compared to the stored metadata content, the removed content may be removed from the stored metadata content. Where the updated metadata content is determined to have changes to metadata content, the stored metadata content may be changed accordingly. Where the updated code file is identifies as comprising updated code content at 4812, the method 4800 may continue at 4816 with updating the stored code file with any and all new, removed, or changed code content of the updated code file. It is contemplated and included within the scope of the invention that the updated code file may comprise both updated code content and updated metafile content, in which case both steps 4814 and 4816 may be performed.

Figure 49:
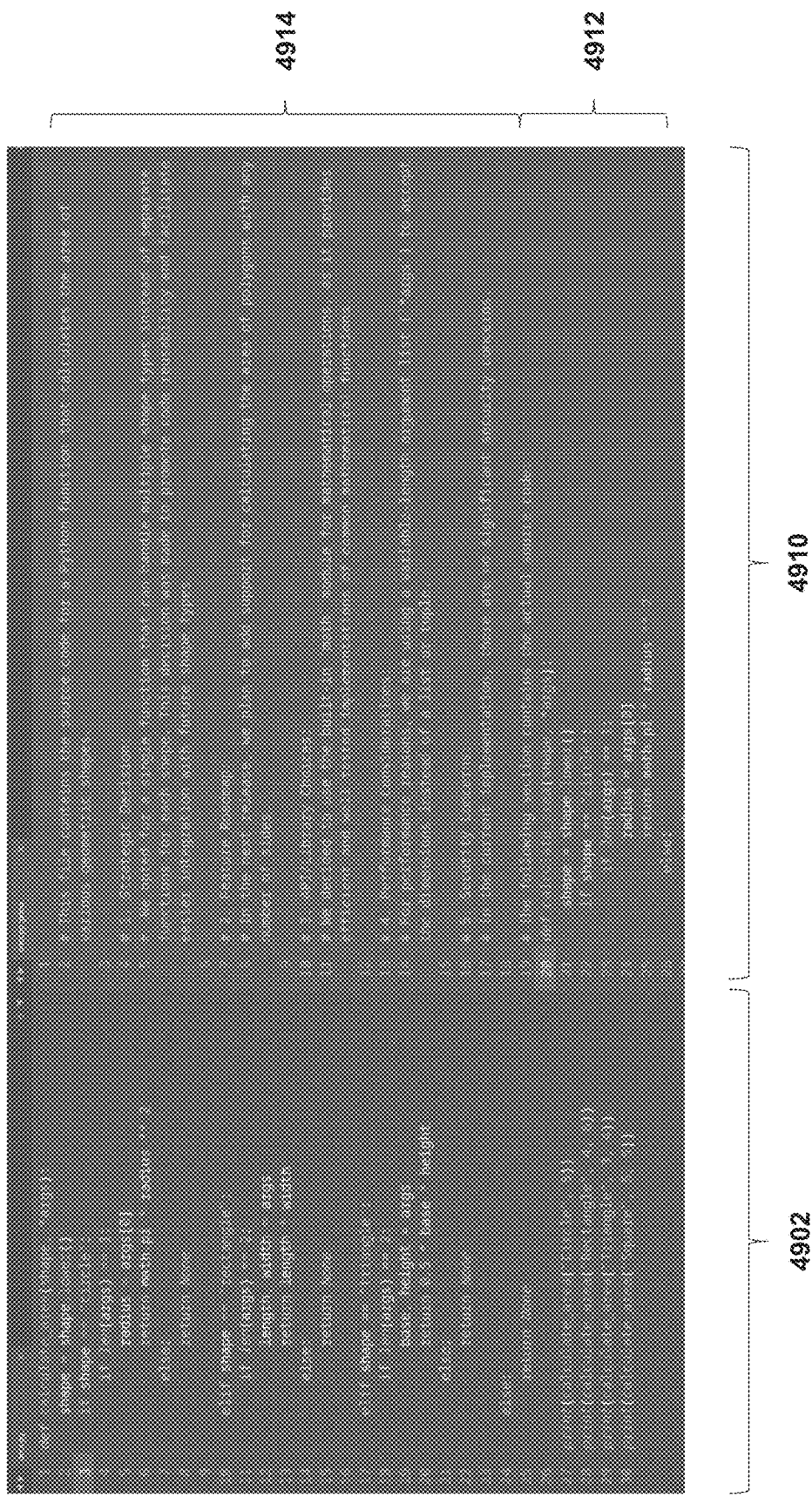
FIG. 49 is an illustration of a composite file comprising a code file and metadata associated with the code file according to an embodiment of the invention.

Referring now to FIG. 49, a composite file 4910 according to an embodiment of the invention is presented. An original code file 4902 is shown, as it may be received by a system according to an embodiment of the invention. A composite file 4910 may be generated by the system for a meta-file, the composite file comprising both code content 4912 comprised by the meta-file and stored in a code file in a code repository as described above and metadata content 4914 comprised by the meta-file and stored in a metadata storage as described above. The metadata content 4914 may include documentation of the strategic design decisions, feature roadmap, API/library choices, performance considerations, and security concerns related to the implementation. The composite file 4910 may be sent to a user for display in an IDE, a code editor, or any other display modality.

Throughout the application, reference may be made to various computer hardware, including servers, storage, cloud storage, and the like. It is contemplated and included within the scope of the invention that the CatchUp and Gview systems and their various components may be software executed on computer devices, including servers, personal computers, smartphone devices, and the like, each comprising a processor configured to execute commands received from software (such as microprocessors, field-programmable gate arrays, integrated circuits, and the like), a storage medium positioned in electrical communication with the processor and operable to store software and other digital information thereupon in one or both of transitory and non-transitory status (such as hard disk drives, solid state drives, flash drives, compact flash drives, SD drives, memory, and the like), and a network communication device operable to communicate across computer networks as are known in the art, including, but not limited to, wide area networks such as the Internet and mobile data networks, local area networks such as Ethernet and Wi-Fi networks, and personal area networks such as Bluetooth networks. Accordingly, it is contemplated and included within the scope of the invention that the computer hardware performing the above-described CatchUp and GView functions include hardware necessary for such performance as is known in the art.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A method of facilitating code development comprising:
receiving an updated code file;
identifying a stored code file associated with the updated code file and comprising stored code content;
identifying a stored meta-file associated with the stored code file, the stored code file being associated with the updated code file, the stored meta-file comprising previously received metadata content;
identifying the updated code file as comprising at least one of updated code content and updated metadata content;
upon identifying the updated code file as comprising updated code content, updating the stored code file to comprise the updated code content; and
upon identifying the updated code file as comprising updated metadata content, updating the stored meta-file to comprise the updated metadata content;
receiving a build request to build a program from one or more of the stored code files from a build user, the one or more stored code files being defined as build code files;
retrieving the build code files from a code repository;
retrieving the stored meta-file associated with the build code files;
analyzing metadata content comprised by the stored meta-file to identify a validation criterion being at least one of a design decision, an architectural guideline, a product roadmap, a performance requirement, a security requirement, or a non-functional requirement;
determining at least one of compliance and non-compliance with the validation criterion by analyzing the build code files;
upon determining compliance with the validation criterion, building the program responsive to the build request; and
upon determining non-compliance with the validation criterion, at least one of:
transmitting an alert to the build user;
terminating the build request; and
triggering a review process.

2. The method of claim 1 further comprising:
receiving a request to view a requested code file from a requesting user;
retrieving the requested code file from a code repository;
retrieving a requested meta-file associated with the requested code file from a metadata storage; and
providing at least one of the code content of the requested code file and metadata content comprised by the requested meta-file to the requesting user.

3. The method of claim 2 wherein the stored meta-file further comprises an access privilege profile, the method further comprising:
identifying a user role associated with the requesting user;
comparing a user access privilege associated with the user role to the access privilege profile associated with the requested meta-file; and
providing the requesting user with access to the at least one of the code content of the requested code file and metadata content comprised by the requested meta-file to the user responsive to comparing the user access privilege to the access privilege profile.

4. The method of claim 2 wherein providing at least one of the code content of the requested code file and metadata content comprised by the requested meta-file to the requesting user comprises:
generating a composite file comprising metadata content comprised by the stored meta-file and the code content comprised by the requested code file; and
providing the composite file to the user.

5. The method of claim 2 wherein providing at least one of the code content of the requested code file and metadata content comprised by the requested meta-file to the requesting user comprises providing metadata content comprised by the requested meta-file for display by a user program being one of an integrated development environment and a code editor.

6. The method of claim 1 further comprising generating at least one of a report and at least one metric responsive to determining at least one of compliance and non-compliance with the validation criterion.

7. The method of claim 1 wherein identifying a validation criterion comprises:
providing metadata content of the stored meta-file to a neural network trained to identify a validation criterion; and
receiving a validation criterion from the neural network.

8. The method of claim 1 further comprising providing the validation criterion to a code-generating generative artificial intelligence software associated with the build user.

9. A system for facilitating code development comprising:
a code repository comprising a plurality of stored code files;
a metadata storage repository comprising stored metadata;
a processor configured to execute software for:
a sync module configured to:
receive an updated code file;
generate an indication of an updated code file; and
send the indication of an updated code file and the received code file to a meta-file management module;
a meta-file management module configured to:
receive the indication of an updated code file;
identify a stored code file associated with the received code file and comprising stored code content;
identify a stored meta-file associated with the stored code file, the stored meta-file comprising stored metadata content;
identify the received code file as comprising at least one of updated code content and updated metadata content;
upon identifying the received code file as comprising updated code content, updating the stored code file to comprise the updated code content; and upon identifying the updated code file as comprising updated metadata content, update the stored meta-file to comprise the updated metadata content;

receive a build request to build a program from one or more stored code files from a build user, the one or more stored code files being defined as build code files;

retrieve the build code files from the code repository;

retrieve a stored meta-file associated with the build code files;

analyze metadata content comprised by the stored meta-file to identify a validation criterion being at least one of a design decision, an architectural guideline, a product roadmap, a performance requirement, a security requirement, or a non-functional requirement;

determine at least one of compliance and non-compliance with the validation criterion by analyzing the build code files;

upon determining compliance with the validation criterion, build the program responsive to the build request; and upon determining non-compliance with the validation criterion, at least one of:
transmit an alert to the build user;
terminate the build request; and
trigger a review process; and a non-transitory computer-readable storage medium positioned in communication with the processor and having stored thereon executable software that is executable by the processor.

10. The system of claim 9 further wherein:
the sync module is further configured to receive a request to view a requested code file from a requesting user;
the meta-file management module is further configured to:
retrieve the requested code file from the code repository;
retrieve a requested meta-file associated with the requested code file from the metadata storage; and
provide at least one of the code content of the requested code file and metadata content comprised by the requested meta-file to the requesting user.

11. The system of claim 10 wherein the processor is further configured to execute software for an access privilege profile module configured to:

identify a user role associated with the requesting user;
compare a user access privilege associated with the user role to the access privilege profile associated with the requested meta-file; and
provide authorization for the requesting user to access at least one of the code content of the requested code file and metadata content comprised by the requested meta-file to the user responsive to comparing the user access privilege to the access privilege profile.

12. The system of claim 10 wherein the sync module is configured to provide at least one of the code content of the requested code file and metadata content comprised by the requested meta-file to the requesting user by:
generating a composite file comprising metadata content comprised by the stored meta-file and the code content comprised by the requested code file; and
providing the composite file to the user.

13. The system of claim 10 wherein the processor is further configured to execute code for an integrated development environment (IDE) integration module configured to provide at least one of code content of the requested code file and metadata content comprised by the requested meta-file to the requesting user by providing metadata content comprised by the requested meta-file for display by a user program being one of an integrated development environment and a code editor.

14. The system of claim 9 wherein the meta-file management module is further configured to generate at least one of a report and at least one metric responsive to determining at least one of compliance and non-compliance with the validation criterion.

15. The system of claim 9 wherein the processor is further configured to execute software for an artificial intelligence (AI) integration module configured to analyze metadata content comprised by the stored meta-file to identify the validation criterion, the validation criterion being at least one a design decision, an architectural guideline, a product roadmap, a performance requirement, a security requirement, or a non-functional requirement.

16. The system of claim 15 wherein the meta-file management module is further configured to provide the validation criterion to a code-generating generative AI software associated with the build user.

* * * * *